United States Patent
Vecitis et al.

(10) Patent No.: US 9,844,756 B2
(45) Date of Patent: Dec. 19, 2017

(54) POLYETHERSULFONE FILTRATION MEMBRANE

(71) Applicant: PRESIDENT AND FELLOWS OF HARVARD COLLEGE, Cambridge, MA (US)

(72) Inventors: Chad D. Vecitis, Somerville, MA (US); Jose Carlos Mierzwa, Cambridge, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 522 days.

(21) Appl. No.: 14/386,582

(22) PCT Filed: Mar. 12, 2013

(86) PCT No.: PCT/US2013/030408
§ 371 (c)(1),
(2) Date: Sep. 19, 2014

(87) PCT Pub. No.: WO2013/142141
PCT Pub. Date: Sep. 26, 2013

(65) Prior Publication Data
US 2015/0054197 A1    Feb. 26, 2015

Related U.S. Application Data

(60) Provisional application No. 61/614,164, filed on Mar. 22, 2012.

(51) Int. Cl.
*B01D 61/00* (2006.01)
*B01D 39/00* (2006.01)
(Continued)

(52) U.S. Cl.
CPC ........ *B01D 67/0013* (2013.01); *B01D 71/68* (2013.01); *B01D 71/82* (2013.01)

(58) Field of Classification Search
CPC .... B01D 69/10; B01D 71/68; B01D 67/0009; B01D 2323/18; B01D 2239/0407; B29C 47/0023
(Continued)

(56) References Cited

U.S. PATENT DOCUMENTS 6,348,152 B1 * 2/2002 Kawahara ............. A61L 31/041
210/500.23
7,943,543 B1    5/2011 Liu et al.
(Continued)

FOREIGN PATENT DOCUMENTS

WO    WO 2010068839 A2 *  6/2010    ......... B01D 67/0011
WO    2011-069050 A1    6/2011

OTHER PUBLICATIONS

Ahmad et al., "Functionalized PSf/SiO2 nanocomposite membrane for oil-in-water emulsion separation", Desalination 268:266-269 (2011).

(Continued)

*Primary Examiner* — Ana Fortuna
(74) *Attorney, Agent, or Firm* — Nixon Peabody LLP

(57) ABSTRACT

Provided herein are filtration membranes, method of manufacturing said membranes and use of such membranes for the removal of substances from fluids or substances.

16 Claims, 17 Drawing Sheets

A

B

(51) Int. Cl.
B01D 39/14 (2006.01)
B01D 65/00 (2006.01)
B01D 67/00 (2006.01)
B01D 71/68 (2006.01)
B01D 71/82 (2006.01)

(58) Field of Classification Search
USPC .................................. 210/500.41; 264/48, 49
See application file for complete search history.

(56) References Cited

U.S. PATENT DOCUMENTS

| | | | |
|---|---|---|---|
| 2006/0096913 A1 | 5/2006 | Kerres et al. | |
| 2008/0237126 A1* | 10/2008 | Hoek ................. | B01D 67/0079 210/637 |
| 2008/0318134 A1 | 12/2008 | Kerres et al. | |
| 2009/0120875 A1* | 5/2009 | Liu ...................... | B01D 53/228 210/641 |
| 2009/0280255 A1* | 11/2009 | Handlin, Jr. .............. | C08F 8/36 427/358 |
| 2011/0240556 A1 | 10/2011 | Hoek et al. | |
| 2013/0284667 A1* | 10/2013 | Pinnavaia .............. | B01D 71/04 210/500.25 |
| 2015/0054197 A1* | 2/2015 | Vecitis ................... | B01D 71/68 264/299 |

OTHER PUBLICATIONS

Ahmed et al., "Novel Method of Synthesizing Poly(ether sulfone) Membranes Containing Two Solvents and a Lithium Chloride Additive and Their Performance", Journal of Applied Polymer Science 115:1428-1437 (2010).
Alonso et al., "Nafion—Clay Nanocomposite Membranes: Morphology and Properties", Polymer (2009). (27 pages).
Anadao et al., "Montmorillonite as a component of polysulfone nanocomposite membranes", Applied Clay Science 48:127-132 (2010).
Anadao P., "Clay-Containing Polysulfone Nanocomposites", INTECH Open Access Publisher 133-146 (2011).
Arthanareeswaran et al., "Development, characterization and separation performance of organic—inorganic membranes: Part II. Effect of additives", Separation and Purification Technology 67:271-281 (2009).
Arthanareeswaran et al., "Preparation, characterization and performance studies of ultrafiltration membranes with polymeric additive", Journal of Membrane Science 350:130-138 (2010).
Balta et al., "A new outlook on membrane enhancement with nanoparticles: The alternative of ZnO", Journal of Membrane Science 389:155-161 (2012).
Barth et al. "Asymmetric polysulfone and polyethersulfone membranes: effects of thermodynamic conditions during formation on their performance", Journal of Membrane Science 169:287-299 (2000).
Defontaine et al., "Nanoporous polymer—Clay hybrid membranes for gas separation", Journal of Colloid and Interface Science 343:622-627 (2010).
Fratila-Apachitei et al., "Influence of membrane morphology on the flux decline during dead-end ultrafiltration of refinery and petrochemical waste water", Journal of Membrane Science 182:151-159 (2001).
Ghaemi et al., "Preparation, characterization and performance of polyethersulfone/organically modified montmorillonite nanocomposite membranes in removal of pesticides", Journal of Membrane Science 382:135-147 (2011).
Hashino et al., "Effect of membrane surface morphology on membrane fouling with sodium alginate", Journal of Membrane Science 366:258-265 (2011).
Idris et al., "Synthesis, characterization and performance of asymmetric polyethersulfone (PES) ultrafiltration membranes with polyethylene glycol of different molecular weights as additives", Desalination 207:324-339 (2007).
Idris et al., "Novel high performance hollow fiber ultrafiltration membranes spun from LiBr doped solutions", Desalination 249:541-548 (2009).
Janczuk et al., "Components of Surface Free Energy of Some Clay Minerals", Clays and Clay Minerals 36(3):243-248 (1988).
Jonsson et al., "Influence of the membrane material on the adsorptive fouling of ultrafiltration membranes", Journal of Membrane Science 108:79-87 (1995).
Jouany C., "Surface Free Energy Components of Clay-Synthetic Humic Acid Complexes From Contact-Angle Measurements", Clays and Clay Minerals 39(1):43-49 (1991).
Kim et al., "The effect of ZnCl2 on the formation of polysulfone membrane", Journal of Membrane Science 119:59-64 (1996).
Kim et al., "Investigation on methanol permeability of Nafion modified by self-assembled clay-nanocomposite multilayers", Electrochimica Acta 50:659-662 (2004).
Kim et al., "The use of nanoparticles in polymeric and ceramic membrane structures: Review of manufacturing procedures and performance improvement for water treatment", Environmental Pollution 158:2335-2349 (2010).
Li et al., "Effect of TiO2 nanoparticles on the surface morphology and performance of microporous PES membrane", Applied Surface Science 255:4725-4732 (2009).
Liu et al., "Progress in the production and modification of PVDF membranes", Journal of Membrane Science 375:1-27 (2011).
Maximous et al., "Preparation, characterization and performance of Al2O3/PES membrane for wastewater filtration", Journal of Membrane Science 341:67-75 (2009).
Maximous et al., "Optimization of Al2O3/PES membranes for wastewater filtration", Separation and Purification Technology 73:294-301 (2010).
Monticelli et al., "Preparation and Properties of Polysulfone—Clay Composite Membranes", Journal of Applied Polymer Science 103:3637-3644 (2007).
Nako S., "Determination of pore size and pore size distribution 3. Filtration membranes", Journal of Membrane Science 96:131-165 (1994).
Ng et al., "Polymeric membranes incorporated with metal/metal oxide nanoparticles: A comprehensive review," Desalination 308:15-33 (2013).
Porter M., "Ultrafiltration, Chapter 3—Handbook of Industrial Membrane Technology", Noyes Publications 136-259 (1990).
Qin et al., "A high flux ultrafiltration membrane spun from PSU/ PVP (K90)/DMF/1,2-propanediol", Journal of Membrane Science 211:139-147 (2003).
Rahimpour et al., "The effect of anionic, non-ionic and cationic surfactants on morphology and performance of polyethersulfone ultrafiltration membranes for milk concentration", Journal of Membrane Science 296:110-121 (2007).
Rahimpour et al., "Fabrication of polyethersulfone (PES) membranes with nano-porous surface using potassium perchlorate (KClO4) as an additive in the casting solution", Desalination 258:79-86 (2010).
Shawky et al., "Synthesis and characterization of a carbon nanotube/polymer nanocomposite membrane for water treatment", Desalination 272:46-50 (2011).
Shen et al., "Preparation and characterization of PES-SiO2 organic—inorganic composite ultrafiltration membrane for raw water pretreatment", Chemical Engineering Journal 168:1272-1278 (2011).
Susanto et al., "Characteristics, performance and stability of polyethersulfone ultrafiltration membranes prepared by phase separation method using different macromolecular additives", Journal of Membrane Science 327:125-135 (2009).
Van Der Marel et al., "Influence of membrane properties on fouling in submerged membrane bioreactors", Journal of Membrane Science 348:66-74 (2010).
Wu et al., "Preparation and characterization of PES/TiO2 composite membranes", Applied Surface Science 254:7080-7086 (2008).
Xu et al., "Polyethersulfone (PES) hollow fiber ultrafiltration membranes prepared by PES/non-solvent/NMP solution", Journal of Membrane Science 233:101-111 (2004).

(56) References Cited

OTHER PUBLICATIONS

Yuliwati et al., "Effect of additives concentration on the surface properties and performance of PVDF ultrafiltration membranes for refinery produced wastewater treatment", Desalination 273:226-234 (2011).

Zhao et al., "Modification of polyethersulfone membrane by blending semi-interpenetrating network polymeric—nanoparticles", Journal of Membrane Science 369:258-266 (2011).

* cited by examiner

POLYETHERSULFONE FILTRATION MEMBRANE

CROSS REFERENCE TO RELATED APPLICATIONS

This application is a 35 U.S.C. §371 National Phase Entry Application of International Application No. PCT/US2013/030408 filed Mar. 12, 2013, which designates the U.S., and which claims benefit under 35 U.S.C. §119(e) of the U.S. Provisional Application No. 61/614,164, filed Mar. 22, 2012, the content of which is incorporated herein by reference in its entirety.

FIELD OF THE INVENTION

The present invention is directed to improved filtration membranes. Furthermore, the disclosure is directed to a method of manufacturing filtration membranes and use of such membranes for the removal of substances from fluids or substances.

BACKGROUND OF THE INVENTION

Since its inception, membrane technology has played an important role towards improving the performance of a large number of industrial processes. Membranes may be considered one of the most versatile separation technologies available today as they may be successfully adapted for a wide range of applications involving solid/liquid, gas/gas, gas/liquid, and liquid/liquid separation processes. See for example, O. O Hart, R. C. Squires, The role of membrane technology in industrial water and wastewater treatment, Desalination, 56 (1985) 69-87; Y. Lee, S. Ahmed, Membrane technologies: Industry trends and applications, Membrane Technology, 98 (1998) 11-12; Ann-Sofi Jönsson, Gun Trägardh, Ultrafiltration applications, Desalination, 77 (1990) 135-179; and E. Drioli, E. Fontananova, Membrane technology and sustainable growth, Chemical Engineering Research and Design, 82(A12-2004) 1557-1562. One such application is water treatment. Due to population growth and urbanization, the resulting increase in global water scarcity and decrease in source water quality are expected to be followed by significant growth in the application of membrane separation processes for drinking water and wastewater treatment. According to a report prepared by the Freedonia Group (The Freedonia Group, Executive summary, World membrane separation technologies—Industry Study with Forecasts for 2012 & 2017. Study #2468, April 2009), the world membrane market in 2012 is predicted to grow to 15 billion dollars. More than 50% of this value will be related to the water and wastewater treatment markets associated with microfiltration, ultrafiltration, and reverse osmosis membranes. Similar figures were presented in a 2005 study by Leiknes that indicated the area with the greatest potential for market growth were microfiltration and ultrafiltration membranes for membrane bioreactors systems (TorOve Leiknes, Membrane technology in environmental engineering—meeting future demands and challenges of the water and sanitation sector, Desalination, 199 (2006) 12-14).

Even with the high potential for application of microfiltration and ultrafiltration membranes, a number of important scientific and engineering issues still need to be addressed such as the development of membranes with a reduced susceptibility towards fouling and understanding the fundamental processes that control membrane formation, morphology, and performance. Fouling is the complex interaction mechanism between the membrane and the diverse variety of species that are present in natural waters and wastewaters including ions, organics, and colloidal particles. See for example, G. Crozes, C. Anselme, G. Mallevialle, Effect of adsorption of organic matter on fouling of ultrafiltration membranes, Journal of Membrane Science, 84 (1993) 61-77; Ana Rita Costa, Maria Norberto de Pinho, Menachem Elimelech, Mechanisms of colloidal natural organic matter fouling in ultrafiltration, Journal of Membrane Science, 281 (2006) 716-725; and W Gao, Heng Liang, Jun Ma, Mei Han, Zhong-lin Chen, Zheng-shuang Han, Gui-bai Li, Membrane fouling control in ultrafiltration technology for drinking water production: A review, Desalination, 272 (2011) 1-8. Many studies have reported the viability of microfiltration and ultrafiltration for water and wastewater treatment; however, in most cases it was necessary to devise pretreatment and/or operational strategies to overcome the issues with fouling to obtain satisfactory results. See for example, J. C. Mierzwa, I. Hespanhol, M. C. C. da Silva, L. D. B. Rodrigues, C. F. Giorgi, Direct drinking water treatment by spiral-wound ultrafiltration membranes, Desalination, 230 (2008) 41-50; A. W. Zularisam, A. F. Ismail, M. R. Salim, Mimi Sakinah, T. Matsuura, Application of coagulation-ultrafiltration hybrid process for drinking water treatment: Optimization of operating conditions using experimental design, Separation and Purification Technology, 65 (2009) 193-210; A. N. Janssen, J. van Agtmaal, W. B. P. van den Broek, A. J. Geilvoet, H. W. H. Menkveld, J.-C. Schrotter, J. H. J. M. van der Graaf, Prefiltration of wastewater effluent: Effects on foulants and performance during dead-end ultrafiltration, Desalination, 250 (2010) 855-860; and Xing Zheng, Mathias Ernst, Martin Jekel, Stabilizing the performance of ultrafiltration in filtering tertiary effluent—Technical choices and economic comparisons, Journal of Membrane Sciences, 366 (2011) 82-91.

The challenge for synthesizing membranes with higher rejection capacity and higher flux has been pursued for many researchers since the beginning of membrane technology development (Mark C. Porter, Ultrafiltration, Chapter 3—Handbook of industrial membrane technology. Edited by Mark C. Porter, Noyes Publications, 1990). To accomplish this aim, the use of additives in the dope casting solution or in the coagulations bath is widely applied in the phase inversion casting process (Zhen-Liang Xu, F. AlsalhyQusay, Polyethersulfone (PES) hollow fiber ultrafiltration membrane prepared by PES/non-solvent/NMP solution, Journal of Membrane Science, 233 (2004) 101-111 and G. Arthanareeswaran, D. Mohan, M. Raajenthiren, Preparation, characterization and performance studies of ultrafiltration membranes with polymeric additive, Journal of Membrane Science, 250 (2010) 130-138). The use of polyvinylpyrrolidone, polyethylene glycol, and others organic additives is extensively reported to improve polymeric membranes permeability and fouling resistance (Jian-Jun Qin, Fook-Sin Wong, Ying Li, Yu-Tie Liu, A high flux ultrafiltration membrane spun from PSU/PVP(K90)/DMF/1,2-propanediol, Journal of Membrane Science, 211 (2003) 139-147; Anildris, Norashikin Mat Zain, M. Y. Noordin, Synthesis, characterization and performance of asymmetric polyethersulfone (PES) ultrafiltration membranes with polyethylene glycol of different molecular weights as additives, Desalination, 207 (2007) 324-339; HeruSusanto, Mathias Ulbricht, Characteristics, performance and stability of polyethersulfone ultrafiltration membranes prepared by phase separation method using different macromolecular additives, Journal of Membrane Science, 327 (2009) 125-135; and Weifeng Zhao, Jingyum Huang, Baohang Fang, ShengqiangNie, Nan Yi, Baihai Su, Haifeng Li, Changsheng Zhao, Modification of polyethersulfone membrane by blending semi-interpenetrating network polymeric nanoparticles, Journal of Membrane Science, 369 (2011) 258-266). With the advances occurred in the production of nanomaterials, a new generation of nanoparticles-based membranes started to be developed all around the word, as it is described in the work developed by Kim and Van der Bruggen (The use of nanoparticles in polymeric and ceramic membrane structures: Review of manufacturing procedures and performance improvement for water treatment, Environmental Pollution, 158 (2010) 2335-2349). As it was conceived for most additives employed for membrane casting, the use of nanoparticles is intended for improving membrane performance, mainly flux enhancement, and fouling resistance (Law Yong Ng, Abdul Wahab Mohammad, ChoePeng Leo, NidalHilal, Polymeric membranes incorporated with metal/metal oxide nanoparticles: A comprehensive review, Desalination, xxx (2010) xxx-xxx. In press). Considering its outstanding intrinsic chemical, thermal and mechanical properties, polyethersulfone (PES) has been chosen for many researchers as the base polymer for nanocomposite ultrafiltration membranes preparation.

The use of $TiO_2$ nanoparticles for casting PES composite membrane has been reported by Guiping Wu et al. (Preparation and characterization of $PES/TiO_2$ composite membranes, Applied Surface Science, 254 (2008) 7080-7086), with the production of membranes with enhanced performance, such as permeability, and fouling resistance, but with no significative changes in the membrane structure. Similar results were obtained by Jing-Feng Li et al. (Effect of $TiO_2$ nanoparticles on the surface morphology and performance of microporous PES membranes, Applied Surface Sciences, 255 (2009) 4725-4732), but some changes in membranes structure had been observed. In the work developed by Jiang-nan Chen et al. (Preparation and characterization of $PES/SiO_2$ organic-inorganic composite ultrafiltration membrane for raw water pretreatment, Chemical Engineering Journal, 168 (2011) 1272-1278) it is reported that the use of $SiO_2$ nanoparticles for casting PES composite membranes was effective for increasing membrane permeability and fouling resistance, but no obviously changes in membranes structure were observed. The use of $Al_2O_3$ nanoparticles for PES ultrafiltration membrane casting was evaluated by NermemMaximous et al. (Preparation, characterization and performance of $Al_2O_3$/PES membrane for wastewater filtration, Journal of Membrane Science, 34 (2009) 67-75), indicating that the use of these nanoparticles is effective for improving membrane permeability and fouling resistance, but there is no mention about the correlation with the membrane structure. In a different work, NermemMaximous et al. (Optimization of $Al_2O_3$/PES membranes for wastewater filtration, Separation and Purification Technology 73 (2010) 294-301) focused on the optimization of PES and $Al_2O_3$ nanoparticles composite membranes for wastewater treatment, obtaining similar results for membrane permeability and fouling resistance when $Al_2O_3$ nanoparticles were incorporated in the membrane. In an attempt to overcome the difficulties associated to the synthesis and application of nanocomposite membranes, StefenBalta et al. (The alternative of ZnO, Journal of Membrane Science, xxx (2011) xxx-xxx. In press), proposed the use of ZnO as an alternative to $TiO_2$ nanoparticles for improving PES membrane performance. Results of this work showed that ZnO nanoparticles can improve membrane permeability and fouling resistance, but no definitive conclusions were drawn about the influence of membrane structure changes on these results. Many other works related to the use of nanomaterials for improving membranes performance using different polymers are also available elsewhere, all of them reporting some improvement in the membrane performance when variable amounts of specific nanoparticles are used in the casting process. See for example, Fu Liu, N. AwanisHashim, Yutie Liu, M. R. Moghareh Abed, K. Li, Progress in the production and modification of PVDF membranes, Journal of Membrane Science 375 (2011) 1-27; A. L. Ahmad, M. A. Majid, B. S. Ooi, Functionalized $PSf/SiO2$ nanocomposite membrane for oil-in-water emulsion separation, Desalination 268 (2011) 266-269; and Hosam A. Shawky, So-RyongChae, Shihong Lin, Mark R. Wiesner, Synthesis and characterization of a carbon nanotube/polymer nanocomposite membrane for water treatment, Desalination 272 (2011) 46-50.

The use of clay nanoparticles for the fabrication of composite membranes for water treatment is not extensively available in the literature. Clay nanoparticles have been successfully applied in the production of membranes for fuel cells (Dong Wook Kim, Hwa-Sup Choi, Changjin Lee, A. Blumstein, Yongku Kang, Investigation of methanol permeability of Nafion modified by self-assembled clay-nanocomposite multilayers, Electrochimica Acta 50 (2004) 659-662 and Rafael Herrera Alonso, Luis Estevez, HuiqinLian, AntoniosKelarakis, Emmanuel P. Giannelis, Nafion-clay nanocomposite membranes: Morphology and properties, Polymer 50 (2009) 2402-2410), and for gas separation (Guillaume Defontaine, Anne Barichard, SadokLetaief, ChaoyangFeng, Takeshi Matsuura, Christian Detellier, Nanoporous polymer—Clay hybrid membranes for gas separation, Journal of Colloid and Interface Science 343 (2010) 622-627). One of the first works on using modified and unmodified clay for Polysulfone (PSI) ultrafiltration composite membrane casting was developed by Orietta-Monticelli et al. (OriettaMonticelli, Aldo Bottino, Ivan Scandale, Gustavo Capanelli, Saverio Russo, Preparation and properties of polysulfone-clay composite membranes, Journal of Applied Polymer Science 103 (2007) 3637-3644). In their work, membranes with increased permeability were obtained, with the higher increases for the membranes casted with modified clays. However, no specific correlation between membrane structure and permeability changes was presented, in comparison to the neat membrane. Another work where modified clay has been used as an additive for PSf composite membrane casting was developed by PriscilaAnadao et al. (Montmorillonite as a component of polysulfone nanocomposite membranes, Applied Clay Science 48 (2010) 127-132), but the focus of their work was related only to the changes in membrane morphology, thermal, mechanical and hydrophilic properties. No performance evaluations tests were carried out. The most recent work about clay and PES nanocomposite membranes was developed by NeginGhaemi et al. (Preparation, characterization and performance of polyethersulfone/organically modified montmorillonite nanocomposite membranes in removal of pesticides, Journal of Membrane Science 382 (2011) 135-147). In this work it is reported that increasing of organically modified clay concentration, up to 4%, results in significative changes in the membrane skin layer, and sub-layer, increasing the membrane permeability. It is also reported an increase in the pesticide retention capacity, with no significative changes in pore size.

Thus, the development of membranes with a lower susceptibility for fouling is of great need. There is also the challenge of rationally synthesizing membranes with increased flux and rejection capacity—a goal of many researchers since the beginning of membrane technology development (Mark C. Porter, Ultrafiltration, Chapter 3—Handbook of industrial membrane technology. Edited by Mark C. Porter, Noyes Publications, 1990). To accomplish this goal when forming membranes via phase inversion, one strategy is to use additives in the casting solution or in the coagulation bath (Zhen-Liang Xu, F. Alsalhy Qusay, Polyethersulfone (PES) hollow fiber ultrafiltration membrane prepared by PES/non-solvent/NMP solution, Journal of Membrane Science, 233 (2004) 101-111 and G. Arthanareeswaran, D. Mohan, M. Raajenthiren, Preparation, characterization and performance studies of ultrafiltration membranes with polymeric additive, Journal of Membrane Science, 250 (2010) 130-138). For example, the addition of high molecular weight polyvinylpyrrolidone, polyethylene glycol, or other organic additives has been reported to improve membrane permeability and fouling resistance. See for example, (Jian-Jun Qin, Fook-Sin Wong, Ying Li, Yu-Tie Liu, A high flux ultrafiltration membrane spun from PSU/PVP (K90)/DMF/1,2-propanediol, Journal of Membrane Science, 211 (2003) 139-147; Ani Idris, Norashikin Mat Zain, M. Y. Noordin, Synthesis, characterization and performance of asymmetric polyethersulfone (PES) ultrafiltration membranes with polyethylene glycol of different molecular weights as additives, Desalination, 207 (2007) 324-339; Heru Susanto, Mathias Ulbricht, Characteristics, performance and stability of polyethersulfone ultrafiltration membranes prepared by phase separation method using different macromolecular additives, Journal of Membrane Science, 327 (2009) 125-135; and Weifeng Zhao, Jingyum Huang, Baohang Fang, Shengqiang Nie, Nan Yi, Baihai Su, Haifeng Li, Changsheng Zhao, Modification of polyethersulfone membrane by blending semi-interpenetrating network polymeric nanoparticles, Journal of Membrane Science, 369 (2011) 258-266). In comparison to the number of studies related to organic casting solution additives, the number of studies on inorganic salt casting solution dopants is minimal. Thus, research into novel inorganic dopants may result in new methods to control membrane properties and a better understanding of the phase inversion process.

SUMMARY OF THE INVENTION

The inventors have discovered inter alia that using a phosphate anion, sulfate anion, chloride anion, fluoride anion or a nanoclay material as a dopant in manufacturing filtration membranes results in membranes with higher permeability and retentivity compared to a membrane cast without such a dopant. Accordingly, in one aspect provided herein is a method for manufacturing a filtration membrane, the method comprising obtaining a solution comprising: (i) a polymer selected from the group consisting of polyethersulfone (PES), polysulfone, and any combination thereof; and (ii) a dopant selected from the group consisting of a phosphate anion, a sulfate anion, a chloride anion, a fluoride anion, nanoclay, and any combination thereof, and casting the solution to form a film or membrane. While the method is described with reference to PES or polysulfone, it is to be understood that the method can be practiced with any polymer known in the art for preparation of a filtration membrane.

The dopant can be added to the polymer solution in the form of a salt. In some embodiments, anion dopant can be a phosphate anion, e.g. a phosphate salt, or a nanoclay. In some embodiments, the dopant can be sodium hexametaphosphate (SHMP or HMP).

In another aspect, provided herein is a membrane prepared using a method described herein.

In yet another aspect, provided herein is membrane prepared from a solution comprising: (i) polyethersulfone (PES) or polysulfone and (ii) a phosphate salt, a phosphate anion, a sulfate anion, a chloride anion, a fluoride anion, nanoclay, or any combinations thereof.

In yet still another aspect, provided herein is a method for filtering an aqueous fluid, the method comprising causing the fluid to flow through a filtration membrane described herein.

BRIEF DESCRIPTION OF THE DRAWINGS

FIG. 3A, control membrane and membranes with 1% salt additions. FIG. 3B, control membrane and membranes with SHMP (1% to 4%).

FIGS. 4A-4H are cross-sectional SEM images of casted membranes. FIG. 4A, control; FIG. 4B, 1% of SHMP; FIG. 4C, 2% of SHMP; FIG. 4D, 4% of SHMP; FIG. 4E, 1% of $Na_2SO_4$; FIG. 4F, 1% NaCl; FIG. 4G, % of $Na_2CO_3$; and Fig. H, 1% of NaF.

FIG. 6A, control membrane; FIG. 6B, membranes with SHMP addition; and FIG. 6C, membranes with $Na_2SO_4$, NaCl, $Na_2CO_3$ and NaF additions.

FIG. 10A, spread with 100-μm bar coater; and FIG. 10B, spread with 175-μm bar coater.

In FIG. 19A, the diamonds are the values from individual experiments, the small center dot is the mean, and the other two are the range.

DETAILED DESCRIPTION OF THE INVENTION

Figure 1:
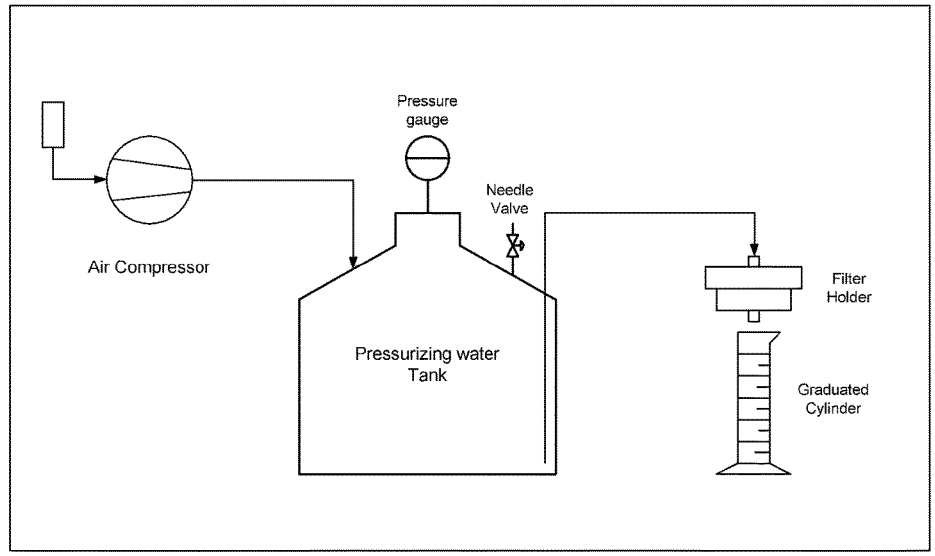
FIG. 1 is a schematic depiction of dead-end filtration setup.

In one aspect, disclosed herein is a method of manufacturing a membrane by (a) providing a solution comprising: (i) a polymer selected from the group consisting of polyethersulfone (PES), polysulfone, and any combinations thereof; and (ii) a dopant selected from the group consisting of a phosphate anion, a sulfate anion, a chloride anion, a fluoride anion, nanoclay, and any combinations thereof, and (b) and casting the solution to form a film or membrane. The method also comprises optionally washing or drying the membrane. The solution used for preparing the film or membrane is also referred to as a casting solution herein.

The casting solution can be formed by any conventional technique capable of forming a solution containing the dissolved polyethersulfone polymer in the solvent and the nanoclay or the phosphate salt. The casting solution can be made by first mixing the solvent, e.g. N-methylpyrrolidone, and the nanoclay or the phosphate salt, with any suitable mixing device, then dissolving the polyethersulfone polymer into the liquid mixture with mixing until a substantially homogenous solution results. However, the precise order of component addition does not matter.

The casting solution can be prepared with known mixing devices that are used to blend solids and liquids into viscous fluids. The mixing time for dissolving the polyethersulfone generally ranges up to about 4 hours for a 5 pound batch. The specific time will depend on the amount of polymer being dissolved, the physical state of the polymer, i.e. powder or pellet, and the type of mixing device. A finely powdered polymer will dissolve more quickly than an extruded pelletized polymer.

The polyethersulfone can be added to the liquids for dissolution at a speed that is sufficient to prevent clumping. The polyethersulfone can be dissolved at a temperature that is sufficiently low to prevent the casting solution from becoming unstable. One skilled in the art will appreciate that the unstable characteristics of the casting solution are reversible when the solution is cooled. Generally the temperature is about room temperature. Some of the casting solutions can become cloudy at temperatures substantially higher than room temperature. Cooling the solution to 20° C. to 25° C. can remove the cloudiness.

After the casting solution has been made, the mix is can be filtered to remove any extraneous particles which can cause a problem in casting the resulting lacquer or produce occlusions in the resulting membrane. Any air bubbles created by the mixing step are also eliminated, preferably by allowing the solution to stand undisturbed prior to being cast into a membrane. Air bubbles can also be removed by sonicating (e.g., in a bath) the solution on degassing the solution under vacuum. Removal of air bubbles can be crucial since bubbles can lead to holes in the membranes.

The method of forming the membrane is not limited and any method known in the art can be used to form the film. Exemplary methods include, but are not limited to, solvent casting, melt pressing, and melt extrusion. In some embodiments, membrane is prepared using solvent casting. Without wishing to be bound by a theory, solvent casting provides a uniform and thin membrane.

In some embodiments, the casting solution is subjected to a diffusion-induced phase separation. The diffusion-induced phase separation can be carried using a solvent phase inversion process known in the art.

As is conventional in the art, membranes can be made by coating the casting solution onto an impervious support. Such a support can be made of any suitable material such as glass, stainless steel, mylar, and the like. The support can be a woven support comprising a polymer for mechanical support. For example, the membrane can be cast onto a woven support made of a polymer like polyester for mechanical support.

In solvent casting, a film blade or a film casting knife can be used. Those give rise to effects of making the film thickness adjustment easy, etc. For example, the casting solution is ordinarily cast onto the substrate by means of a doctor blade with a knife gap. In some embodiments, the solution is spread on the substrate with an automatic film applicator and a bar coater with a thickness of from around a few nanometers to around few millimeters. For example, from about 50 nm to about 1 mm. In some embodiments, thickness is from about 100 μm to about 200 μm.

Temperature in during solvent casting is not particularly limited, but can be, for example, from 0° to 100° C. In some embodiments, the temperature in the solvent casting can be from about 20° C. to about 50° C.

The thin layer of casting solution can then be moved into a coagulation bath. The length of time that the layer of casting solution is exposed to atmospheric conditions before entering the coagulation bath is important in determining the ultimate pore size. Although differing pore sizes can be achieved by altering the composition of the casting solution, it is one aspect of this invention that pore size control can be achieved simply by adjusting this air exposure parameter. For example, by immediate transfer to the precipitation bath a pore size of from about 1 nm to about 10 nm can be achieved. A delay in the transfer of up to 60 seconds or so will yield, from the same casting solution, pore sizes of up to 1 micron. Polyethersulfone or polysulfone solutions can be very sensitive to water vapor and it is preferable that the air is not overly humid. The thin layer of casting solution can be kept in the coagulation bath from about 1 minute to about 1 hour.

After the membrane is fully precipitated it can be rinsed free of any residuals and dried using known techniques. For example, formed membrane can be put in a water bath for removal of residuals such as solvent. The water bath treatment can last for anywhere from a few hours to a day or more. For example, the water treatment can be for 6, 7, 8, 9, 10, 11, 12, 13, 14, 15, 16, 17, 18, 19, 21, 22, 23, 24, or more hours.

Temperature of the water bath is not particularly limited, but can be, for example, from about 10° to 80° C. In some embodiments, temperature of the water bath can be from about 25° C. to about 35° C. In one embodiment, temperature of the water bath can be about 30° C.

The polyethersulfone used for preparing the membrane can be any polyethersulfone polymer capable of being used in the casting solution in accordance with the method described herein. Exemplary polyethersulfones include, but are not limited to, those known with the trade name VERADEL 3000P from Solvay Advanced Polymer, ULTRASON E from BASF, RADEL-A from AMOCO Chemicals and the like.

Similarly, the polysulfone used for preparing the membrane can be any polysulfone polymer capable of being used in the casting solution in accordance with the method described herein. Exemplary polysulfones includes, but are not limited to, those available from Solvay Advanced Polymers, BASF, and PolyOne Corporation.

A polyethersulfone or polysulfone polymer for use in a method described herein can be of any molecular weight. For example, a polyethersulfone or polysulfone can have an average molecular weight or weight-average molecular weight in the range of about 1,000 g/mol to about 1,000,000 g/mol. In some embodiments, the polyethersulfone or polysulfone can be of average molecular or weight-average molecular weight between a range having a lower limit of about 10,000; 20,000; 25,000; 30,000; 35,000; 40,000; 45,000; 50,000; 55,000; 60,000; 65,000; 70,000; 75,000; 80,000; 85,000; 90,000; 95,000; 100,000; 150,000; 200,000; or 250,000 g/mol and an upper limit of 20,000; 25,000; 30,000; 35,000; 40,000; 45,000; 50,000; 55,000; 60,000; 65,000; 70,000; 75,000; 80,000; 85,000; 90,000; 95,000; 100,000; 150,000; 200,000; 250,000; 300,000; 350,000; 400,000; 450,000; or 500,000 g/mol. In some embodiments, the polyethersulfone or polysulfone can be of average molecular or weight-average molecular weight between 60,000 g/mol to about 65,000 g/mol. In one embodiment, polyethersulfone or polysulfone can be of average molecular or weight-average molecular weight of about 63,000 g/mol.

A polyethersulfone or polysulfone polymer can also be characterized by its number-average molecular weight. For example, a polyethersulfone or polysulfone can have a number-average molecular weight in the range of about 1,000 g/mol to about 1000,000 g/mol. In some embodiments, the polyethersulfone or polysulfone can be of number-average molecular weight between a range having a lower limit of about 1,000; 1,500; 2,000; 2,500; 3,000; 3,500; 4,000; 4,500; 5,000; 5,500; 6,000; 6,500; 7,000; 7,500; 8,000; 8,500; 9,000; 9,500; 10,000; 20,000; 25,000; 30,000; 35,000; 40,000; 45,000; 50,000; 55,000; 60,000; 65,000; 70,000; 75,000; 80,000; 85,000; 90,000; 95,000; 100,000; 150,000; 200,000; or 250,000 g/mol and an upper limit of 1,500; 2,000; 2,500; 3,000; 3,500; 4,000; 4,500; 5,000; 5,500; 6,000; 6,500; 7,000; 7,500; 8,000; 8,500; 9,000; 9,500; 10,000; 20,000; 25,000, 30,000; 35,000; 40,000; 45,000; 50,000; 55,000; 60,000; 65,000; 70,000; 75,000; 80,000; 85,000; 90,000; 95,000; 100,000; 150,000; 200,000; 250,000; 300,000; 350,000; 400,000; 450,000; or 500,000 g/mol. In some embodiments, the polyethersulfone or polysulfone can be of number-average molecular weight between 15,000 g/mol to about 25,000 g/mol. In one embodiment, polyethersulfone or polysulfone can be of number-average molecular weight of about 19,000 g/mol.

The weight-average molecular weight/number-average molecular weight ratio is a measure of a molecular weight distribution, and the larger this molecular weight ratio, the wider the molecular weight distribution. For use in a method described herein, a polyethersulfone or polysulfone can have a weight-average molecular weight/number-average molecular weight ratio about 1 to about 20. For example, the weight-average molecular weight/number-average molecular weight ratio can be in the range with a lower limit of about 1, 1.25, 1.5, 1.75, 2, 2.25, 2.5, 2.75, 3, 3.25, 3.5, 3.75, 4, 4.5, 5, 6, 7, 8, 9, 10, 11, 12, 13, 14, or 15 and an upper limit of about 1.25, 1.5, 1.75, 2, 2.25, 2.5, 2.75, 3, 3.25, 3.5, 3.75, 4, 4.5, 5, 6, 7, 8, 9, 10, 11, 12, 13, 14, 15, or 20.

Without limitations, the polymer (e.g., polyethersulfone or polysulfone) can be present in the solution in amount. Generally, the polymer is present the solution in an amount from about 0.01 to about 50 wt % based on the total weight of the solution comprising only the polymer and the solvent. In some embodiments, the polymer is present in the solution in an amount in the range with a lower limit of about 0.01, 0.05, 1, 1.5, 2, 2.5, 3, 3.5, 4, 4.5, 5, 5.5, 6, 6.5, 7, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, or 29.5 wt % and an upper limit of 0.05, 1, 1.5, 2, 2.5, 3, 3.5, 4, 4.5, 5, 5.5, 6, 6.5, 7, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5 or 30 wt % based on the total weight of the solution. In one embodiment, the polyethersulfone or polysulfone can be present the solution at an amount of about 18 wt % of the total solution comprising only the polyethersulfone or polysulfone and the solvent.

Any suitable solvent for preparing the solution can be used. The solvent used for the solution is not particularly limited so far as it uniformly dissolves the polyethersulfone or polysulfone and any additives. Exemplary solvents include, but are not limited to, aromatic hydrocarbons, alcohol, ketones, ethers, alkylene glycol monoalkyl ethers, nitrogen containing hydrocarbons, sulfur containing hydrocarbons, and the like. A solvent can be used alone or as a mixture of with two or more other solvents.

Examples of solvents include, but are not limited to, benzene; toluene; xylene; methanol; ethanol; n-propanol; isopropanol; n-butanol; t-butanol; n-pentanol; n-hexanol; cyclohexanol; octanol; acetone; methyl-ethyl-ketone; cyclohexanone; diethyl ether; tetrahydrofuran; dioxane; diglyme; triglyme; ethylene glycol monomethyl ether; ethylene glycol monoethyl ether; propylene glycol monomethyl ether; propylene glycol monoethyl ether; N,N-dimethylformamide; N,N-dimethylacetamide, hexamethylphosphoryltriamide, dimethylsulfoxide, sulfolane, dimethylacetate, dimethylacetamide (DMAc) and pyrrolidones.

In some embodiments, the solvent is a pyrrolidone. A pyrrolidone solvent can be any pyrrolidone based liquid which is can be used for dissolving the polyethersulfone for use in a method described herein. In one embodiment, the pyrrolidone can be 1-methyl-2-pirroloidinone (NMP).

Without limitations, any salt of phosphoric acid known in the art can be used in a method described herein. Accordingly, both primary phosphate salts and secondary phosphate salts can be used. Further, a phosphate salt can comprise any suitable counter cation. A phosphate salt can be a phosphate salt of an alkali or alkaline earth metal. In some embodiments, a phosphate salt is an inorganic salt. As used herein, the term "inorganic salt" refers to a compound that does not include any carbon atoms. Some exemplary phosphate salts include, but are not limited to, monopotassium phosphate, tetrapotassium pyrophosphate, potassium tripolyphosphate, monosodium phosphate, disodium phosphate, tetrasodium pyrophosphate, sodium tripolyphosphate, sodium hexametaphosphate, sodium acid pyrophosphate, monoammonium phosphate, and the like. Combinations of different phosphate salts can also be used. In one embodiment, phosphate salt is sodium hexametaphosphate (SHMP).

Similarly, any salt of sulfuric acid, i.e. a sulfate salt, known in the art can be used in a method described herein. A sulfate salt can comprise any suitable counter cation. A sulfate salt can be a sulfate salt of an alkali or alkaline earth metal. In some embodiments, a sulfate salt is an inorganic salt. Combinations of different sulfate salts can also be used. One exemplary sulfate is sodium sulfate.

Further, a fluoride or chloride salt comprise any suitable counter cation. For example, a chloride or fluoride salt can be salt of an alkali or alkaline earth metal. In some embodiments, a chloride or fluoride salt is an inorganic salt. Combinations of different chloride or fluoride salts can also be used. Exemplary chloride and fluoride salts include, but are not limited to, sodium chloride, potassium chloride, sodium fluoride, potassium fluoride, lithium chloride, and the like.

In some embodiments, any combination of phosphate, sulfate, fluoride, and chloride anions can be used.

In some embodiments, phosphate, sulfate, fluoride or chloride salt is an inorganic salt.

Weight % amount of the salt dopant (e.g., phosphate, sulfate, fluoride or chloride salt) in the solution can be calculated based on the total weight of the polymer (e.g., polyethersulfone or polysulfone) and the solvent in the solution or just the polymer alone in the solution. Generally the salt dopant is present in the solution in an amount about 0.01 to about 25 wt %. In some embodiments, the salt dopant is present in the solution in an amount in the range with a lower limit of about 0.01, 0.05, 1, 1.5, 2, 2.5, 3, 3.5, 4, 4.5, 5, 5.5, 6, 6.5, 7, 8, 8.5, 9, or 9.5 wt % and an upper limit of 0.05, 1, 1.5, 2, 2.5, 3, 3.5, 4, 4.5, 5, 5.5, 6, 6.5, 7, 8, 8.5, 9, 9.5, or 10 wt %.

In some embodiments, the salt dopant (e.g., phosphate, sulfate, fluoride or chloride salt) can be present in an amount in the range from about 0.5 to about 5 wt % of t the polymer (e.g., polyethersulfone or polysulfone) present in the solution. In one embodiment, the phosphate, sulfate, fluoride or chloride salt can be present in an amount of about 0.5, 1, 2, 2.5, 3, 4, or 5 wt % of the polyethersulfone or polysulfone present in the solution.

In some embodiments, the dopant can be selected from the group consisting of hexametaphosphate (HMP), sodium trimetaphosphate ((NaPO$_3$)$_3$, TMP), sodium triphosphate (Na$_5$P$_3$O$_{10}$, TP), sodium phosphate, (Na$_3$PO$_4$, Na3P) and sodium phosphate dibasic (Na$_2$HPO$_4$, Na2HP).

It has now been found that integration of nanoclay into the PES or polysulfone solution results in membranes having improved properties. Nanoclays (nanosized clays) are nanoparticles of layered mineral silicates. Depending on chemical composition and nanoparticle morphology, nanoclays are organized into several classes such as montmorillonite, bentonite, kaolinite, hectorite, and halloysite. Organically-modified nanoclays (organoclays) are an attractive class of hybrid organic-inorganic nanomaterials with potential uses in polymer nanocomposites, as rheological modifiers, gas absorbents and drug delivery carriers. Clay can be modified to be more hydrophilic. Hydrophilic clays can be used as additive or catalyst to improve membrane properties. One can also exchange the cations in the clay to change the properties of the clay. For example, Ag$^+$ can be added to provide antimicrobial properties to the clay. In another example, Fe$^{2+}$ can be added to mediate production of reactive oxygen species (ROS).

Generally, the clay mineral can be selected from smectite, vermiculite and halloysite clays. The smectite clay in turn can be selected from montmorillonite, saponite, beidellite, nontrite, hectorite and mixtures thereof. Plate-like montmorillonite, a layered aluminosilicate, is the most common nanoclay used in materials applications. The nanoclay platelets generally have a thickness of about 3 to about 1,000 Angstroms and a size in the planar direction ranging from about 0.01 micron to about 100 microns. In some embodiments, the nanoclay platelets have a size in the planar direction ranging with a lower limit of about 10, 15, 20, 25, 30, 35, 40, 50, 60, 70, 80, 90, 100, 110, 120, 130, 140, or 150 nm to a upper limit of about 20, 30, 40, 50, 60, 70, 80, 90, 100, 150, 200, 250, 300, 350, 400, 450, or 450 nm. In one embodiment, the nanoclay platelets have a size in the planar direction in the range of about 50 to about 200 nm.

The aspect ratio (length versus thickness) for the nanoclay platelets can be generally in the order of 1 to 10,000. These clay platelets are separated by a gallery, a space between parallel layers of clay platelets containing various ions holding platelets together. In some embodiments, the aspect ratio can be in the order of about 100 to about 300. In one embodiment, the aspect ratio can be in the order of about 150 to about 200.

In some embodiments, nanoclay can be in the form of a nanoparticle. As used herein, the term "nanoparticle" refers to a particle having at least one dimension that can be on the order of 100 nm or less. Examples of nanoparticles include "nanospheres," "nanorods," "nanocups," "nanowires," "nanoclusters," "nanolayers," "nanotubes," "nanocrystals," "nanobeads," "nanobelts," and "nanodisks." The nanoparticles can be, e.g., monodisperse or polydisperse and the variation in size of the particles of a given dispersion can vary, e.g., a particle size of between about 0.1 to 100's of nm.

Exemplary nanoclays include, but are not limited to, those available from Southern Clay Products, such as CLOISITE® 10A, CLOISITE® 11B, CLOISITE® 15A, CLOISITE® 20A, CLOISITE® 30B, CLOISITE® 93A, CLOISITE® CA$^{++}$, NANOFIL® 5, NANOFIL® 15, and NANOFIL® 116.

In one embodiment, nanoclay can be Montmorillonite-PGV® (Nanocor Company). Montmorillonite-PGV® can be obtained as a 5% dispersion, white to gray, 2.55 g/cm$^3$, pH 9-10, aspect ratio of 150-200 and cation exchange capacity of 145 meq./100 g.

Weight % amount of the nanoclay in the solution can be calculated based on the total weight of the polymer (e.g., polyethersulfone or polysulfone) and the solvent in the solution or just the polymer alone in the solution. Generally the nanoclay can be present in the solution in an amount about 0.01 to about 25 wt %. In some embodiments, the nanoclay can be present in the solution in an amount in the range with a lower limit of about 0.01, 0.05, 1, 1.5, 2, 2.5, 3, 3.5, 4, 4.5, 5, 5.5, 6, 6.5, 7, 8, 8.5, 9, or 9.5 wt % and an upper limit of 0.05, 1, 1.5, 2, 2.5, 3, 3.5, 4, 4.5, 5, 5.5, 6, 6.5, 7, 8, 8.5, 9, 9.5, or 10 wt %.

In some embodiments, the nanoclay can be present in an amount in the range from about 0.5 to about 5 wt % of the polymer (e.g., polyethersulfone or polysulfone) present in the solution. In one embodiment, the nanoclay can be present in an amount of about 0.5, 1, 2, 2.5, 3, 4, or 5 wt % of the polymer present in the solution.

In some embodiments, the solution comprises both a salt (e.g., a phosphate salt, sulfate salt, fluoride salt, chloride salt, or any combinations thereof) and nanoclay. When present together, the total weight % amount of the nanoclay and the salt in the solution can be calculated based on the total weight of the polymer and the solvent in the solution or just the polymer alone in the solution. Generally the nanoclay and the salt can be present in the solution in a total amount of about 0.01 to about 25 wt %. In some embodiments, the nanoclay and the salt can be present in the solution in a total amount in the range with a lower limit of about 0.01, 0.05, 1, 1.5, 2, 2.5, 3, 3.5, 4, 4.5, 5, 5.5, 6, 6.5, 7, 8, 8.5, 9, or 9.5 wt % and an upper limit of 0.05, 1, 1.5, 2, 2.5, 3, 3.5, 4, 4.5, 5, 5.5, 6, 6.5, 7, 8, 8.5, 9, 9.5, or 10 wt %.

In some embodiments, the nanoclay and the salt can be present in present in a total amount in the range from about 0.5 to about 5 wt % of the polyethersulfone or polysulfone present in the solution. In one embodiment, the nanoclay and the salt can be present in a total amount of about 0.5, 1, 2, 2.5, 3, 4, or 5 wt % of the polyethersulfone or polysulfone present in the solution.

When present together, the nanoclay and the salt can be present in any ratio. For example, the nanoclay and the salt can be present in a ratio from about 10:1 to about 10:1. The ratio can be based on weight or moles. In some embodiments, the nanoclay and the salt are present in a ratio from about 5:1 to about 5:1. In one embodiment, the nanoclay and the salt are present in a 1:1 ratio.

In some embodiments, the solution comprises both a phosphate salt and the nanoclay.

In addition to the nanoclay and/or a salt, the solution can comprise one or more other additives. For example, other polymers, such as polyvinylpyrrolidones, polyethyleneglycols, polyethylene oxides and the like can be added to the solution. U.S. Pat. No. 4,416,144, content of which is incorporated herein, further identifies polymers that can be added to the solution. Additive polymers are generally used in amounts which do not change the hydrophobic character of the resulting cast membrane. Without limitations, a polymer to be added as an additive can be hydrophilic, hydrophobic, or amphiphilic.

In some embodiments, the additional additive can be a pore former. Generally, a pore former can be a water soluble polymer. Without wishing to be bound by a theory, when the polymer film is immersed in water coagulation bath, the pore forming polymer is dissolved, rather than precipitate, resulting in pores. Any hydrophilic polymer can be used as a pore former.

Other exemplary additives include, but are not limited to, nanoparticulate additives such as $Al_2O_3$, $TiO_2$, $SiO_2$, carbon nanoparticles, nanosilver, and the like. Without wishing to be bound by a theory, these can be added to increase hydrophilicity of the membrane or impart reactivity to the membrane. Kim and Van der Bruggen (Environmental Pollution, 158 (2010) 2335-2349), content of which is incorporated herein by reference, describes nanomaterials for use as additives which can also be used in the methods described herein.

In some embodiments, the solution does not comprise any further additives.

A membrane produced by a method described herein generally has a thickness between about 1 nm to about 100's of mm. Generally, the membrane has a thickness in the range with a lower limit of about 5, 10, 20, 30, 40, 50, 60, 70, 80, 90, 100, 150 or 200 µm to an upper limit of about 10, 20, 30, 40, 50, 60, 70, 80, 90, 100, 150, 200, 250, 300, 350, 400, 450, or 450 µm. In some embodiments, the membrane has a thickness of from 50 to about 70 µm. In one embodiment, the membrane has a thickness for from about 55 to about 60 µm. In one embodiment, the membrane has a thickness of about 50 µm.

Membrane pore structure can be a relevant morphological characteristic that can be used in association with others membrane properties to predict performance. For example, a membrane can have a pore structure that is finger-like, i.e. continuous pores which can be straight or not. Without wishing to be bound by a theory, a finger-like pore structure results in a lower membrane resistance to fluid flow. The pore structure and size can be optimized by varying the amount of nanoclay and/or phosphate salt in the solution used for casting the membrane.

Generally, a membrane produced by a method described herein has pores in the size in the range from about 0.1 nm to about 50 µm. For example, the pore size can be in the range with a lower limit of about 1, 2, 3, 4, 5, 6, 7, 8, 9, 10, 11, 12, 13, 14, 15, 16, 17, 18, 19, or 20 nm or µm and an upper limit of about 2, 3, 4, 5, 6, 7, 8, 9, 10, 11, 12, 13, 14, 15, 16, 17, 18, 19, 20, 25, 30, 35, 40, 45, or 50 nm or µm. In one embodiment, the pore can range in size range from about 1 nm to about 15 nm or from about 2.5 nm to about 12.5 nm, or from about 5 nm to about 10 nm.

Porosity of the membrane produced by a method described herein can range from about 25% to about 85%. For example, membrane porosity can be in the range with a lower limit of about 25, 30, 35, 44, 45, 50, 55, 60, 65, or 70 percent to an upper limit of about 25, 30, 35, 40, 45, 50, 55, 60, 65, 70, 75, or 80 percent. In some embodiments, membrane porosity can be in the range of about 60% to about 75%. In one embodiment, membrane porosity can be in the range of about 62% to about 72%. Porosity of the membrane can be determined using methods well known in the art.

The selective characteristic of a membrane can be defined in terms of its molecular weight cutoff. The term "molecular weight cutoff" (MWCO) refers to the size or molecular weight of particles which are retained by a particular membrane under convective or pressure driven conditions. Since membranes generally have a Gaussian distribution of pore sizes, the term MWCO as used herein refers to the size of a marker molecule when tested with a specific membrane, 90% of which is retained by the membrane under the test condition. Specifically, while the majority of pores in a membrane can be large enough to retain a given particle, some pores can exist which are large enough for the molecule to pass through. Thus, the MWCO of a given membrane is not an absolute and can differ somewhat when measured using different tests. While particles of a particular size, if large enough, can be completely retained for a given period of time, there is a range of particle sizes where a portion of particles will be retained and a portion will be released. If, for example, 60% of particles having a molecular weight of about 50 kD are retained by a given membrane, then a greater percentage of particles that are larger than 50 kD will be retained by the same membrane given the same time period. The term "nominal MWCO" (nMWCO) refers to the size of particles retained by a membrane at 90% levels. Thus, for example, if 100 kD particles are retained by a membrane at 90% levels, the nMWCO of the membrane is 100 kD.

There are several different methods for measuring nMWCO, which can give different results. Tests can be diffusive or convective. Convective methods measure transmembrane diffusion under pressure. The convective nMWCO is a good indicator of how quickly molecules will passively diffuse from the membrane. When testing nMWCO, it is important to realize that the shape and nature of the molecule used in testing can influence the measured values. Thus, when comparing data from various sources, it is important to consider the test method employed to obtain the values.

Generally, a membrane produced by a method described herein can have a MWCO in the range of about 10 kg/mol to about 150 kg/mol. For example, a membrane can have a MWCO in a range from a lower limit of about 10, 20, 30, 40, 50, 60, 70, 80, or 90 kg/mol to an upper limit of about 20, 30, 40, 50, 60, 70, 80, 90, 100, 110, 120, 130, 140, or 150 kg/mol. In one embodiment, the membrane can have a MWCO in the range of from about 40 to about 50 kg/ml or from about 50 to about 60 kg/ml or from about 90 to about 100 kg/mol.

The membrane produced by a method described herein generally can have a water flow rate equal to or better than currently available commercial filter of similar pore diameter rating. Accordingly, water flow can be from zero (i.e. no flow) to 1000's $L.h^{-1}.m^{-2}.bar^{-1}$. For example, the water flow rate can be at least 0.01 $L.h^{-1}.m^{-2}.bar^{-1}$, at least 1 $L.h^{-1}.m^{-2}.bar^{-1}$, at least 10 $L.h^{-1}.m^{-2}.bar^{-1}$, at least 100 $L.h^{-1}.m^{-2}.bar^{-1}$, at least 150 $L.h^{-1}.m^{-2}.bar^{-1}$, at least 200 $L.h^{-1}.m^{-2}.bar^{-1}$, at least 250 $L.h^{-1}.m^{-2}.bar^{-1}$, at least 300 $L.h^{-1}.m^{-2}.bar^{-1}$, at least 400 $L.h^{-1}.m^{-2}.bar^{-1}$, at least 500 $L.h^{-1}.m^{-2}.bar^{-1}$, at least 600 $L.h^{-1}.m^{-2}.bar^{-1}$, at least 700 $L.h^{-1}.m^{-2}.bar^{-1}$, at least 800 $L.h^{-1}.m^{-2}.bar^{-1}$, at least 900 $L.h^{-1}.m^{-2}.bar^{-1}$, at least 1000 $L.h^{-1}.m^{-2}.bar^{-1}$, at least 2000 $L.h^{-1}.m^{-2}.bar^{-1}$, at least 3000 $L.h^{-1}.m^{-2}.bar^{-1}$, at least 4000 $L.h^{-1}.m^{-2}.bar^{-1}$, at least 5000 $L.h^{-1}.m^{-2}.bar^{-1}$, at least 6000 $L.h^{-1}.m^{-2}.bar^{-1}$, at least 7000 $L.h^{-1}.m^{-2}.bar^{-1}$, at least 8000 $L.h^{-1}.m^{-2}.bar^{-1}$, at least 9000 $L.h^{-1}.m^{-2}.bar^{-1}$, at least 10000 $L.h^{-1}.m^{-2}.bar^{-1}$ or more. In some embodiments, the water flow rate is from about 250 to about 700 $L.h^{-1}.m^{-2}.bar^{-1}$. In reverse osmosis, water flow is around 1 $L.h^{-1}.m^{-2}.bar^{-1}$.

Without limitations, the membrane can be configured as a capillary, hollow fiber, spiral-wound, tubular membrane or any combination thereof or in any other appropriate configuration. Additionally, the membrane can be adapted to allow the flow of permeate from the outer side to the inner side of the membrane. The membrane can be adapted to allow the flow of permeate from the inner side to the outer side of the composite membrane.

In another aspect, provided herein is a membrane prepared using a method described herein.

A membrane produced by a method described herein can be used in any filtration technique known in the art. Exemplary uses for the membrane include, but are not limited to, filtration, micro-filtration, ultrafiltration, nanofiltration, reverse osmosis, dialysis, separation and any combinations thereof. Without limitations, a membrane described herein can be applied in any field where filtration or separation is required, for example, in water treatment (e.g., waste water treatment, drinking water treatment, and municipal water treatment), separations in the food and beverage, paper, and semiconductor industries.

Accordingly, in yet another aspect, provided herein is a process for filtering an aqueous fluid. The process comprising causing the fluid to flow through the membrane. Thus, a membrane produced by a method described herein can be a micro-filtration, an ultrafiltration, a nanofiltration, a dialysis membrane, or a reverse osmosis membrane.

The fluid to be filtered can be a liquid or a gas. In some embodiments, the fluid can include a biological fluid. The terms "biological fluid" and "biofluid" are used interchangeably herein and refer to aqueous fluids of biological origin or fluids including components of biological origin, including solutions, suspensions, dispersions, and gels, and thus may or may not contain undissolved particulate matter. Exemplary biological fluids include, but are not limited to, blood (including whole blood, plasma, cord blood and serum), lactation products (e.g., milk), amniotic fluids, sputum, saliva, urine, semen, cerebrospinal fluid, bronchial aspirate, perspiration, mucus, liquefied feces, synovial fluid, lymphatic fluid, tears, tracheal aspirate, and fractions thereof.

Another example of a group of biological fluids include cell culture fluids, including those obtained by culturing or fermentation, for example, of single- or multi-cell organisms, including prokaryotes (e.g., bacteria) and eukaryotes (e.g., animal cells, plant cells, yeasts, fungi), and including fractions thereof.

Yet another example of a group of biological fluids can include cell lysate fluids including fractions thereof. For example, cells (such as red blood cells, white blood cells, cultured cells) may be harvested and lysed to obtain a cell lysate (e.g., a biological fluid), from which molecules of interest (e.g., hemoglobin, interferon, T-cell growth factor, interleukins) can be separated with the aid of the present invention.

Still another example of a group of biological fluids can include culture media fluids including fractions thereof. For example, culture media comprising biological products (e.g., proteins secreted by cells cultured therein) may be collected and molecules of interest separated therefrom with the aid of the present invention.

In some embodiments, the fluid can be a non-biological fluid. As used herein, the term "non-biological fluid" refers to any aqueous, non-aqueous or gaseous sample that is not a biological fluid as the term is defined herein. Exemplary non-biological fluids include, but are not limited to, water, salt water, brine, waste water, municipal water, organic solvents such as alcohols (e.g., methanol, ethanol, isopropyl alcohol, butanol, etc.), saline solutions, sugar solutions, carbohydrate solutions, lipid solutions, nucleic acid solutions, hydrocarbons (e.g. liquid hydrocarbons), acids, gasolines, petroleum, liquefied samples (e.g., liquefied foods), gases (e.g., oxygen, $CO_2$, air, nitrogen, or an inert gas), and mixtures thereof.

In some embodiments, the fluid can be a media or reagent solution used in a laboratory or clinical setting, such as for biomedical and molecular biology applications. As used herein, the term "media" refers to a medium for maintaining a tissue or cell population, or culturing a cell population (e.g. "culture media") containing nutrients that maintain cell viability and support proliferation. The cell culture medium can contain any of the following in an appropriate combination: salt(s), buffer(s), amino acids, glucose or other sugar(s), antibiotics, serum or serum replacement, and other components such as peptide growth factors, etc. Cell culture media ordinarily used for particular cell types are known to those skilled in the art. The media can include media to which cells have been already been added, i.e., media obtained from ongoing cell culture experiments, or in other embodiments, be media prior to the addition of cells.

As used herein, the term "reagent" refers to any solution used in a laboratory or clinical setting for biomedical and molecular biology applications. Reagents include, but are not limited to, saline solutions, PBS solutions, buffer solutions, such as phosphate buffers, EDTA, Tris solutions, and the like. Reagent solutions can be used to create other reagent solutions. For example, Tris solutions and EDTA solutions are combined in specific ratios to create "TE" reagents for use in molecular biology applications.

Embodiments of the invention can be described by one or more of the following numbered paragraphs:

1. A method of manufacturing a filtration membrane, the method comprising: (i) providing a solution comprising: (a) a polymer selected from the group consisting of polyethersulfone (PES), polysulfone, and any combinations thereof; and (b) a dopant selected from the group consisting of a phosphate salt, a sulfate anion, a chloride anion, a fluoride anion, nanoclay, and any combination thereof; and (ii) casting the solution to form a film or membrane.
2. The method of paragraph 1, further comprising washing and subsequently drying the filtration membrane.
3. The method of paragraph 1 or 2, wherein said casting the solution comprising subjecting the solution to a diffusion induced phase separation;
4. The method of paragraph 3, wherein the diffusion-induced phase separation is performed by a solvent phase inversion process.
5. The method of any of paragraphs 1-4, wherein the dopant is sodium hexametaphosphate (SHMP).
6. The method of any of paragraphs 1-5, wherein amount of the dopant in the solution is about 0.1% to about 25% wt/wt of the polymer in the solution.
7. The method of any of paragraphs 1-6, wherein amount of the dopant in the solution is about 0.5% to about 5% wt/wt of the polymer in the solution.
8. The method of any of paragraphs 1-7, wherein amount of the dopant in the solution is about 1% wt/wt of the polymer in the solution.
9. The method of any of paragraphs 1-8, wherein amount of the dopant in the solution is about 2% wt/wt of the polymer in the solution.
10. The method of any of paragraphs 1-9, wherein amount of polymer is about 1% to about 50% wt/wt of the solution.
11. The method of paragraph 10, wherein the amount of polymer is about 5% to about 20% wt/wt of the solution.
12. The method of any of paragraphs 1-11, wherein the solution comprises both the phosphate salt and the nanoclay.
13. The method of paragraph 12, wherein total amount of phosphate salt and nanoclay together is about 0.1% to about 25% wt/wt of the polymer in the solution.
14. The method of paragraph 12 or 13, wherein amount of the phosphate salt is about 0.5% to about 5% wt/wt of the polymer in the solution.
15. The method of paragraph 13, wherein amount of the phosphate salt is about 1% wt/wt of the polymer in the solution.
16. The method of any of paragraphs 10-15, wherein amount of nanoclay is about 0.5% to about 5% wt/wt of the polymer in the solution.
17. The method of paragraph 16, wherein amount of nanoclay is about 1% wt/wt of the polymer in the solution.
18. The method of any of paragraphs 10-17, wherein amount of phosphate salt is about 1% wt/wt and amount of nanoclay is about 0.5% to about 5% wt/wt of the polymer in the solution.
19. The method of any of paragraphs 10-18, wherein the phosphate salt and the nanoclay are present in a 10:1 to 1:10 ratio by weight or moles.
20. The method paragraph 19, wherein the phosphate salt and the nanoclay are present in a 1:1 ratio by weight or moles
21. The method of any of paragraphs 10-20, wherein amount of phosphate salt is about 1% wt/wt and amount of nanoclay is about 1% wt/wt of the polymer in the solution.
22. The method of any of paragraphs 10-21, wherein total amount of phosphate salt and nanoclay together is about 2% wt/wt of the polymer in the solution.
23. The method of any of paragraphs 1-21, wherein said providing a solution comprising polymer and a dopant comprises preparing the solution comprising the polymer and the dopant.
24. A filtration membrane prepared according to the method of any of paragraphs 1-23.
25. A filtration membrane comprising: (a) a polymer selected from the group consisting of polyethersulfone, polysulfone, and any combinations thereof; and (b) a dopant selected from the group consisting of a phosphate salt, a sulfate anion, a chloride anion, a fluoride anion, nanoclay, and any combination thereof, and casting the solution to form a film or membrane.
26. The filtration membrane of paragraph 24, wherein the dopant is sodium hexametaphosphate (SHMP).
27. The filtration membrane of paragraph 25 or 26, wherein amount of the dopant in the membrane is about 0.1% to about 25% wt/wt of the polymer in the membrane.
28. The filtration membrane of any of paragraphs 25-27, wherein amount of the dopant in the membrane is about 0.5% to about 5% wt/wt of the polymer in the membrane.
29. The filtration membrane of any of paragraphs 25-28, wherein amount of the dopant in the membrane is about 1% wt/wt of the polymer in the membrane.
30. The filtration membrane of any of paragraphs 25-29, wherein amount of the dopant in the membrane is about 2% wt/wt of the polymer in the membrane.
31. The filtration membrane of any of paragraphs 25-30, wherein the membrane comprises both the phosphate salt and the nanoclay.
32. The filtration membrane of paragraph 31, wherein total amount of phosphate salt and nanoclay together is about 0.1% to about 25% wt/wt of the polymer in the membrane.
33. The filtration membrane of paragraph 31 or 32, wherein amount of the phosphate salt is about 0.5% to about 5% wt/wt of the polymer in the membrane.
34. The filtration membrane of paragraph 33, wherein amount of the phosphate salt is about 1% wt/wt of the polymer in the membrane.
35. The filtration membrane of any of paragraphs 31-34, wherein amount of nanoclay is about 0.5% to about 5% wt/wt of the polymer in the membrane.
36. The filtration membrane of paragraph 35, wherein amount of nanoclay is about 1% wt/wt of the polymer in the membrane.
37. The filtration membrane of any of paragraphs 31-36, wherein amount of phosphate salt is about 1% wt/wt and amount of nanoclay is about 0.5% to about 5% wt/wt of the polymer in the membrane.
38. The filtration membrane of any of paragraphs 31-37, wherein the phosphate salt and the nanoclay are present in a 10:1 to 1:10 ratio by weight or moles.
39. The filtration membrane paragraph 38, wherein the phosphate salt and the nanoclay are present in a 1:1 ratio by weight or moles
40. The filtration membrane of any of paragraphs 31-39, wherein amount of phosphate salt is about 1% wt/wt and amount of nanoclay is about 1% wt/wt of the polymer in the membrane.
41. The filtration membrane of any of paragraphs 31-40, wherein total amount of phosphate salt and nanoclay together is about 2% wt/wt of the polymer in the membrane.
42. A filtration membrane prepared from a solution comprising a polymer and a phosphate salt or a nanoclay
43. A process for filtering an aqueous fluid comprising causing the fluid to flow through a filtration membrane of any of paragraphs 24-42.

Some Definitions

Unless stated otherwise, or implicit from context, the following terms and phrases include the meanings provided below. Unless explicitly stated otherwise, or apparent from context, the terms and phrases below do not exclude the meaning that the term or phrase has acquired in the art to which it pertains. The definitions are provided to aid in describing particular embodiments, and are not intended to limit the claimed invention, because the scope of the invention is limited only by the claims. Further, unless otherwise required by context, singular terms shall include pluralities and plural terms shall include the singular.

As used herein the term "comprising" or "comprises" is used in reference to compositions, methods, and respective component(s) thereof, that are useful to the invention, yet open to the inclusion of unspecified elements, whether useful or not.

The singular terms "a," "an," and "the" include plural referents unless context clearly indicates otherwise. Similarly, the word "or" is intended to include "and" unless the context clearly indicates otherwise.

As used herein, the term "about" means 2.5% of the value being referred to. For example, about 10 means from 7.5 to 12.5.

Although methods and materials similar or equivalent to those described herein can be used in the practice or testing of this disclosure, suitable methods and materials are described below. The term "comprises" means "includes." The abbreviation, "e.g." is derived from the Latin exempli gratia, and is used herein to indicate a non-limiting example. Thus, the abbreviation "e.g." is synonymous with the term "for example."

The terms "decrease", "reduced", "reduction", "decrease" or "inhibit" are all used herein generally to mean a decrease by a statistically significant amount. However, for avoidance of doubt, ""reduced", "reduction" or "decrease" or "inhibit" means a decrease by at least 10% as compared to a reference level, for example a decrease by at least about 20%, or at least about 30%, or at least about 40%, or at least about 50%, or at least about 60%, or at least about 70%, or at least about 80%, or at least about 90% or up to and including a 100% decrease (e.g. absent level as compared to a reference sample), or any decrease between 10-100% as compared to a reference level.

The terms "increased", "increase" or "enhance" or "activate" are all used herein to generally mean an increase by a statically significant amount; for the avoidance of any doubt, the terms "increased", "increase" or "enhance" or "activate" means an increase of at least 10% as compared to a reference level, for example an increase of at least about 20%, or at least about 30%, or at least about 40%, or at least about 50%, or at least about 60%, or at least about 70%, or at least about 80%, or at least about 90% or up to and including a 100% increase or any increase between 10-100% as compared to a reference level, or at least about a 2-fold, or at least about a 3-fold, or at least about a 4-fold, or at least about a 5-fold or at least about a 10-fold increase, or any increase between 2-fold and 10-fold or greater as compared to a reference level.

The term "statistically significant" or "significantly" refers to statistical significance and generally means at least two standard deviation (2SD) away from a reference level. The term refers to statistical evidence that there is a difference. It is defined as the probability of making a decision to reject the null hypothesis when the null hypothesis is actually true.

As used herein, the term "micro-filtration" or "MF" refers to a technique that utilizes a low-pressure cross-flow membrane process for separating colloidal and suspended particles in the range of 0.05-10 microns. MF can be used, for example, for fermentation broth clarification and biomass clarification and recovery.

As used herein, the term "ultrafiltration" or "UF" refers to a membrane separation technique used to separate small particles and dissolved molecules in fluids. The primary basis for separation can be molecular size, although other factors, such as but not limited to, molecule shape and charge can also play a role. Molecules larger than the membrane pores will generally be retained at the surface of the membrane and concentrated during the ultrafiltration process. The retention properties of ultrafiltration membranes can be expressed as "Molecular Weight Cutoff" (MWCO). This value can refer to the approximate molecular weight (MW) of a molecule, compound and/or material (such as polymers, proteins, colloids, polysaccharides, suspended solids and/or solutes), which is about 90% or more retained by the membrane. However, a molecule's shape can have a direct effect on its retention by a membrane. For example, linear molecules like DNA can find their way through pores that will retain a globular species of the same molecular weight.

Ultrafiltration membranes can be adapted to let through small molecules (such as water, low-molecular weight organic solutes and salts) and retain high-molecular weight molecules (such as, polymers, proteins, colloids, polysaccharides, and/or suspended solids and solutes of molecular weight greater than 1,000). UF can be performed under pressures up to about 145 psi (10 bar). Ultrafiltration (UF) can also relate a technique that utilizes membranes, such as having micropores of about 1 to 100 nanometer (nm) in diameter.

As used herein, the term "nanofiltration" or "NF" refers to a technique that utilizes membranes that have pores with a diameter of about one nanometer. NF membranes can be adapted to essentially let through monovalent ions and organic compounds with low molecular weight (typically less than about 300 g/mol) and retain multivalent ions (for example, calcium, magnesium, aluminum, sulfates ions and others), non-ionized organic compounds (for example solutes) with high molecular weight (typically higher than about 300 g/mol) and suspended solids. Typically, NF membranes' selectivity is characterized by separations of monovalent and divalent salts and organic solutes of molecular weights up to 1000.

Nanofiltration can be used in water softening, fractionation of pharmaceutical fermentation liquors, whey desalting with lactose retention, skim milk concentration, fractionation of sugars, concentration of antibiotics, treatment of surface water and drinking water, municipal waste treatment for agricultural use, and in numerous other industrial uses for treatment of process and waste streams.

As used herein, the term "reverse osmosis" or "RO" refers to a technique that utilizes dense membranes that allow solvents, typically water, to pass through while retaining any salts. RO can be used, for example, to demineralize water (such as seawater or brine desalting) or for the production of ultrapure water. RO can be performed under high pressures.

As used herein, the term "membrane" refers to a selective barrier that allows specific entities (such as molecules and/or ions) to pass through, while retaining the passage of others. The ability of a membrane to differentiate among entities (based on, for example, their size and/or charge and/or other characteristics) can be referred to as "selectivity". More information regarding membranes may be found, for example, on the internet at www.bccresearch.com/membrane/DMD00.html and www.geafiltration.com/glossary-_flltrafion_terminologies.asp, which are incorporated herein by reference in their entirety.

As used herein, the term "composite membrane" refers to membranes that include more than one material wherein the materials can have different densities.

As used herein, the term "flux" refers to a volume of treated fluid obtained per unit time per unit membrane surface area.

As used herein, the term "permeate" refers to a product, for example liquid, which has passed through a membrane.

As used herein, the term, "retentate" refers to a fraction not passing through the membrane.

As used herein, the term "rejection" refers to a percentage of a substance rejection in a membrane (such as a reverse osmosis membrane) process. The rejection can be calculated, for example, as the percentage of substance which is held back by the membrane. For example, R=1−(Cp/Cb) where R=Rejection, Cp=Concentration in Permeate, Cb=Concentration in Retentate.

The disclosure is further illustrated by the following examples which should not be construed as limiting. The examples are illustrative only, and are not intended to limit, in any manner, any of the aspects described herein.

EXAMPLES

Example 1: Anion Dopant Effects on the Structure and Performance of Polyethersulfone Membranes In regards to previous reports on inorganic salt casting solution dopants, the focus has been on how the metal cation affects the phase inversion thermodynamics and thus the resulting membrane morphology. Effects of inorganic salt dopants including zinc chloride, lithium bromide, lithium chloride, and potassium perchlorate have been previously examined. For example, a study by Kim and collaborators has shown that increasing the zinc chloride dopant concentration up to 3% weight to the weight of polysulfone resulted in a decreased membrane permeate flux and increased retention capacity (Sue Ryeon Kim, Kew Ho Lee, Mu Shik Jhon, The effect of $ZnCl_2$ on the formation of polysulfone membrane, Journal of Membrane Science, 119 (1996) 59-6421). However, the membrane morphology was not examined in the study and the mechanism for decreased performance with zinc chloride addition remains unknown. Idris et al. (Novel high performance hollow fiber ultrafiltration membranes spun from LiBr dopes solution, Desalination, 249 (2009) 541-548) reported that the addition of 3% weight lithium bromide dopant to a polyethersulfone casting solution resulted in a pure water flux approximately 4 times higher than the membrane cast with no lithium bromide. The authors also reported a reduction of the membrane molecular weight cut-off (MWCO). The increasing in permeate flow with decreasing MWCO was attributed to a change in membrane morphology from a sponge-like structure to a finger-like structure. A similar study was completed by Ahmed et al. using lithium chloride as a polyethersulfone casting solution dopant (Iqbal Ahmed, Ani Idris, Narsul Fikry Che Pa, Novel method of synthesizing Poly(ether sulfone) membranes containing two solvents and a lithium chloride additive and their performance, Journal of Applied Polymer Science, 115 (2010) 1428-1437). They observed a similar performance enhancement in regards to the ultrapure water flux and the MWCO. However, the observed membrane morphologies were predominantly sponge-like with voids at the edges. Rahimpour et al. (Fabrication of polyethersulfone (PES) membranes with nano-porous surface using potassium perchlorate ($KClO_4$) as an additive in the casting solution, Desalination, 258 (2010) 79-86) examined the use of potassium perchorate as a dopant over concentrations ranging from 0 to 5% weight to weight of polyethersulfone. The pure water flux was observed to decrease with increasing potassium perchlorate, but no significant change in the rejection was observed. Cross-sectional scanning electron microscopy images indicated that the membrane sponge-like structure increased in density with increasing salt dopant. These studies of inorganic salt dopants on membrane structure and performance have focused on the effects of the added cation such as ion-bridging between individual polymer molecules. Based on the results presented by Idris et al. and Ahmed et al., it could be inferred that the type of anion present in the inorganic salt, in this case bromide vs. chloride, may also effect membrane morphology and thus its performance. However, no in depth study of the effect of anion dopant type and concentration has yet to be reported.

In this work, the effect of various types and concentrations of inorganic salt casting solution dopants with a similar cation (sodium), but different anions; hexametaphosphate, sulfate, carbonate, chloride, and fluoride, on the structure and performance of polyethersulfone membranes was evaluated. Scanning Electron Microscopy (SEM) images of the membrane surface and cross-section and measurements of the membrane thickness, porosity, and water contact-angle were used to analyze the membrane structure. Ultrapure water dead-end flux and cross-flow permeation tests using ultrapure water, natural surface waters, various molecular weight aqueous polyethylene glycol solutions, and aqueous sodium alginate were used to analyze membrane performance. The optimal membrane in terms of pure water flux, alginate rejection, and susceptibility to natural water fouling was the membrane produced with 1% weight sodium hexametaphosphate casting solution dopant.

Experimental

Materials:

Polyethersulfone (PES) VERADEL 3000P with an average molecular weight of 63,000 g $mol^{-1}$ and a number average molecular weight of 19,000 g $mol^{-1}$ was kindly donated by Solvay Advanced Polymer and was used as received to synthesize all of the membranes examined in this study. The technical specifications of the polymer can be obtained from Solvay (Solvay Advanced Polymers, Solution processing guide for polymer membranes, Technical Bulletin, (2010) 1-11). NMP (1-Methyl-2-pyrrolidinone; >99%) was acquired from Alfa Aesar and was used as received. Sodium hexametaphosphate (SHMP; $(NaPO_3)_6$), sodium sulfate ($Na_2SO_4$), sodium carbonate ($Na_2CO_3$), and sodium fluoride (NaF) were reagent grade and acquired from Sigma-Aldrich. Sodium chloride (NaCl) was also reagent grade and was acquired from Mallinckrodt Chemicals. The various number average molecular weight polyethylene glycol (PEG) samples; 10 kg $mol^{-1}$, 20 kg $mol^{-1}$, 50 kg $mol^{-1}$, 90 kg $mol^{-1}$, and 203 kg $mol^{-1}$, were acquired from Polymer Source Inc. The sodium alginate was acquired from MP Biomedicals, LLC. The natural surface waters used for the fouling experiments were from the Fresh Pond Reservoir at the Cambridge Drinking Water Treatment Plant. For membrane casting and ultrafiltration experiments, ultrapure water with a resistivity of >18 MΩ was used (Nanopure Infinity Ultrapure Water System; Barnstead/Thermolyne).

Casting Solution Preparation and the Membrane Casting Process:

Membrane casting solutions were all prepared using a fixed concentration of PES (18% weight) dissolved in NMP following the procedure of Maximous et al. (Preparation, characterization and performance of $Al_2O_3$/PES membrane for wastewater filtration, Journal of Membrane Science, 34 (2009) 67-75). A membrane with only PES and NMP was prepared and used as a control. Inorganic salt dopants at concentrations of 1%, 2%, or 4% weight:weight salt:PES were added to the casting solution to evaluate specific anion effects. For the five inorganic salts evaluated, it was only possible to use concentrations higher than 1% weight for sodium hexametaphosphate due to solubility issues. Sodium carbonate (mostly undissolved) and sodium sulfate (mostly dissolved) did not completely dissolve in the NMP at 1% weight. For the doped casting solutions, the inorganic salt was first added to the NMP and stirred until dissolved. Then, the PES was added. The casting solutions were mixed for at least 24 hours using an overhead mixer (IKA RW 16 basic) with a 45-mm anchor stirrer to ensure complete polymer dissolution. Then, the casting solution was placed in an ultrasonic bath (Branson 2100) for 30 minutes to remove any dissolved gas and bubbles. Finally, the casting solution was left to rest overnight in the dark until membrane production.

All membranes were cast by the phase inversion process using an ultrapure water coagulation bath. Casting solutions were spread into thin films on a glass plate (20.5 cm×25.5 cm) using an automatic film applicator (Elcometer 4340 Automatic Film Applicator) and bar coaters (Elcometer) of thickness 100 μm or 175 μm. Immediately after spreading, <30 s, the glass plate with casting solution film was immersed in the coagulation bath where it remained for 20 minutes. Finally, the membranes were placed in a heated water bath at 30° C. for 24 hours to remove any residual solvent.

Ultrapure Water Flux Evaluation—Dead-End:

Initial membrane ultrapure water flux evaluation was conducted in a dead-end configuration depicted in FIG. 1. For all of the membranes, at least 9 total flux measurements were made using three circular samples of 47-mm diameter from the three thinnest membranes produced. Compressed air was used to pressurize the system over the range of 0.7 to 1.4 bar. Permeate flow was determined using a graduated cylinder and a stop watch with measurements taken every five minutes over a total period of sixty minutes.

Membrane Morphology Evaluation:

Membrane porosities were estimated using measurements of the wet membrane weight and the dry membrane weight (E. Yuliwati, A. F. Ismail, Effect of additive concentration on the surface properties and performance of PVDF ultrafiltration membranes for refinery produced wastewater treatment, Desalination, 273 (2011) 226-234). All of the membranes used in the dead-end permeate flow tests in the previous section were subsequently used for the porosity measurements. After completing a dead-end experiment, the membrane sample was placed between two polyester/cellulose wipers (VWR—International) to remove any free surficial water and then immediately weighed. After taking the wet weight measurement, the membrane samples were immersed in isopropyl alcohol for 24 hours to remove any water and then allowed to air dry in a dessicator. Immediately after removal from the dessicator, the dry membrane weight measurement was made. The porosity of each membrane was obtained using equation 1.

$$\varepsilon(\%) = \frac{\frac{m_1 - m_2}{\rho_w}}{V_m} \cdot 100 \qquad (1)$$

Where $m_1$ and $m_2$ are membrane wet and dry weights, respectively, $\rho_w$ is the specific density of water, $V_m$ is the membrane volume, and $\varepsilon$ is the membrane porosity. The membrane volume, $V_m$, was determined by measuring sample thickness and diameter. The average membrane thickness was obtained through five measurements at different points on each membrane sample using a digital micrometer (Fowler Tools and Instruments; 0.00005" to 1.0").

Membrane cross sections and surfaces were imaged at Harvard University's Center for Nanoscale Systems using a Field Emission Scanning Electron Microscope Ultra 55 (FESEM Ultra 55). For cross-sectional images, the membrane samples were immersed in liquid nitrogen for at least 60 s and then immediately snapped in two after removal to achieve a clean cut. All membrane samples were fixed to SEM stubs using double-sided conductive carbon tape. For membrane surface images, the samples were coated with a ~4 nm layer of a conductive metal (Pt or Pd/Pt), while samples for cross-sectional images were imaged uncoated (Nermen Maximous, G. Nakhla, W. Wan, K. Wong, Preparation, characterization and performance of $Al_2O_3$/PES membrane for wastewater filtration, Journal of Membrane Science, 34 (2009) 67-75). SEM membrane images were analyzed with ImageJ software (NIH). Methods developed by Nakao et al. (Determination of pore size and pore size distribution 3. Filtration membranes, Journal of Membrane Sciences, 96 (1994) 131-165) and Fratila-Apachitei et al. (Influence of membrane morphology on the flux decline during dead-end ultrafiltration of refinery and petrochemical waste water, Journal of Membrane Sciences, 182 (2001) 151-159) were utilized to determine membranes pore size distribution, and surface porosity.

Contact Angle Measurements:

Membrane water contact angle measurements were made using a goniometer (Ramé-Hart Instrument Co.; Model 190 CA). Membranes used for contact angle evaluation were removed from water and immersed in isopropyl alcohol for 24 hours and then allowed to naturally dry to prevent pore collapse (Mark C. Porter, Ultrafiltration, Chapter 3—Handbook of industrial membrane technology. Edited by Mark C. Porter, Noyes Publications, 1990). Specimen preparation and contact angle measurement were carried out according to the ISO-15989 standard method (International Standard, Plastics—Film and sheeting—Measurement of water-contact angle of corona-treated films, ISO-15989, first edition (2004) 1-12).

Figure 2:
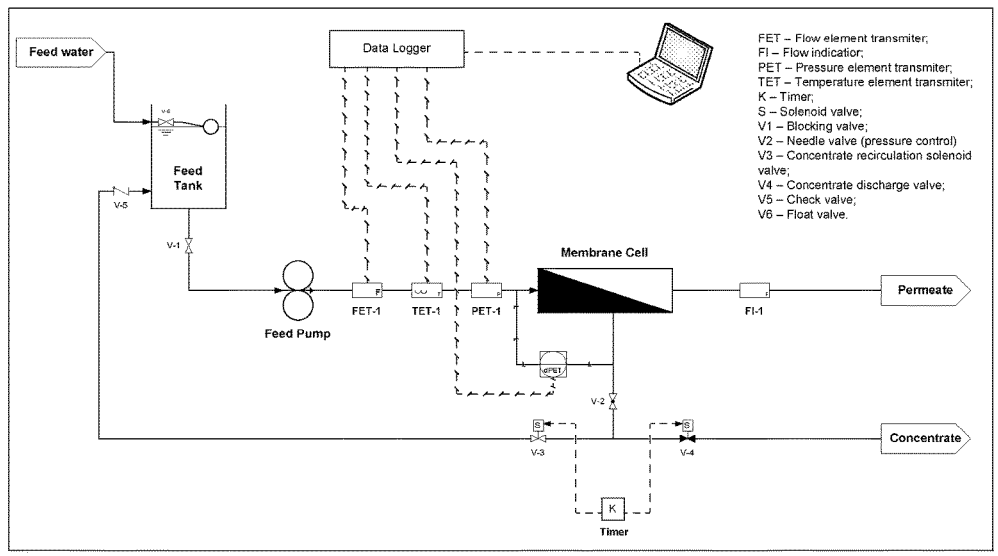
FIG. 2 is a schematic depiction of cross flow filtration setup.

Molecular Weight Cut-Off Evaluation—Cross-Flow:

Membrane molecular weight cut-off was evaluated using the cross-flow filtration setup depicted in FIG. 2. The membrane was held in an acrylic flow cell with an active filtration area of 34 cm$^2$. The thinner membranes were used for these experiments. Each membrane was challenged once with PEG solutions of molecular weights of 10, 20, 50, 90, and 203 kg mol$^{-1}$. The feed solutions were 4.0 mg L$^{-1}$ PEG in ultrapure water. All tests were run for one hour. Permeate samples were collected at 30, 45, and 60 minutes after steady state operation was achieved and feed samples were collected at the end of each experiment. The feed and permeate PEG concentration was measured using the non-purgeable organic carbon (NPOC) analysis on a total organic carbon (TOC) analyzer (Shimadzu TOC-V$_{WS}$). The membrane molecular weight cut-off was determined using the method described by Porter (Mark C. Porter, Ultrafiltration, Chapter 3—Handbook of industrial membrane technology. Edited by Mark C. Porter, Noyes Publications, 1990).

Membrane Performance Evaluation—Cross-Flow Rejection and Fouling:

For the control membrane and the membranes with highest permeate flow in dead-end tests; 1% (NaPO$_3$)$_6$, 1% Na$_2$SO$_4$, and 1% NaCl, fouling experiments with natural surface waters and aqueous sodium alginate were performed using the cross-flow filtration setup depicted in FIG. 2. The experiments were run for two hours. For sodium alginate fouling and rejection, a thinner membrane in an acrylic flow cell with an active filtration area of 34 cm$^2$ was challenged with a 15 mg L$^{-1}$ sodium alginate solution. For fouling tests with natural waters, a thicker membrane in an acrylic flow cell with an active filtration area of 94 cm$^2$ was challenged with both ultrapure water and natural water. The operational pressure ranged from 1.5 to 5.0 bar. Permeate sodium alginate concentration was determined using the same NPOC analysis as described in the previous section using a conversion factor of 0.364 (NPOC/Sodium alginate) to calculate the sodium alginate concentration. Three permeate samples were collected at 60, 90, and 120 minutes of operation and one feed sample was collected at the end of each experiment to determine the sodium alginate rejection.

Results and Discussion

Figure 3:
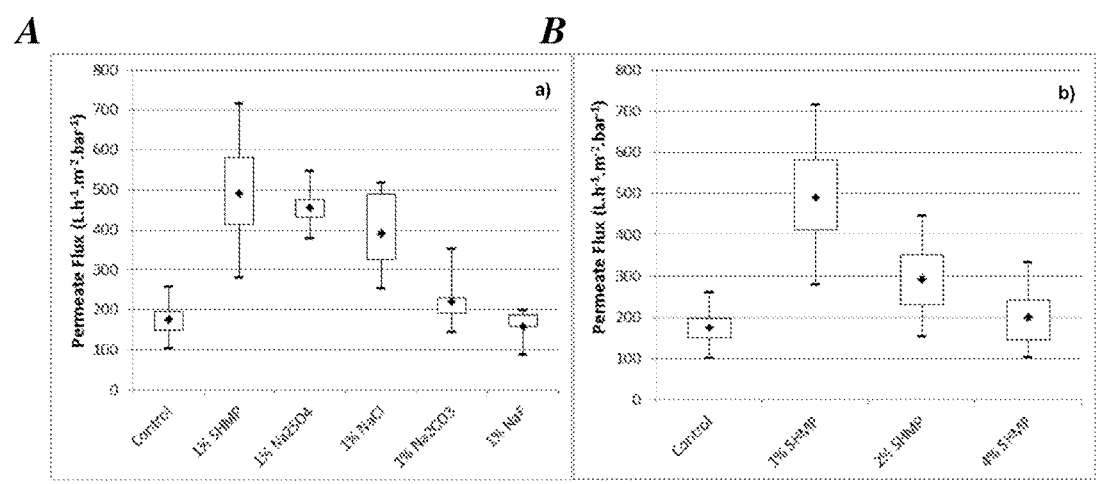
FIGS. 3A and 3B are graphs showing dead-end ultrapure flux.

Dead-End Permeate Evaluation:

Results from the ultrapure water dead-end flux experiments are displayed in FIG. 3. The addition of inorganic salts to the casting solution is observed to significantly affect the membrane permeability (FIG. 3A). As inorganic salts with a similar cation were used, it is evident that the specific anion plays an important role in the phase inversion process and subsequent membrane permeability. The magnitude of the affect is salt dependent with hexametaphosphate>sulfate>chloride and all three membranes showing a >2-fold increase in permeability as compared to the control. Since the hexametaphosphate results were so promising, a range of SHMP % weight to polymer concentrations was also examined (FIG. 3B) in regards to permeability. However, at the two higher weight percentages evaluated, the permeability was lower than observed at one-percent hexametaphosphate. Similar observations of optimal inorganic or organic additive concentration effects on membrane performance have been previously reported. See for example, [22, 23, 26, 27, 31, 32] Ani Idris, Iqbal Ahmed, Misni Misran, Novel high performance hollow fiber ultrafiltration membranes spun from LiBr dopes solution, Desalination, 249 (2009) 541-548; Iqbal Ahmed, Ani Idris, Narsul Fikry Che Pa, Novel method of synthesizing Poly(ether sulfone) membranes containing two solvents and a lithium chloride additive and their performance, Journal of Applied Polymer Science, 115 (2010) 1428-1437; Nermen Maximous, G. Nakhla, W. Wan, K. Wong, Preparation, characterization and performance of Al$_2$O$_3$/PES membrane for wastewater filtration, Journal of Membrane Science, 34 (2009) 67-75; E. Yuliwati, A. F. Ismail, Effect of additive concentration on the surface properties and performance of PVDF ultrafiltration membranes for refinery produced wastewater treatment, Desalination, 273 (2011) 226-234; A. Rahimpour, S. S. Madaeni, Y. Mansourpanah, The effect of anionic, non-ionic and cationic surfactants on morphology and performance of polyethersulfone ultrafiltration membranes for milk concentration, Journal of Membrane Sciences, 296 (2007) 110-121; and G. Arthanareeswaran, T. K. Sriyamuna Devi, D. Mohan, Development, characterization and separation performance of organic—inorganic membranes Part II. Effect of additives, Separation and Purification Technology 67 (2009) 271-281. It is also important to note, that not all the inorganic salt dopants, sodium carbonate and fluoride for example, improve membrane permeability. In the case of sodium carbonate, this is due to the low salt solubility in the NMP i.e., the majority of the sodium carbonate added did not dissolve, resulting in a membrane permeability that was statistically the same at a 95% confidence level (P-value −0.058) to the control membrane. Thus, one explanation for the observed anion effects on membrane performance is related to salt solubility in the casting solvent. Another hypothesis for the observed differences in membranes permeability with specific anion casting solution dopant may be related to the specific anion hydration energy since the two most permeable membranes were produced using multivalent anions. If the anion has greater hydration energy, then the non-solvent water may diffuse more quickly into NMP solvent during phase inversion resulting in a change in membrane structure. The hydration energies for each anion additive (Derek W. Smith, Ionic hydration enthalpies, Journal of Chemical Education, volume 54, n° 9 (1977) 540-542 and Michael E. Colvin, Earl Evleth, Yamina Akacems, Quantum chemical studies of pyrophosphate hydrolysis, Journal of American Chemical Society, 117 (1995) 4357-4362) and the average membrane permeate flux are presented in Table 1. There is no obvious correlation between anion hydration energy and permeate flux. Thus, rather than attempting to determine the specific anion mechanistic effect on the phase inversion process, correlations between the resulting membrane morphology and performance will be made in the following sections.

TABLE 1

Anions hydration energy and membrane permeate flux for different anions used as additive in dope casting solutions.

| Anion | Hydration energy(−kJ · mol$^{-1}$) | Average permeate flux (L · h$^{-1}$ · m$^{-2}$ · bar$^{-1}$) |
| --- | --- | --- |
| Chloride | 381 | 391 |
| Fluoride | 515 | 159 |
| Sulfate | 1059 | 455 |

TABLE 1-continued

Anions hydration energy and membrane permeate flux for different anions used as additive in dope casting solutions.

| Anion | Hydration energy (-kJ·mol$^{-1}$) | Average permeate flux (L·h$^{-1}$·m$^{-2}$·bar$^{-1}$) |
|---|---|---|
| Carbonate[1] | 1314 | 221 |
| Phosphate | 2282 | 490 |

[1]Salt has not been dissolved

Membranes Morphology:

It is well known in the literature that addition of a casting solution dopant or coagulation bath dopant will result in changes to membrane properties and structure (Mark C. Porter, Ultrafiltration, Chapter 3—Handbook of industrial membrane technology. Edited by Mark C. Porter, Noyes Publications, 1990). Thus, for all membranes, the membrane thickness, porosity, and contact angle were measured. This data is presented in Table 2 along with their corresponding membrane permeabilities for membranes spread with the 100 μm bar coater. The porosity of the membrane with 2% SHMP was not calculated as it was not weighed before immersing in isopropyl alcohol. Analyzing the data in Table 2, it is observed that the specific type and concentration of the anion casting solution dopant did affect these membrane properties. However, the changes to the thickness, porosity, and contact angle did not correlate well to the changes in membrane permeability. One observed trend is that with increasing concentration of the hexametaphosphate dopant, the membrane contact angle is observed to decrease. A decrease in contact angle and thus increase in membrane hydrophilicity would be expected to result in increased pure water flux, in contrast to observed results. In regards to all the 1% anions, the contact angle has been increased as compared to the control in all cases except for fluoride, which resulted in the membrane with the lowest contact angle. The decreased contact angle with the higher hexametaphosphate and fluoride dopants suggests these anions may be incorporated into the membrane. Another exception is observed in the membrane thickness, since none of the dopants resulted in a change of membrane thickness except chloride, which had a 10-20% reduction in thickness suggesting chloride affects the casting solution viscosity. No definitive conclusions can be drawn about anions influence on membrane porosity due to the imprecision of the method and lack of any observable trend. Finally, the major point from this data is there is no observable correlation between membrane thickness, porosity, and contact angle and the membrane permeability. Thus, an attempt was made to correlate pore size and structure to performance.

TABLE 2

Effect of anions additions on membrane thickness, porosity, contact angle, and average permeate flux.

| Membrane | Thickness (μm) | Porosity (%) | Contact Angle (Degrees) | Permeate Flux (L h$^{-1}$ m$^{-2}$ bar$^{-1}$) |
|---|---|---|---|---|
| Control | 57.0 ± 0.8 | 68.0 ± 1.2 | 62.7 ± 2.9 | 174.6 |
| SHMP - 1% | 58.0 ± 1.4 | 63.9 ± 1.7 | 65.7 ± 3.9 | 489.8 |
| SHMP - 2% | 57.6 ± 4.3 | nc | 60.3 ± 3.7 | 293.1 |
| SHMP - 4% | 57.8 ± 0.9 | 68.2 ± 2.6 | 51.7 ± 3.1 | 200.3 |
| Na$_2$SO$_4$ - 1% | 57.1 ± 0.8 | 62.4 ± 7.2 | 67.7 ± 3.4 | 454.8 |
| NaCl - 1% | 51.6 ± 0.5 | 69.7 ± 2.7 | 72.4 ± 4.5 | 390.5 |
| Na$_2$CO$_3$ - 1%[a] | 58.5 ± 1.2 | 65.9 ± 2.1 | 68.0 ± 2.8 | 220.6 |
| NaF - 1% | 57.4 ± 0.7 | 65.6 ± 2.4 | 49.7 ± 2.0 | 158.8 |

[a]salt did not dissolved,
nc—not calculated

Figure 4:
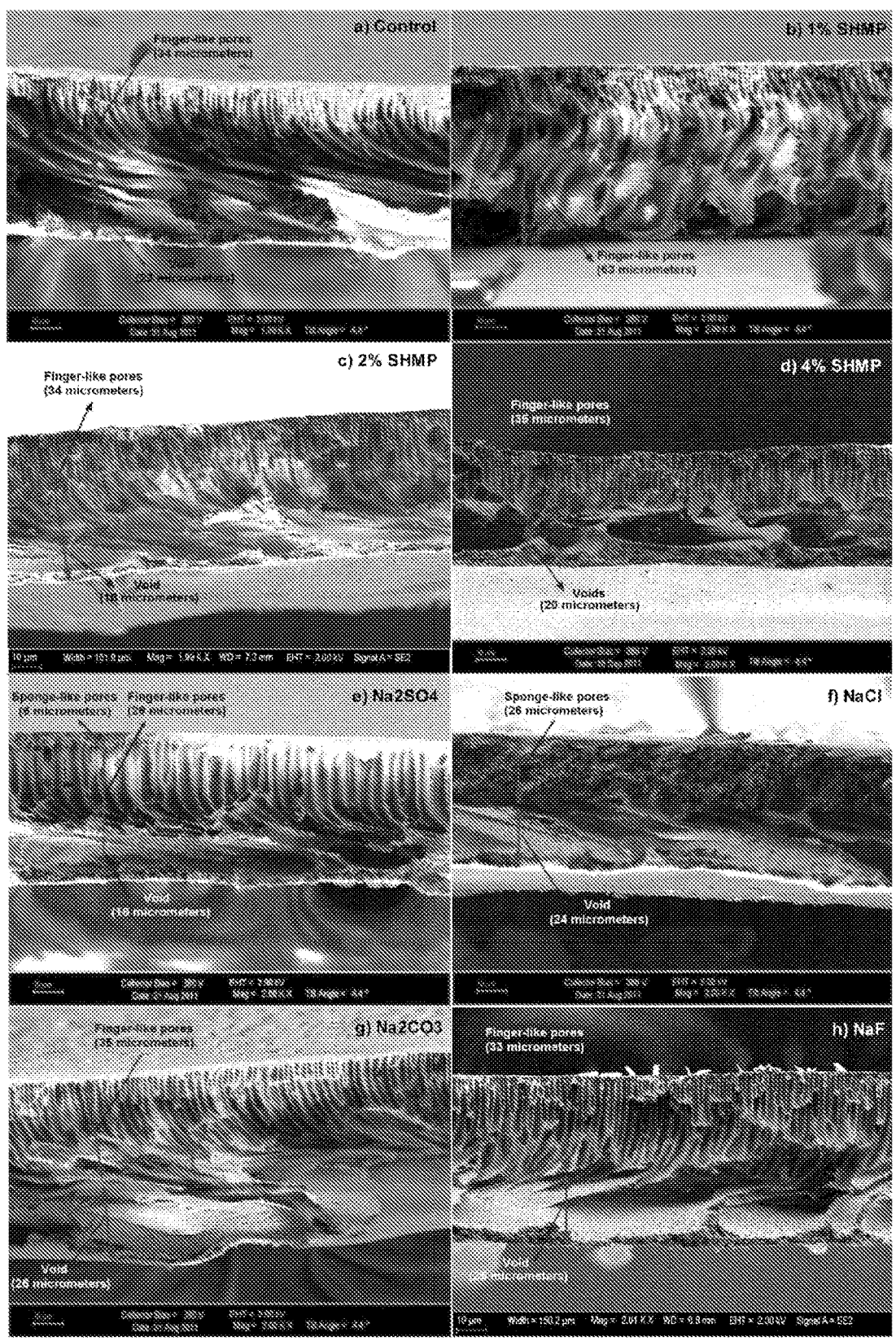

Membrane pore structure is a relevant morphological characteristic that can be used in association with others membrane properties to predict performance. Here, the influence of the specific type and concentration of the anion casting solution additives on membrane morphology is obtained by an in-depth analysis of both membrane surface and cross-sectional SEM images. A cross-sectional SEM image for every membrane cast with the 100-μm bar coater is presented in FIG. 4. It is obvious that the type and concentration of anion casting solution dopant significantly affected the membrane pore structure. Therefore, altering the specific anion casting solution dopant may be a strategy to rationally design membrane structure and performance.

Visual analysis of the SEM images of the membranes with increasing SHMP concentration (FIGS. 4A-4D) shows the effect of salt concentration on membrane structure. The membrane with 1% SHMP (FIG. 4B) has a well-defined finger-like pore structure with straighter and more continuous pores as compared to the control membrane (FIG. 4A). This structure should result in a lower membrane resistance for water flux and is confirmed by the results obtained in the dead-end permeation tests (Table 2). As the SHMP dopant concentration is increased, the finger-like structure is retained, but the pore continuity decreases and enclosed pores (FIGS. 4C and 4D), large macro voids, and sponge-like structures are formed at the bottom of the membrane (FIG. 4D). The loss of continuous finger-like pores across the membrane and the formation of enclosed pores and macrovoids at the bottom of the membrane will increase resistance for water flow, in agreement with dead-end flux measurements (Table 2). The formation of these structures may also result in a higher propensity for internal membrane fouling and subsequent loss of flow, as will be discussed later in the text.

For the membrane cast with the sodium sulfate dopant, there is a noticeable change in membrane pore structure as compared to control membrane. The sulfate dopant results in a periodic pore profile with a small sponge-like layer at the surface, then large finger-like pores for the next ⅔ of the membrane thickness, and large voids at the bottom ⅓ thickness (FIG. 4E). This larger upper pore structure profile and open bottom structure results in a membrane with lower resistance to water flow as compared to the control. However, the resistance is expected to be a bit greater in comparison to the membranes with no such a bottom void structure (1% SHMP; FIG. 4B), as confirmed by the results obtained in the dead-end permeate flow evaluation.

The polyethersulfone membrane cast with the 1% NaCl dopant resulted in the most unique structure of all the cast membranes (FIG. 4F). Instead of the upper finger-like pore structure observed in all the other membranes, chloride addition resulted in a sponge-like structure for the upper 50% of the membrane thickness and a mixed finger-like macro-void structure for the remaining 50% of the membrane. This structure configuration resulted in a lower membrane resistance for dead-end permeate flux. Although the pure water flux has increased as compared to the control, the sponge-like pore structure may result in increased fouling as there is a large amount of internal surface area to collect foulants. One possible explanation for the formation of the sponge-like structure could be strong propagation of the typically thin asymmetric membrane skin layer due to very fast water diffusion into the casting solution as a result of the chloride dopant. This increases the polymer concentration in the non-solvent propagation wave very rapidly resulting in an extended sponge like structure, in agreement with previous literature (Strathmann, Heiner, Synthetic membranes and their preparation, Chapter 1—Handbook of industrial membrane technology. Edited by Mark C. Porter, Noyes Publications, 1990). The sponge-like structures are denser than the finger-like structures, in agreement with the lesser thickness of the membrane casted with NaCl addition (Table 2).

Finally, for the membranes casted with $Na_2CO_3$ and NaF dopants (FIGS. 4G and 4H), it is not possible to identify any significant change in membrane structure as compared to the control membrane. This would indicate that there should be minimal difference in the membrane resistance to water flow, in agreement with the dead-end permeate flow evaluation tests.

Figure 5:
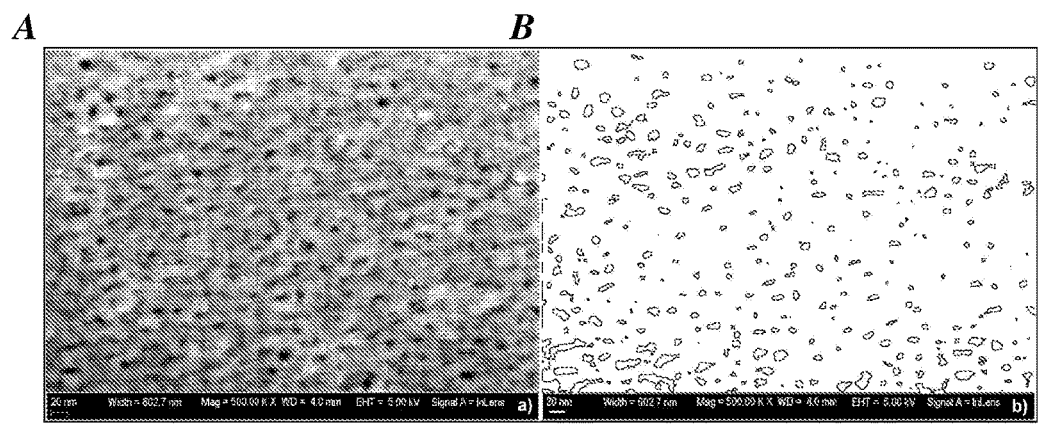
FIGS. 5A and 5B show control membrane top surface image at 500 kX magnification before (FIG. 5A), and after (FIG. 5B) manipulation with ImageJ Software for pore size distribution determination.
Figure 6A:
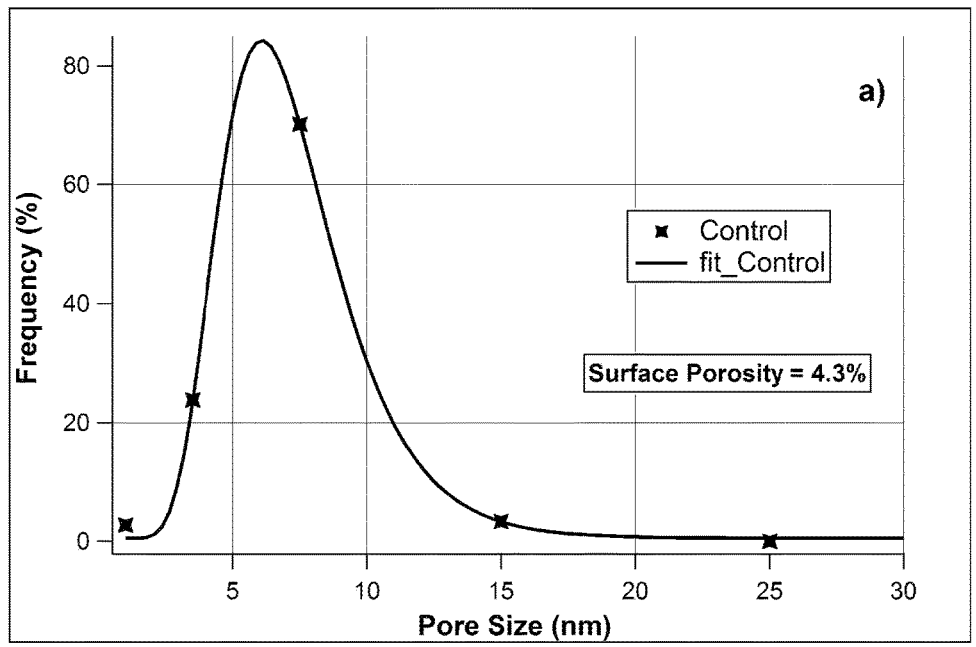
FIGS. 6A-6C are line graphs showing membranes pore size distribution, and surface porosity for different anions used as additive.
Figure 6B:
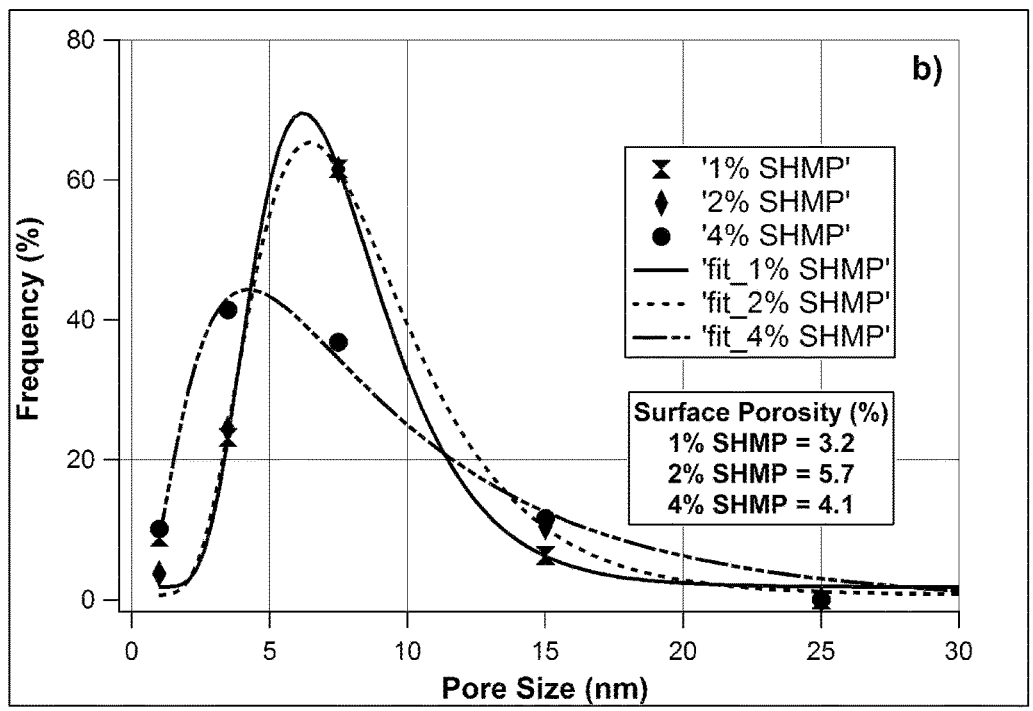
Figure 6C:
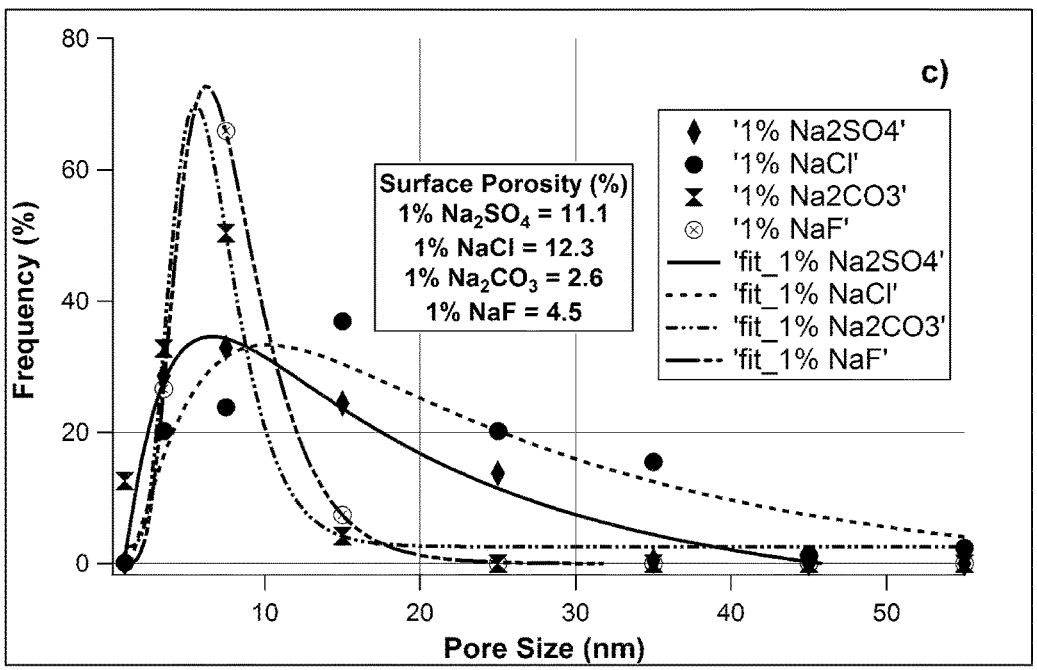

Along with cross-sectional SEM images, top surface membrane SEM images of 500 kX magnification were also taken to examine any specific anion effects on pore size distribution and surface porosity. To determine membrane surface porosity and pore size distribution, surface SEM images were quantitatively analyzed using the "Analyze Particles" function of the ImageJ software. A SEM image of control membrane before and after manipulation is presented in FIG. 5. Pore size distributions and surface porosity were then calculated using automated measurements of the manipulated image, as presented in FIG. 6. The lines in FIG. 6 are fits to the experimental data using the log normal model. For membranes with 1% and 2% of SHMP (FIG. 6B), 1% of $Na_2CO_3$, and 1% NaF (FIG. 6C), there is no significant difference in the pore size distribution profile as compared to the control membrane (FIG. 6A). A broadened and greater pore size distribution and a larger surface porosity are observed for the sulfate and chloride doped membranes (FIG. 6) with a significant sponge-like layer at the surface. These membranes were among the three with the greatest dead-end flux indicating surface pore size and porosity greatly affect water flux. However, even though the surface porosity of the sulfate and chloride membranes was 2-fold greater than the 1% SHMP membrane, their permeabilities were slightly lesser than the 1% SHMP membrane indicating that internal finger-like pore structure is more important to membrane permeability.

A negative implication related to a broadened pore size distribution and large surface porosity is the potential for internal fouling, as larger foulants and a greater number of foulants can enter the membrane and can subsequently obstruct the internal pores. Based on the SEM images presented in FIG. 4 and the pore size distribution profiles and surface porosities presented in FIG. 6, it is expected that membranes cast with $Na_2SO_4$, NaCl, and 4% SHMP dopants will have the highest potential for fouling due to their broadened pore size distribution. The fouling potential of the membrane cast with NaCl is expected to be the highest due to the presence of broad pore size distribution, high surface porosity, and a thick, sponge-like upper layer that can act as a depth filter.

Based on the analysis of membranes pore structure and size distribution, it is clear that specific anions can significantly affect these morphological characteristics. Remarkably, hexametaphosphate anions at the optimal concentration can extend the finger-like pore structure across the whole membrane cross-section without significantly affecting the pore size distribution or surface porosity. This extended finger-like morphology of similar pore size improves membranes permeability without reduction of rejection capacity. Membranes that presented finger-like pore structure, but with large enclosed pores or voids near the bottom of the membrane e.g., the 2% and 4% hexametaphosphate and 1% fluoride, displayed a lower permeability, indicating the voids act as resistance toward water flow. The use of sulfate anions resulted in a membrane with a three-layer configuration; a small sponge-like layer at the top, a very wide and straight finger-like structure beneath for ⅔ of membrane thickness, and then large voids at the bottom of the membrane. Even though this structure results in a high permeability, the sponge layer at the top and voids at the bottom will significantly increase the membrane fouling potential, which will be amplified by the broad pore size distribution and increased surface porosity. Membranes cast with chloride anions resulted in a predominantly sponge-like structure at the membrane top, over a layer with a combination of large finger-like pores and voids, with a broad pore size distribution, and the highest surface porosity. This kind of structure resulted in a membrane with high permeability, but also with a high fouling potential. The sponge-like structure will function as a depth filter and entrap contaminants (Perry van der Marel, Arie Zwijnenburg, Antoine Kemperman, Matthias Wessling, Hardy Temmink, Walter van der Meer, Journal of Membrane Science 348 (2010) 66-74). Based on these observations, it is possible to conclude that the best morphology for drinking water treatment membranes is one that presents a narrow surface pore size distribution and straight finger-like pores that extend all the way through the membrane. This optimal structure was obtained here by use of sodium hexametaphosphate as a casting solution dopant.

Figure 7:
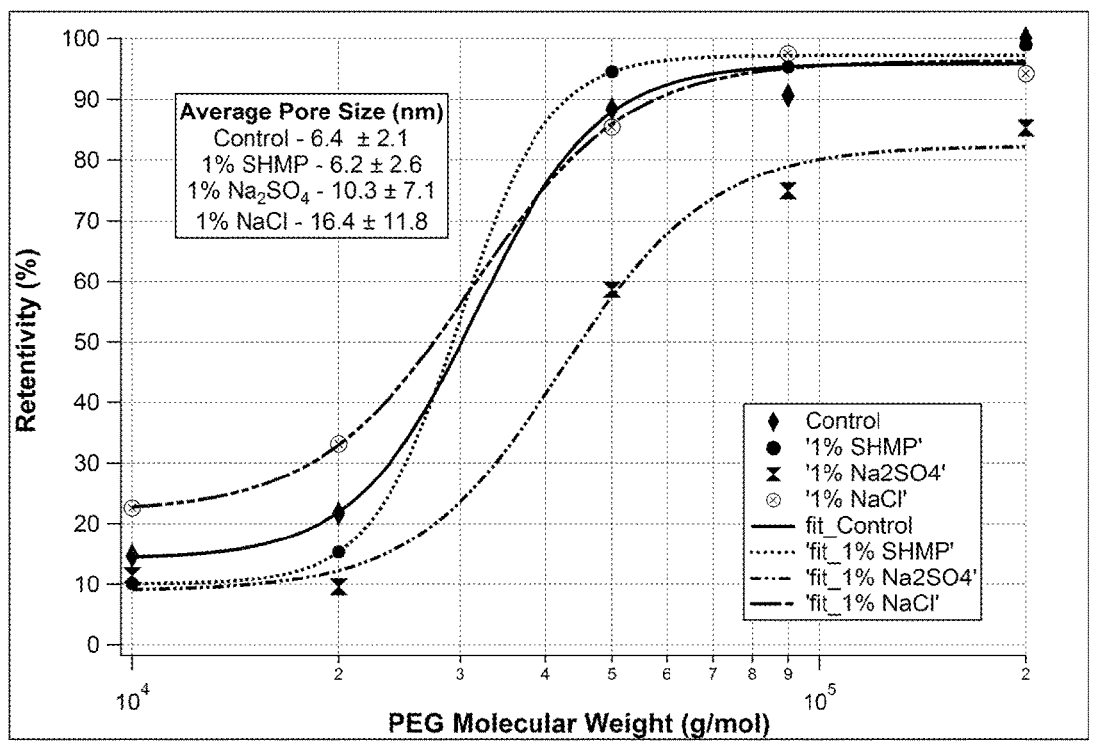
FIG. 7 is a line graph showing membranes retention capacity for PEG with different molecular weights.

Molecular Weight Cut-Off Evaluation:

For the membranes that presented the highest dead-end water fluxes as compared to the control membrane ($Na_2SO_4$; $(NaPO_3)_6$; NaCl) and the control membrane itself, a molecular weight cut-off (MWCO) evaluation was carried out using five different molecular weight PEGs ranging from 10 to 203 kg $mol^{-1}$, as described above. The percent retention versus PEG molecular weight for the four membranes is presented in FIG. 7. The lines are fits to the experimental data using the Hill model.

As used herein, a membrane's molecular weight cut-off is defined as the molecular weight of a compound, in this case a PEG polymer, that is ≥90% retained by the membrane [14]. From the results displayed in FIG. 7, the MWCO can be determined for all membranes except the one cast with $Na_2SO_4$ dopant, since 90% retention was never attained. In agreement with this membrane's wide pore size distribution (FIG. 6c). The NaCl membrane also had a wide pore size distribution, but achieved 90% retention around 60 kg $mol^{-1}$. Among all membranes tested, the 1% SHMP was the most restrictive having a MWCO around 43 kg $mol^{-1}$. The MWCO of the control membrane was around 53 kg $mol^{-1}$. These results are in agreement with the results for average membrane pore sizes (FIG. 7) as a correlation between membrane pore size and molecular weight cut-off is expected (Mark C. Porter, Ultrafiltration, Chapter 3—Handbook of industrial membrane technology. Edited by Mark C.

Porter, Noyes Publications, 1990). The exception here is the membrane cast with 1% NaCl and the unexpected retention capacity can be explained by the sponge-like structure of the upper 50% of the membrane. The dense sponge may have internal pores of lesser diameter than the surface pores resulting in a lower MWCO than expected from mean surface pore size. This behavior is in agreement with the hypothesis that membranes with this dense sponge-like structure can operate as a depth filter and thus have more potential for internal fouling (Perry van der Marel, Arie Zwijnenburg, Antoine Kemperman, Matthias Wessling, Hardy Temmink, Walter van der Meer, Journal of Membrane Science 348 (2010) 66-74).

Membrane Performance Evaluation—Alginate Retention and Fouling Susceptibility:

The performance evaluation experiments were completed in the cross-flow configuration for the membranes that presented the highest dead-end water fluxes as compared to the control membrane ($Na_2SO_4$; $(NaPO_3)_6$; NaCl) and the control membrane itself. These four membranes were challenged with a 15 mg $L^{-1}$ sodium alginate solution as an extreme case to evaluate membrane fouling potential and retention capacity for colloidal natural organic matter removal. The relative flux of the alginate containing solution to the ultrapure water or $J_{SAS}/J_{UPW}$ for steady-state conditions i.e., the final hour of a two hour experiment, is plotted against the membrane sample in FIG. 8 with the UPW flux, sodium alginate removal efficiencies, and membrane thicknesses. It is of note that the UPW flux is lower for the cross-flow configuration, FIG. 8, as compared to the dead-end configuration, FIG. 3. This difference is associated with variation in membrane sample size e.g., 17 cm² in dead-end and 34 cm² in cross-flow, and with uncontrolled variations during the membrane casting process. This is supported by the flux results obtained for cross-flow MWCO evaluations, where the UPW flux for the Control, 1% SHMP, 1% $Na_2SO_4$, and 1% NaCl membranes were 162, 387, 268, and 235 LHM-bar, respectively. In all cases, the UPW flux for the doped membranes is always significantly greater than the control membrane.

Figure 8:
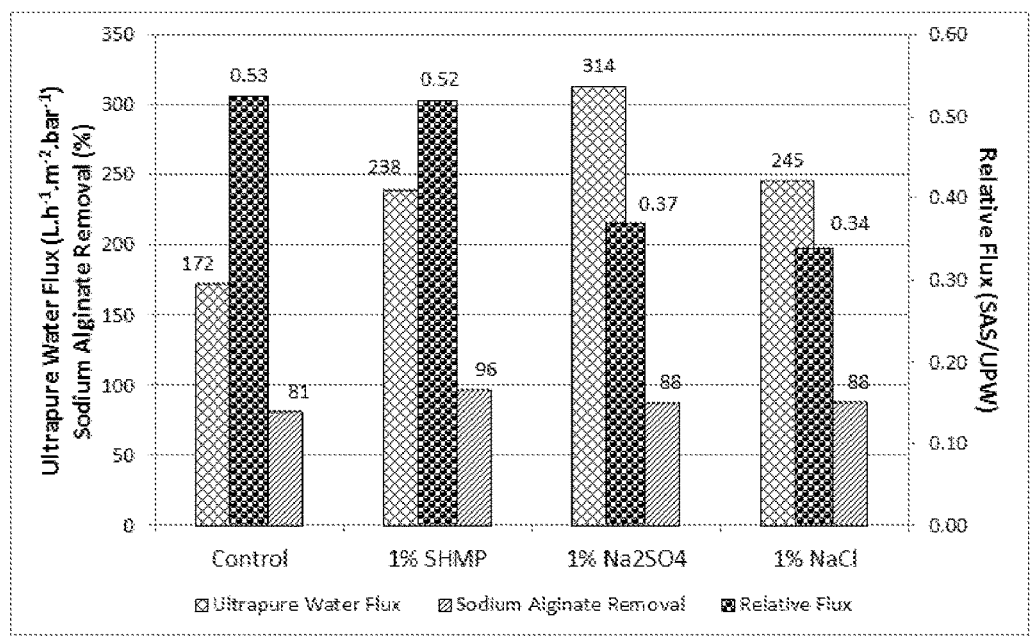
FIG. 8 is a bar graph showing ultrapure water cross-flow flux, sodium alginate removal efficiency, and relative flux ($J_{SAS}/J_{UPW}$) for the highest dead-end flux membranes.

Results depicted in FIG. 8 clearly show the higher alginate fouling potential of the membranes cast with $Na_2SO_4$ and NaCl with $J_{SAS}/J_{UPW}$~0.35. The control membrane and the membrane cast with SHMP presented less susceptibility for alginate fouling at $J_{SAS}/J_{UPW}$~0.53. The alginate removal results, also presented in FIG. 7, indicate that all four membranes have high a potential, >88.4% in all cases, for colloidal natural organic matter removal. The membrane cast with SHMP had the highest alginate retention at 96.5%, in agreement with its small pore size distribution and lowest MWCO. These results are in agreement with what was predicted based on the analysis of membranes structures as discussed above. Membranes with a predominantly finger-like pore structure and narrow pore size distribution at the surface will present higher retentivity capacity and lower potential for fouling, compared with the membranes with sponge-like and void pore structure and broader pore size distribution. Marel et al. (Journal of Membrane Science 348 (2010) 66-74)] and Hashino et al. (Effect of membrane surface morphology on membrane fouling with sodium alginate, Journal of Membrane Science 366 (2011) 258-265) have reported similar results.

In order to evaluate membrane susceptibility to fouling in regards to drinking water treatment, experiments were completed with natural surface waters from a local reservoir. Natural water samples were collected from Fresh Pond, the holding pond for Cambridge's Walter J. Sullivan Water Treatment Facility. The characteristics of the natural water are presented in Table 3 (Dowling, Edward, Monthly water quality and quality report, City of Cambridge, Water Department, June 2011) and the results of the Fresh Pond natural water (NTW) relative to ultrapure water flux (UPW) or $J_{NTW}/J_{UPW}$, together with membranes thicknesses and UPW fluxes, are presented in FIG. 9.

TABLE 3

| Fresh Pond water characteristics | |
| --- | --- |
| Quality indicator | Results |
| E-coli bacteria (UFC per 100 mL) | 5 |
| Total Organic Carbon (mgC $L^{-1}$) | 3.8 |
| UV-254 nm absorption ($cm^{-1}$) | 0.119 |
| Turbidity (NTU) | 0.60 |
| Conductivity ($\mu S$ $cm^{-1}$) | 525 |

Figure 9:
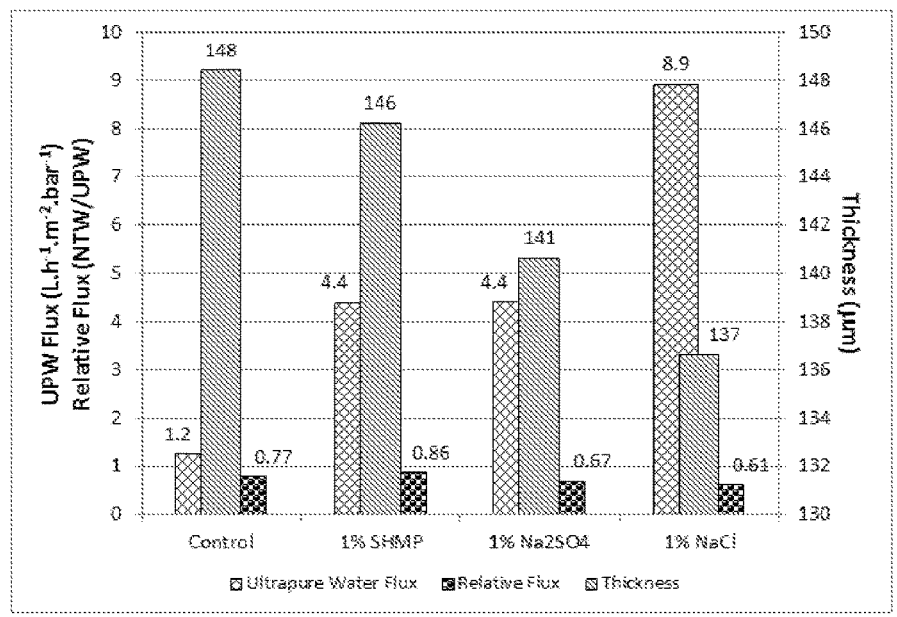
FIG. 9 is a bar graph showing membrane thickness, UPW cross-flow flux, and relative permeate flux for the thicker membranes of greatest dead-end water flux.
Figure 10:
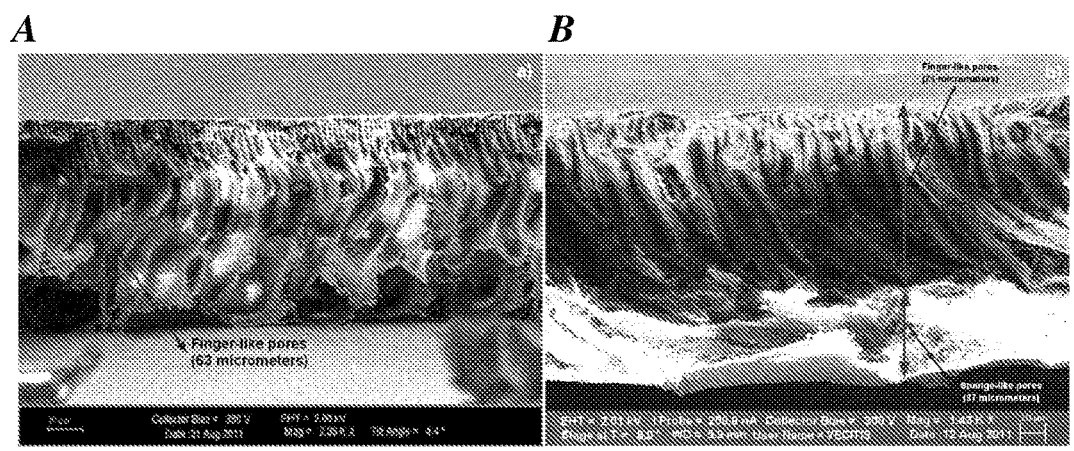
FIGS. 10A and 10B show SEM cross-section images of membranes with 1% SHMP.

It is of note that the cross-flow permeate flux is significantly lesser in FIG. 9 than FIG. 8. The drastic reduction in cross-flow permeate flux is primarily due to the use of membranes with increased thickness i.e., a 175-μm bar coater was used to produce membranes for FIG. 9 and a 100-μm bar coater for FIG. 8. The membranes cast with an increased thickness result in obvious changes to the internal pore structure as depicted in FIG. 10. For example, the thicker membranes also have thicker pore walls and a mixed void-sponge-layer at the bottom of the membrane. Both of these new structures are expected to decrease membrane permeability, as observed, due to an increased resistance for water flow. Similar reductions in flow rate with membrane thickness increasing have been previously reported. For example, a 5.5-fold decrease in pure water flux was correlated to a 50% increase in polysulfone membrane thickness (C. Barth, M. C. Gonçalves, A. T. N. Pires, J. Roeder, B. A. Wolf, Asymmetric polysulfone and polyethersulfone membranes: effects of thermodynamic conditions during formation on their performance, Journal of Membrane Science 169 (2000) 287-299). Similar to FIG. 8, the UPW flux in the cross-flow configuration is again observed to be more highly dependent on the pore size distribution as the membrane with the largest pores, NaCl, is observed to have the largest UPW flux. This is in agreement with Poiseuiles's equation that can be used to predict pure water flow through porous media (Mark C. Porter, Ultrafiltration, Chapter 3—Handbook of industrial membrane technology. Edited by Mark C. Porter, Noyes Publications, 1990).

In regards to natural water fouling, once again the membrane cast with SHMP displayed the lowest susceptibility to fouling at $J_{NTW}/J_{UPW}$~0.85. The sulfate and chloride membranes showed the highest potential for natural water fouling confirming that their sponge-like layer at the membrane surface has a high fouling potential. Overall, the membrane cast with 1% SHMP has now shown the best performance in regards to dead-end pure water flux at 490 LMH-bar and lowest susceptibility to both high concentration alginate fouling and natural surface water fouling.

The observed fouling behavior of the four membranes can be rationalized by considering their differences in contact angle and membrane structure. According to Table 1, the contact angles of the control membrane and the one cast with SHMP were slightly lower at 62.7 and 65.7 degrees, respectively, as compared to the $Na_2SO_4$ and the NaCl contact angles at 68 and 72 degrees. The contact angles are seemingly correlated to the susceptibility for fouling i.e., lower contact angle correlates to lower fouling. However, the absolute change in contact angle is relatively minor and many others factors can affect membrane fouling potential (Catharina Jönsson, Ann-Sofi Jönsson, Influence of the membrane material on the adsorptive fouling of ultrafiltration membranes, Journal of Membrane Science 108 (1995) 79-87). Another hypothesis is that differences in membrane structure could be responsible for the observed fouling behavior. Firstly, the membranes cast with $Na_2SO_4$ and NaCl displayed a much broader pore size distribution profile with the NaCl membrane displaying the largest pores (FIG. 6) in agreement with their fouling susceptibility. Increasing the size of the surface pores will increase the susceptibility of internal fouling since larger species can enter the internal membrane pores [38, 39]. Secondly, the membranes cast with $Na_2SO_4$ and NaCl both had a sponge-like structure at the membrane surface with the NaCl membrane having the upper 50% of its structure as sponge. These higher density sponge structures present a relatively high surface area-to-volume ratio and thus a high potential for fouling as the smaller internal pores are easily clogged and the high surface area allows for natural organic matter deposition. Thus, the presence and size of membrane surface sponge-like structure and membrane water contact angle are good predictors of a membrane's susceptibility to natural water fouling. See for example, Dowling, Edward, Monthly water quality and quality report, City of Cambridge, Water Department, June 2011; C. Barth, M. C. Gonçalves, A. T. N. Pires, J. Roeder, B. A. Wolf, Asymmetric polysulfone and polyethersulfone membranes: effects of thermodynamic conditions during formation on their performance, Journal of Membrane Science 169 (2000) 287-299; and Catharina Jönsson, Ann-Sofi Jönsson, Influence of the membrane material on the adsorptive fouling of ultrafiltration membranes, Journal of Membrane Science 108 (1995) 79-87.

Polyethersulfone ultrafiltration membranes were cast with the addition of different types and concentrations of inorganic sodium salts with varying anions (SHMP 1%, 2%, and 4% weight, $Na_2SO_4$, NaCl, $Na_2CO_3$, and NaF 1% weight, based on PES weight). The membranes were prepared, characterized, and tested to evaluate the influence of specific type and concentration of anion casting solution dopants on the morphology and performance of the prepared membranes. Dead-end filtration permeability experiments showed that only the membranes prepared with the addition of 1% SHMP (490), $Na_2SO_4$ (450) and NaCl (400) had significantly higher flow rates as compared to the control membrane (190 LMH-bar). Cross-sectional and surface SEM images provided insight into how the specific anion dopant affects the membrane pore size and structure that in turn gave insight into the improved dead-end permeability. The membranes prepared with 1% SHMP had the highest pure water flux as explained by their well-defined finger-like pore structure that extended from the top to the bottom of membrane. The structures associated with lower membrane permeabilities were non-straight, non-continuous fingers, large macro-voids and dense sponge-like structures. Pore size distribution for all of the membranes was obtained from membrane surface SEM. The control membrane and for the membranes prepared with SHMP, $Na_2CO_3$, and NaF additions had a tighter pore size distribution (5-20 nm) as compared to the broader pore size distribution (5-40 nm) for the $Na_2SO_4$ membrane and (5 to 50 nm) for the NaCl membrane. The broad pore size distribution is associated with a sponge-like structure being present at the surface, as seen with $Na_2SO_4$ and NaCl membranes. The SEM-determined membrane pore size distribution is well correlated with the experimentally-determined PEG molecular weight cut-off. The NaCl was the only exception retaining smaller PEG than expected indicating the dense, thick sponge-like region of the membrane has smaller internal pores as compared to its surface pores. This sponge-like structure is also observed to be correlated with an increased potential for internal fouling. Fouling evaluation using a sodium alginate solution and natural surface waters confirmed that not only is the membrane surface pore size distribution, but the membrane internal structure also plays an important role on potential for fouling. It is concluded that the specific type and concentration of the casting solution anion dopant can significantly change membrane morphology and in turn affect its performance for water treatment in regards to water flux and fouling potential. It has also been verified that membrane thickness is a critical factor to be considered for membrane design, since thicker membranes will present reduced flux, because of changes in internal pore structure. Among the anions evaluated, the membrane cast with 1% sodium hexametaphosphate displayed the highest flux and lowest potential for fouling and thus the greatest potential for improving ultrafiltration membrane morphology and performance.

In the work described herein, the effect of various casting solution salt dopants with similar cations, but different anions; $(NaPO_3)_6$, $Na_2SO_4$, $Na_2CO_3$, NaCl, and NaF, on the morphology and performance of polyethersulfone ultrafiltration membranes was evaluated. The phase inversion process was used to produce all membranes using an 18% polyethersulfone in n-methylpyrrolidone casting solution and water as the non-solvent. Scanning electron microscopy (SEM) images of the membrane cross-section and surface pores were used to determine the specific anion effects on membrane morphology. The SEM images depicted significant changes to the membrane internal structure and pore size with respect to the type and concentration of the casting solution anion dopant. Membrane permeability, molecular weight cut-off, alginate retention, and susceptibility to fouling were evaluated using ultrapure water dead-end and ultrapure water, aqueous polyethylene glycol, aqueous sodium alginate, and natural surface reservoir water cross-flow filtration tests. Among the anions evaluated, phosphate doped at 1% w/w to the polymer resulted in the membrane with highest dead-end permeability at 490 LMH-bar (2- to 3-fold greater than the control), greatest alginate retention at 96.5%, and lowest susceptibility fouling. The significant increase in membrane performance indicates that the phosphate anion has great potential to be used as a membrane casting solution dopant. It was also clearly demonstrated that membrane morphological characteristics can be effectively used to predict membrane drinking water treatment performance.

Example 2: Effect of Clay Nanoparticles on the Structure and Performance of Polyethersulfone Ultrafiltration Membranes Considering the limited set of data about the use of clay nanoparticles for membrane casting, in this work it was evaluated the use of different concentrations of unmodified clay nanoparticles on the morphology and performance of composite PES membranes, through Scanning Electron Microscopy (SEM) and dead-end and cross flow permeation tests, using ultrapure water, natural water, and polyethylene glycol solutions for Molecular Weight Cut-off (MWCO) determination. Phase inversion process was used for membrane casting and no other additive has been used in the dope casting solution or in the coagulation bath.

Experimental

Materials:

For membrane casting polyethersulfone (PES) VERADEL 3000P with an average molecular weight of 63,000 g.mol$^{-1}$ and number average molecular weight of 19,000 g.mol$^{-1}$ was kindly donated by SolveyAdvanced Polymer and was used as it was received. Product technical specification could be obtained elsewhere (Solvay Advanced Polymers, Solution processing guide for polymer membranes, Technical Bulletin, (2010) 1-11). 1-Methyl-2-pirrolidinone 99+% (NMP) was acquired from Alfa Aesar, and was used as it was received. Sodium hexametaphosphate (SHMP), was acquired from Sigma Aldrich, and clay nanoparticles (Montmorillonite—PGV®) was kindly donated by Nanocor Company, and was used as it was received. Product technical specification is available elsewhere (Nanocor, Polymer grade montmorillonites, Technical data, Lit. G-105, revised 05/05/06.2p., available at www.nanocor.com/tech_sheets/G105.pdf). For ultrafiltration experiments polyethylene Glycol (PEG) 10 kg.mol$^{-1}$, 20 kg.mol$^{-1}$ 50 kg.mol$^{-1}$, 90 kg.mol$^{-1}$, and 203 kg.mol$^{-1}$, number average molecular weight, were acquired from Polymer Source Inc., and natural water from Fresh Pond Reservoir was obtained at the Cambridge Drinking Water Treatment Plant. For membrane casting and ultrafiltration tests, ultrapure water with a resistivity of 18 Mega Ohms was produced using the Nanopure Infinity Ultrapure Water System from Barnstead/Thermolyne.

Dope Casting Solutions Preparation and Membranes Casting:

Dope casting solutions were prepared using fixed concentration of PES (18% weight) and NMP (82% weight), based on the results obtained by Maximous et al. (Nermen-Maximous, G. Nakhla, W. Wan, K. Wong, Preparation, characterization and performance of Al$_2$O$_3$/PES membrane for wastewater filtration, Journal of Membrane Science, 34 (2009) 67-75). Dope casting solutions with and without SHMP as a dispersant were prepared with clay nanoparticles concentrations of 1%, 2.5%, and 5%, and 1%, 2%, 3%, and 5%, respectively (based on the PES mass). A membrane with no clay addition was also prepared to be used as a control. For dope casting solution preparation first, when applicable, SHMP (1% of PES mass) was added to the NMP, and after it was completely mixed, clay nanoparticles were added, and only after its dispersion PES polymer addition started. Dope casting solution was mixed for 24 hours using an overhead mixer (IKA RW 16 basic) with a 45 mm anchor stirrer, then it was put in an ultrasound bath (Branson 2100) for 30 minutes, and left to rest overnight in the dark. The same procedure was used to prepare the control membrane, except the salt addition step.

All membranes were casted using the phase inversion process, with ultrapure water in the coagulation bath, at room temperature (22° C.). Dope casting solutions were spread in a glass plate (20.5 cm×25.5 cm) using an automatic film applicator (Elcometer 4340 Automatic Film Applicator), and bar coaters with different thickness, 100 μm and 175 μm, from Elcometer Inc. Glass plate was kept in the coagulation bath for 20 minutes, and after that membranes were kept in a water bath at 30° C. for 24 hours, for residual solvent removal. No delays between dope casting solution spreading and coagulation bath immersion were allowed.

Ultrapure Water Flow Evaluation:

Membrane ultrapure water flow tests were conducted in a dead-end setup, depicted in FIG. 1. For each salt composition and for the control, three of the thinnest membranes were tested, using three different circular samples (47 mm diameter) of each membrane. Compressed air was used to pressurize the system and pressure test ranged from 0.7 bar to 1.4 bar. Permeate flow was determined using a graduated cylinder and a stop watch, with measures at each five minutes, for 60 minutes.

Membrane Morphology Evaluation:

Membrane porosities were estimated based on pores water content and membrane weights (E. Yuliwati, A. F. Ismail, Effect of additive concentration on the surface properties and performance of PVDF ultrafiltration membranes for refinery produced wastewater treatment, Desalination, 273 (2011) 226-234). All membranes samples used in the dead-end permeate flow tests were used for porosity determination. After dead-end experiments each sample was put between two polyester/cellulose wipers (VWR—International) for free water removal and was immediately weighted. After that, membranes samples were immersed in isopropyl alcohol for 24 hours before natural drying, and were weighted again. The porosity of each membrane was obtained using equation 1, $$\varepsilon(\%) = \frac{\frac{m_1 - m_2}{\rho_w}}{V_m \cdot 100} \quad (1)$$

where $m_1$ and $m_2$ are membrane wet and dry weights, respectively, $\rho_w$ is the specific mass of water, $V_m$ is the membrane volume, and $\varepsilon$ is the membrane porosity. $V_m$ was determined based on samples thicknesses and diameters. Average membrane thickness was obtained through five measurements of different points in each membrane sample using a digital micrometer from Fowler Tools and Instruments (0.00005" to 1.0").

Membranes cross sections and surfaces were imaged at the Center for Nanoscale Systems from Harvard University, using the Field Emission Scanning Electron Microscope Ultra 55 (FESEM Ultra 55). For cross section imaging membranes samples were immersed in liquid nitrogen for a clear breaking. All membrane samples were fixed in holders using double sided carbon adhesive tape. Samples for surface images were coated with a 4 nm layer of a conductive metal alloy, while samples for cross section images were not coated (NermenMaximous, G. Nakhla, W. Wan, K. Wong, Preparation, characterization and performance of Al$_2$O$_3$/PES membrane for wastewater filtration, Journal of Membrane Science, 34 (2009) 67-75). Membranes pore size distributions were obtained using the software ImageJ 1.44p from Wayne Rasband, National Institutes of Health, USA. This procedure was based on the works developed by Shin-ichiNakao (Determination of pore size and pore size distribution3. Filtration membranes, Journal of Membrane Sciences, 96 (1994) 131-165) and Lidy E. Fratila-Apachitei et al. (Influence of membrane morphology on the flux decline during dead-end ultrafiltration of refinery and petrochemical waste water, Journal of Membrane Sciences, 182 (2001) 151-159).

Contact Angle Measurements:

Membranes contact angle were measured using a goniometer from Ramé-hart Instrument Co. (Model 190 CA). Membranes used for contact angle evaluation were removed from water and immersed in isopropyl alcohol for 24 hours before natural drying. This procedure was used to prevent pores collapse (Mark C. Porter, Ultrafiltration, Chapter 3—Handbook of industrial membrane technology. Edited by Mark C. Porter, Noyes Publications, 1990). Specimens' preparation and contact angle measurement were carried out according to the ISO-15989 standard (International Standard, Plastics—Film and sheeting—Measurement of water-contact angle of corona-treated films, ISO-15989, first edition (2004) 1-12). Two samples of each membrane type were evaluated with 20 measurements for each sample.

Molecular Weight Cut-Off Evaluation:

Membranes molecular weight cut-off were evaluated in the cross flow filtration setup depicted in FIG. 2, using an acrylic flow cell with an active filtration area of 34 cm$^2$, and thinnest membranes. One of each membrane with higher permeate flow and control membrane were challenge with PEG solutions of 10, 20, 50, 90, and 203 kg.mol$^{-1}$, one each time. PEG concentration was evaluated using NPOC analysis, using a TOC analyzer from Shimadzu Scientific Instruments (TOC-V$_{WS}$). Feed solutions with approximately 4.0 mg.L$^{-1}$ of PEG (NPOC equivalent) were prepared with ultrapure water. All tests had been run for one hour. Permeate samples were collect at 30, 45 and 60 minutes after steady state operation was reached, and feed samples were collected at the end of each test for determining PEG rejection. Membrane molecular weight cut-off was determined as described by Porter (Ultrafiltration, Chapter 3—Handbook of industrial membrane technology. Edited by Mark C. Porter, Noyes Publications, 1990).

Membranes Performance Evaluation:

For membranes with higher permeate flow in dead-end tests, compared to the control membrane, fouling tests with sodium alginate solution (SAS) were performed using a cross flow filtration setup, depicted in FIG. 2. Fouling tests with SAS (10 mg.L$^{-1}$) were run for one hour and sodium alginate concentration was evaluated through Non-purgeable Organic Carbon (NPOC) measurements. One sample of each thinnest membrane was tested in the acrylic flow test cell. Before fouling tests were carried out, ultrapure water (UPW) permeate flux was obtained for each membrane. Operation pressure ranged from 1.5 bar to 5.0 bar.

Comparison of the Results of this Study with Similar Ones:

In order to obtain a better understanding about the influence of clay and clay nanoparticles on membrane performance, a synthesis of the results obtained by the studies developed so far are tabulated together the ones obtained in this study.

Results and Discussion

Figure 11:
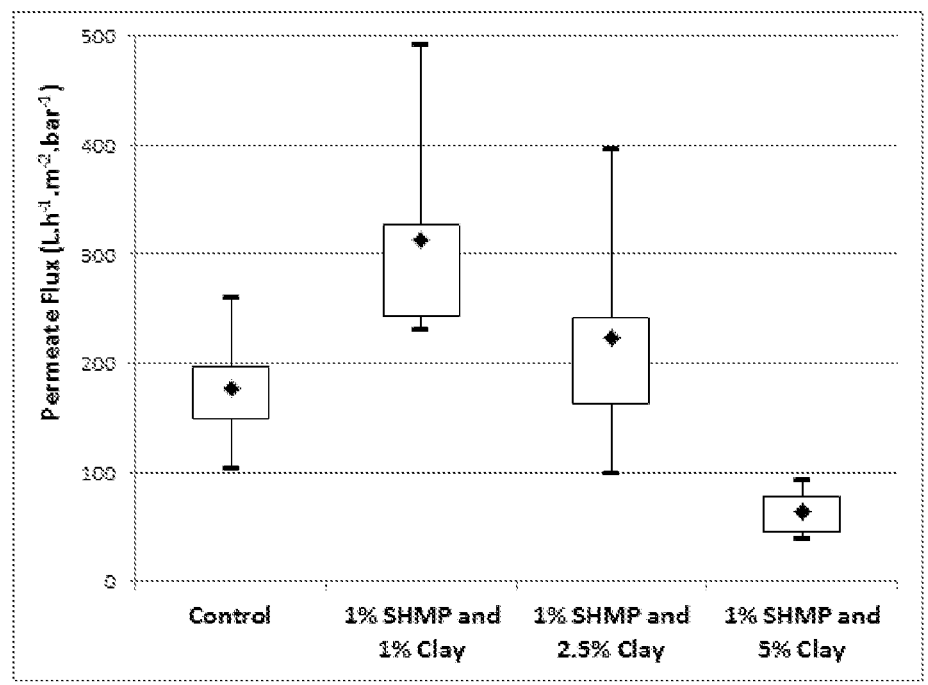
FIG. 11 is a graph showing permeate flux for control membrane and for membranes with clay nanoparticles and SHMP additions, obtained in dead-end filtration tests.
Figure 12:
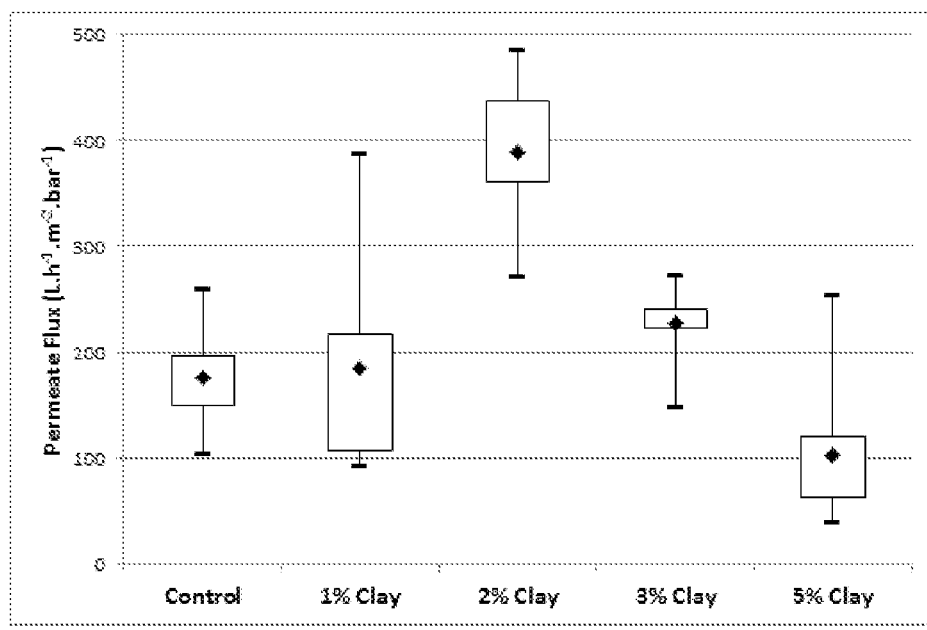
FIG. 12 is a graph showing permeate flux for control membrane and for membranes with clay nanoparticles addition, obtained in dead-end filtration tests.

Dead-End Permeate Flow Evaluation:

Membrane permeability tests using ultrapure water through a dead-end filtration setup is a straight forward and easy approach for a preliminary evaluation of the effect of clay nanoparticles additions on membranes characteristics. As one can see in FIGS. 11 and 12 additions of different concentrations of clay nanoparticles, with or without SHMP, affects membrane permeability, reaching a maximum for total additive concentration of 2%, only for clay nanoparticles or for clay nanoparticles and SHMP. Nevertheless, maximum permeate flux for each membrane type is different, with the best results for the membrane with only clay nanoparticles addition. This profile for membrane permeability variation with additive concentration increasing was also reported by others researchers (OriettaMonticelli, Aldo Bottino, Ivan Scandale, Gustavo Capanelli, Saverio Russo, Preparation and properties of polysulfone-clay composite membranes, Journal of Applied Polymer Science 103 (2007) 3637-3644 and NeginGhaemi et al., Preparation, characterization and performance of polyethersulfone/organically modified montmorillonite nanocomposite membranes in removal of pesticides, Journal of Membrane Science 382 (2011) 135-147), even though the additive concentrations used in this work were quite smalls. Without wishing to be bound by a theory, these changes in membrane permeability can be related only to changes in membrane morphology, what is evaluated in the specific section.

Figure 13A:
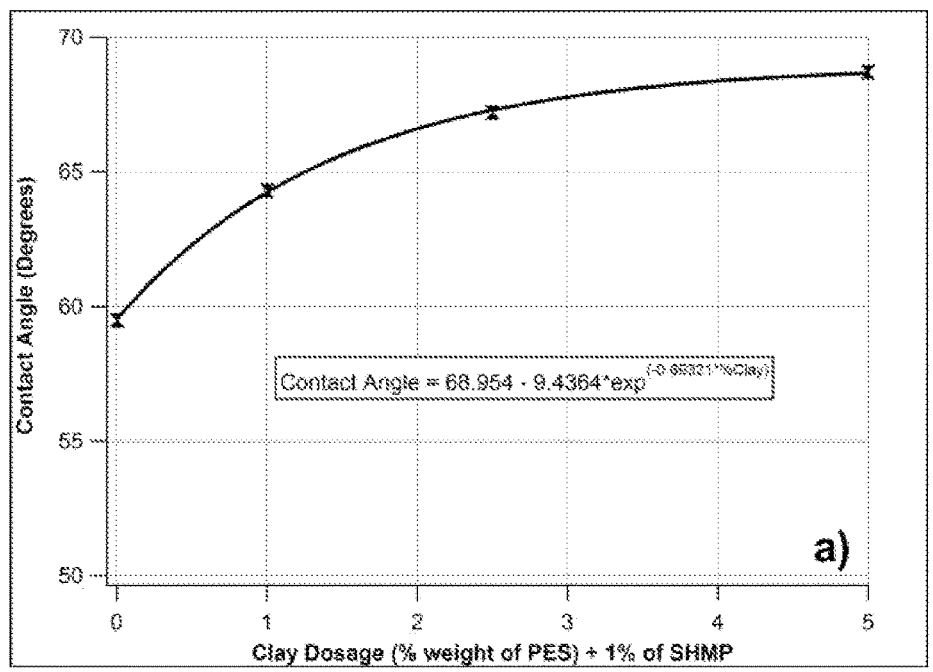
FIGS. 13A and 13B are line graphs showing membrane contact angle variation with clay dosage with SHMP (FIG. 13A) and without SHMP (FIG. 13B).
Figure 13B:
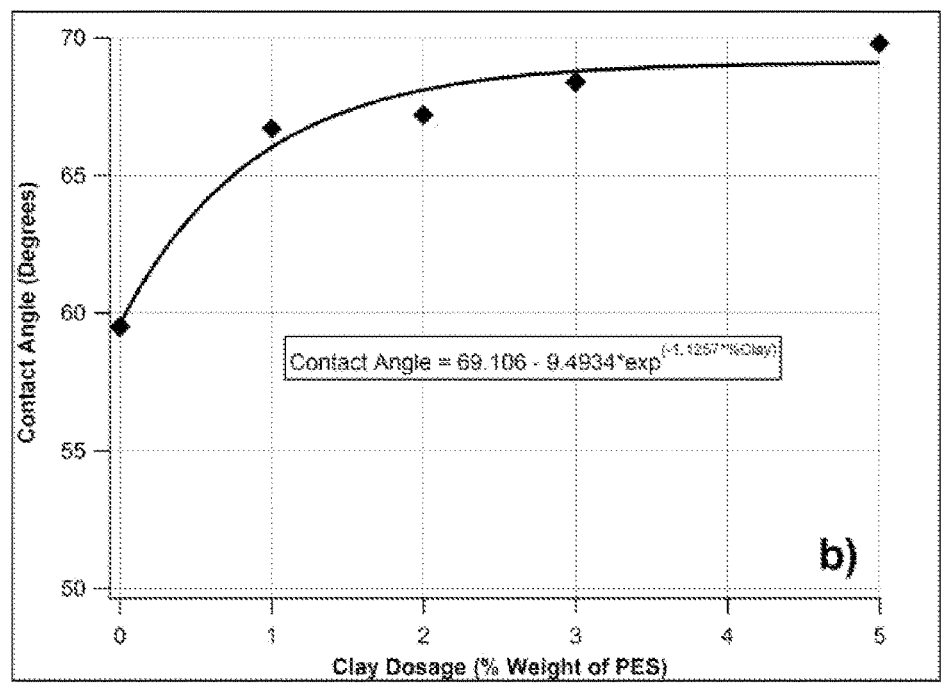

Membranes Morphology:

Results for membranes thickness and porosity are presented in Table 4, and results for contact angle variation are presented in FIG. 13.

TABLE 4

Effect of claynanoparticles additions on membrane thickness and porosity.

| Membrane | Thickness (μm) | Porosity (%) |
|---|---|---|
| Control | 57.0 ± 0.8 | 68.0 ± 1.2 |
| 1% Clay + SHMP | 57.8 ± 1.1 | 65.7 ± 2.2 |
| 2.5% Clay + SHMP | 58.3 ± 0.8 | 66.1 ± 1.9 |
| 5% Clay + SHMP | 56.2 ± 0.9 | 65.0 ± 2.1 |
| 1% Clay | 56.8 ± 2.0 | 67.8 ± 3.1 |
| 2% Clay | 57.8 ± 0.8 | 69.5 ± 1.9 |
| 3% Clay | 58.9 ± 1.0 | 72.7 ± 3.6 |
| 5% Clay | 56.7 ± 1.7 | 66.9 ± 3.8 |

It is well known from the classical literature that any additive in the dope casting solution or in the coagulation bath can change membrane properties and structure [1]. Analyzing data presented in Table 4 it is not possible to correlate the changes in membranes permeability for ultrapure (FIGS. 11 and 12) with the variation of clay nanoparticles concentrations, with or without SHMP. That is because there are no significative changes in membranes thickness and porosity to justify the observed variation in permeation fluxes.

Results from contact angle measurements showed an exponential increasing in its value according to clay nanoparticle concentration increasing, with or without SHMP, reaching a plateau close to 70° (FIG. 13). This behavior was not expected since hydrophilic clay was used in the experiments. A possible explanation for this result might be associated to the absorption of NMP by clay nanoparticles during dope casting solution preparation, being kept in the membrane even after phase inversion and washing processes. The base for this hypothesis is the studies developed by Jankzuk and Biakopiotrowicz (Components of surface free energy of some clay minerals, Clay and Clay Minerals vol. 36, no 3 (1988) 243-248) and by Jouany (Surface free energy components of clay-synthetic humic acids complexes from contact-angle measurements, Clay and Clay Minerals vol. 39, no 1 (1991) 43-49), who studied the influence of organic solvents on clay surface free energy, indicating that water contact angle over clays are increased as clay is mixed with specific amounts of solvents. However, based on available data it is not possible to draw a definitive conclusion about observed changes in PES/Clay nanoparticles contact angles, as it is not possible to correlate these changes with ultrapure water flux.

Membrane pore structure and surface pore distribution are relevant morphological characteristics that can be used in association with other membrane properties for predicting its performance for water treatment. A better knowledge about the influence of clay nanoparticles on membranes morphology and pore distribution can be obtained by the analysis of SEM images, what will help to understand how membrane performance is affected. Cross-sectional SEM images for all membranes casted are presented in FIG. 14.

Figure 14:
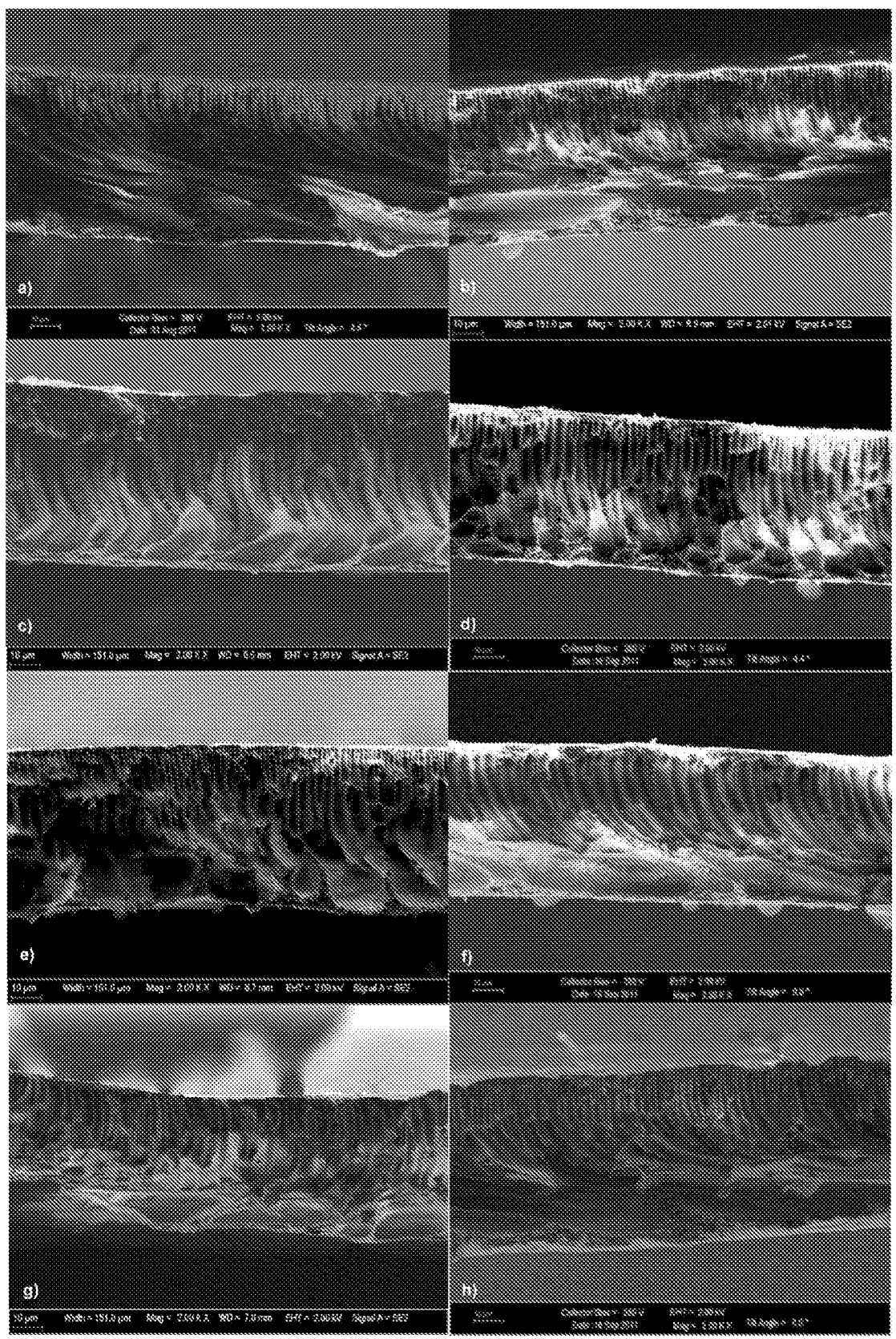
FIGS. 14A-14H are cross-sectional SEM images of casted membranes. Control (FIG. 14A), 1% Clay+1% SHMP (FIG. 14B), 2.5% Clay+1% SHMP (FIG. 14C), 5% Clay+1% SHMP (FIG. 14D), 1% Clay (FIG. 14E), 2% Clay (FIG. 14F), 3% Clay (FIG. 14G), and 5% Clay (FIG. 14H).
Figure 15:
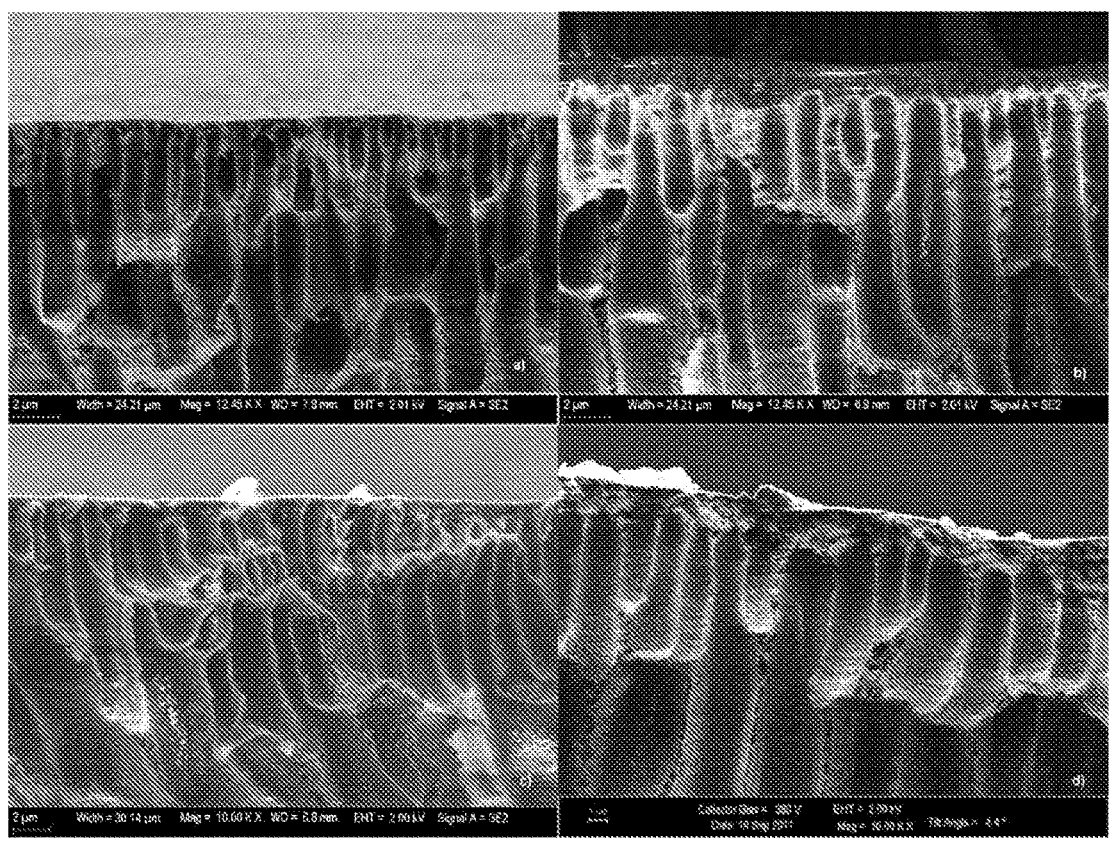
FIGS. 15A-15D are high magnification cross-sectional SEM images of upper membranes portion. Control (FIG. 15A), 1% Clay and 1% SHMP (FIG. 15B), 2.5% Clay and 1% SHMP (FIG. 14C), and 5% Clay and 1% SHMP.

Through the analysis of FIG. 14 it can be seen that membrane internal pore structure changed as clay nanoparticle concentration was increased. For the membranes prepared with SHMP as a dispersant in dope casting solution (FIGS. 14B-14D) increasing the dosage of clay nanoparticles resulted in a more straighten pore profile, compared to the one from control membrane (FIG. 14A). With these changes in pore profile it would be expected a reduction on membrane internal resistance for water flow as clay nanoparticles concentration increased, what not happened. A closer look over internal pore structure at membranes top reveals slight changes on pore configurations, as can be seen in FIG. 15.

The first change that is worth to highlight is the increasing of sponge-like pore structure thickness at membrane surface with clay nanoparticles additions, what is better seen in FIGS. 15B and 15D. However observed changes in membranes permeate flux cannot be explained by these changes. Another change observed in membrane pore structure is the variation in the number and sizes of enclosed pores close to membranes surface. For control membrane, and membrane with 2.5% of clay nanoparticles addition (FIGS. 15A and 15C), it is possible to observe a more complex structure at the membrane top, with a higher number of small enclosed pores compared to other membranes (FIGS. 15D and 15E). Even for the membrane with 5% of clay nanoparticles (FIG. 15E), compared to the membrane with 1% of clay nanoparticles (FIG. 15B) additions, it is possible to notice a slight difference between the pore configuration of both membranes. Pores of membrane with 1% of clay nanoparticle seem to be more interconnected than the pores in membrane with 5% of clay nanoparticles addition. Since in the membrane with 1% of clay nanoparticles addition the number and size of enclosed pores are small compared to the membranes with 2.5% and no clay nanoparticles additions, and because of higher pore interconnectivity, compared to the membrane with 5% of clay nanoparticles addition, the resistance for water flow might be lower, what can help to explain the results obtained in the dead-end filtration tests. However other changes in membrane structure and properties, which cannot be identified through the analysis of SEM images, might also had been affected membranes permeability.

For membranes with clay nanoparticles without SHMP as dispersant agent (FIGS. 14E-14H), changes in internal pore structure are much more evident. Membrane with 2% of clay nanoparticle addition (FIG. 14F) presents a well-defined finger-like pore structure, with almost no small enclosed pores, compared with control and other membranes with only clay nanoparticle addition, what explain why the permeate flux for this membrane was the highest among all tested membranes in the dead-end filtration tests.

It is also important to mention that not only membrane internal pore structure is responsible for membrane performance, but also the surface pore size distribution. FIG. 16 presents the results obtained throughout the analysis of membranes SEM surface images using the ImageJ software.

Figure 16A:
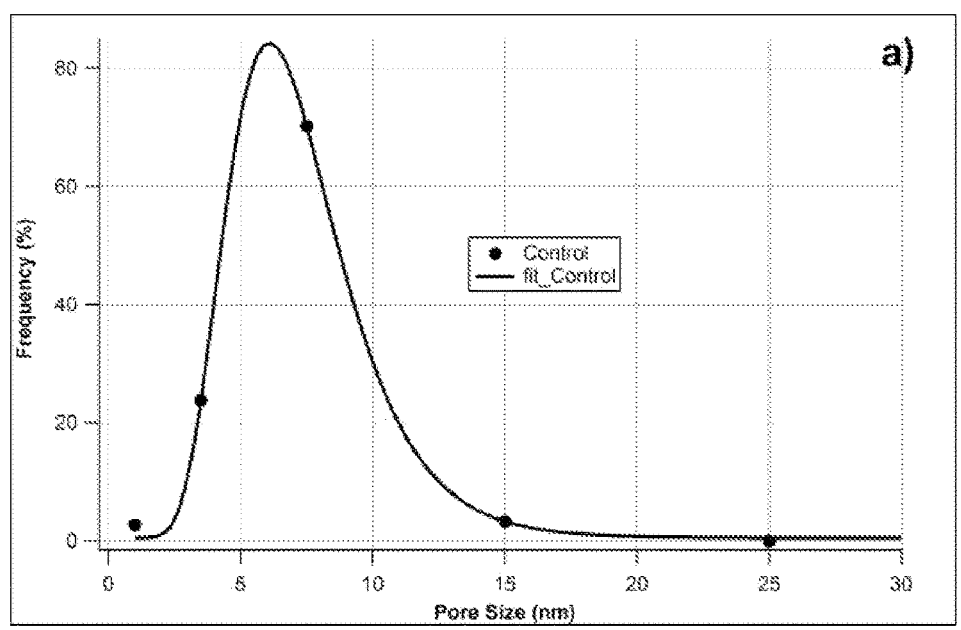
FIGS. 16A-16C are line graphs showing membrane pore size distribution in control membrane (FIG. 16A), membranes with Clay and 1% SHMP additions (FIG. 16B), and membranes with Clay additions (FIG. 16C).
Figure 16B:
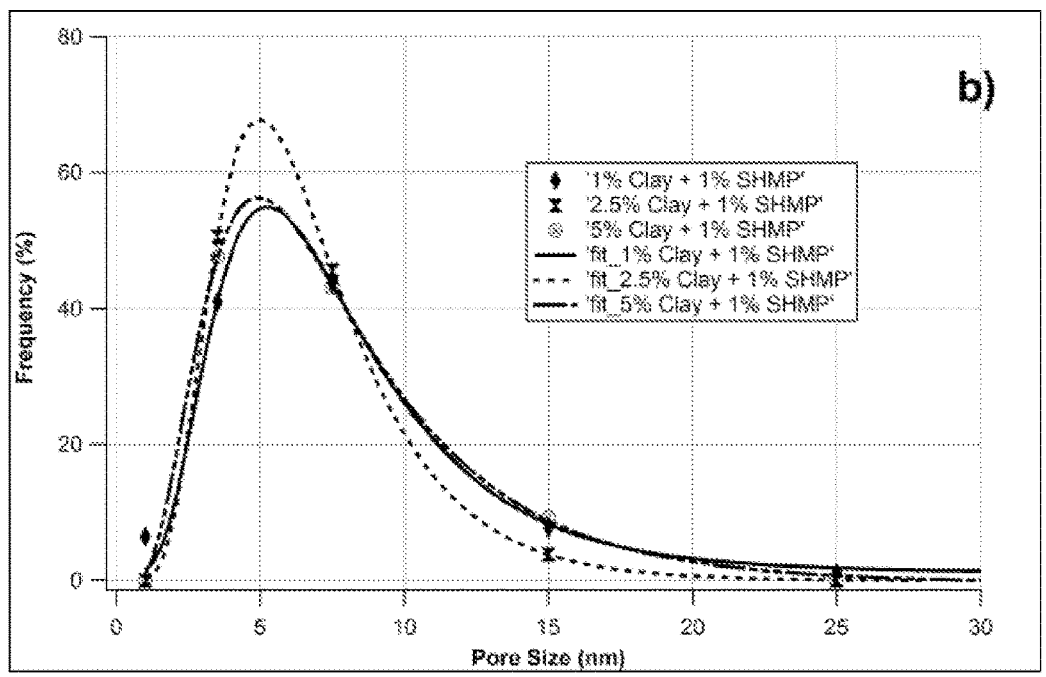
Figure 16C:
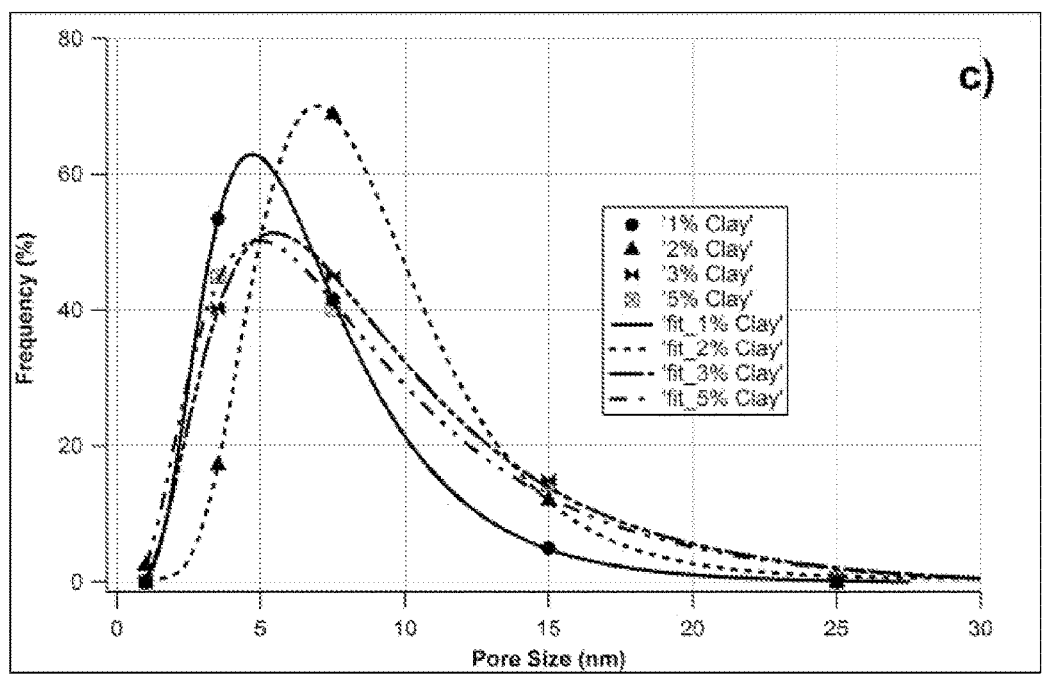

As it can be seen in FIG. 16, for most casted membrane, compared to the control membrane (FIG. 16A), there was a reduction on the median pore size diameter of all membranes, from approximately 6 nm to 5 nm, but not for the membrane with only 2% of clay nanoparticle addition (FIG. 16C), which increased to 7 nm, while for all membranes with clay nanoparticles pore size distribution was broaden. Since changes in membranes pore size were not so significative, it can be concluded that differences observed in dead-end membrane flux is mainly related to the internal pore structure. However, differences in pore size distribution profile can have influence on membrane rejection capacity and fouling behavior, being expected a lower rejection capacity and higher fouling potential for membranes with broaden pore size distribution.

Figure 17:
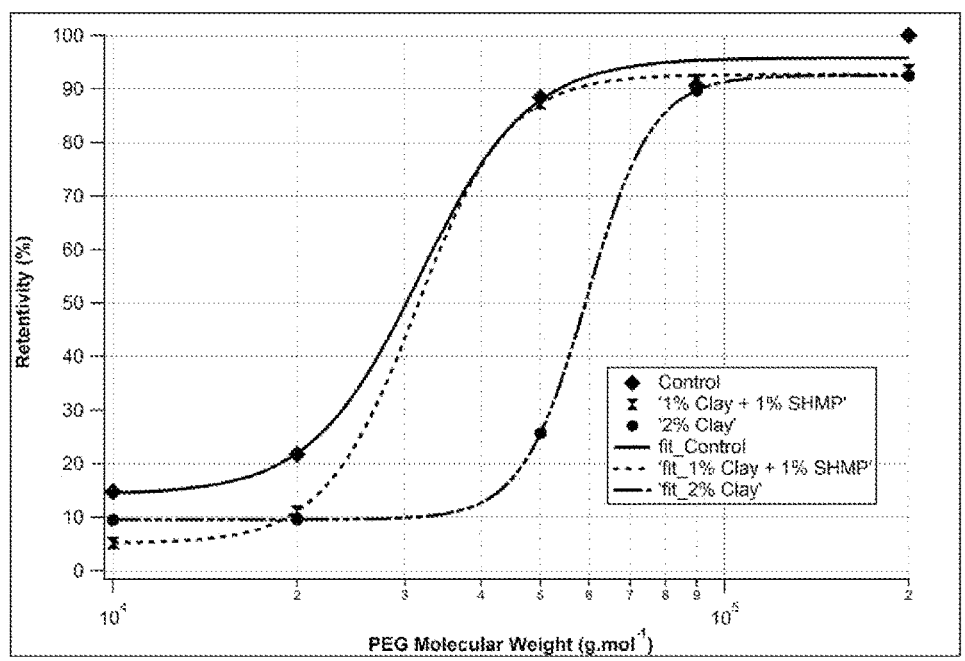
FIG. 17 is a line graph showing retention capacity of control, 1% clay nanoparticles and 1% SHMP, and 2% clay nanoparticles membranes for PEG of different molecular weights.

Molecular Weight Cut-Off Evaluation:

For the membranes that presented higher fluxes compared to control membrane, a molecular weight cut-off evaluation was carried out using different molecular weight PEG polymer, as described above. FIG. 17 presents the results obtained in evaluation tests.

Since membrane MWCO is defined by the molecular weight of a compound which the retentivity was 90% (Mark C. Porter, Ultrafiltration, Chapter 3—Handbook of industrial membrane technology. Edited by Mark C. Porter, Noyes Publications, 1990), the MWCO of control membrane and the membrane with 1% clay nanoparticles and 1% of SHMP additions range from 50 to 60 kg.mol$^{-1}$, and for the membrane with 2% of clay nanoparticle addition from 90 to 100 kg.mol$^{-1}$. These results are in agreement with the results for pore size distribution in FIG. 16, when one considers the correlation between membrane pore size and molecular weight cut-off presented in the literature (Mark C. Porter, Ultrafiltration, Chapter 3—Handbook of industrial membrane technology. Edited by Mark C. Porter, Noyes Publications, 1990). As it was predicted after the analysis of membranes pore size distribution profile, the membrane with broader pore size distribution presented the lowest rejection capacity, but all prepared membranes can be classified as ultrafiltration.

Figure 18:
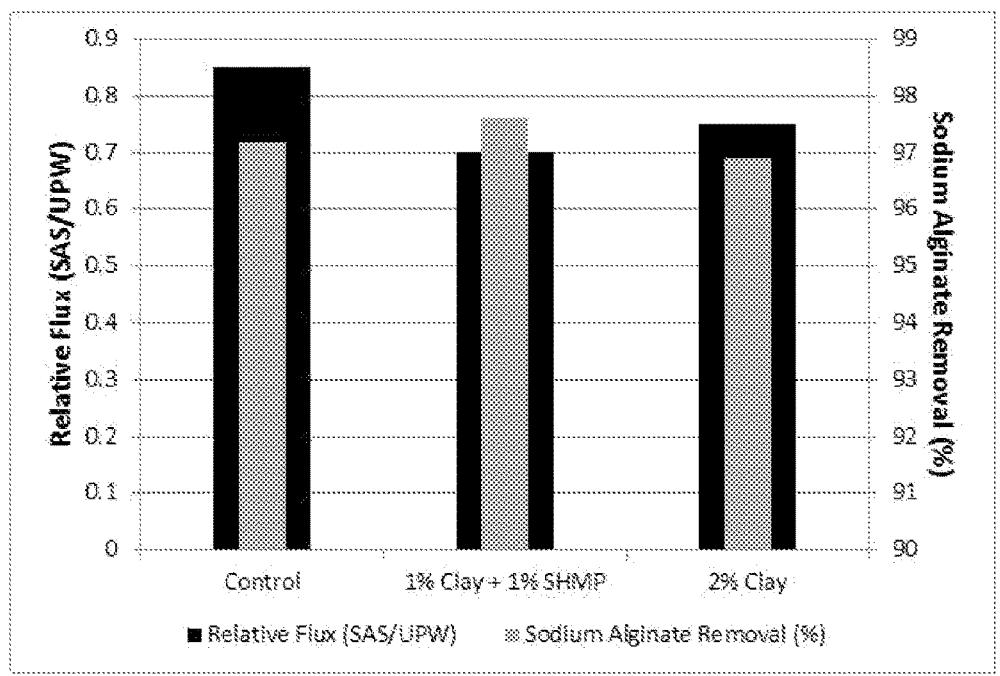
FIG. 18 is a bar graph showing relative permeate flux and sodium alginate rejection for control, 1% clay nanoparticles and 1% SHMP, and 2% nanoparticles membranes, obtained in cross-flow filtration tests with UPW and SAS.

Membranes Performance Evaluation:

Tests with SAS were carried out to evaluate membranes fouling potential and capacity for natural organic matter removal. FIG. 18 presents the results for relative flux and sodium alginate rejection obtained in the tests.

Results depicted in FIG. 18, show that control membrane presented the lowest fouling potential for sodium alginate, with a relative flux of 0.85, and the membrane with 1% of clay nanoparticles and 1% of SHMP presented the highest fouling potential, with a relative flux of 0.70, and the membrane with 2% of clay presented an intermediate fouling potential, relative flux of 0.75. These results are somewhat in accordance with the expected behavior for the membranes, based on the values of contact angle presented in FIG. 13, because contact angle for control membrane was smaller the ones for membranes with clay additions. However, there was an inversion on fouling potential for the membranes with clay nanoparticles additions, since difference between relative fluxes for both membranes is statistically significant at a 95% confidence level (p-value of $5.71 \times 10^{-6}$). This difference might be associated to the differences in membranes internal pore structures, because the membrane with 1% clay nanoparticle and 1% of SHMP presents a higher frequency of enclosed pores close to the membrane surface. This hypothesis can be supported by the results obtained for sodium alginate rejection, which was slight higher for the membrane with 1% of clay nanoparticles addition, as can be seen in FIG. 18. Slightly higher fouling potential for the membranes with clay nanoparticles is offset by higher permeate flux compared to the control membrane, 1.8 and 2.2 times for the membrane with 1% of clay nanoparticles and 1% of SHMP, and the membrane with 2% of clay nanoparticles, respectively. Specifically about sodium alginate removal, three tested membranes were very efficient, with removals close to 97% (FIG. 18).

Comparison of the Results of this Study with Similar Ones:

The number of studies about the use of clay nanoparticles as an additive for polymeric membrane casting, specifically for water treatment, is limited, and few works had been published so far. This fact makes appropriated a comparison among the works available in order to obtain a better understanding about the influence of this material on morphology and performance of casted membrane, and also to identify possible aspects where additional research will be necessary. As it was presented in the introduction section, available works in which clay was used for casting were developed by OriettaMonticelli et al. (Journal of Applied Polymer Science 103 (2007) 3637-3644), PriscilaAnadão et al. (Applied Clay Science 48 (2010) 127-132), and NeginGhaemi et al. (Journal of Membrane Science 382 (2011) 135-147). Table 5 presents main conditions used for membrane casting and the characteristics of obtained membranes, in the available studies and in this study.

The data set presented in Table 5 clearly shows that the use of clay as an additive in dope casting solution has some effect on membrane performance. However, it is not possible to drawn a general conclusion about the mechanisms that had led to these changes, because of large variation in conditions used among previous studies, and because in none of them fouling evaluation tests were carried out. For example, concentrations of clay nanoparticles used in all previous studies were much higher compared with this one, as membrane thicknesses were. In the work developed by Kim and Van der Bruggen (The use of nanoparticles in polymeric and ceramic membrane structures: Review of manufacturing procedures and performance improvement for water treatment, Environmental Pollution, 158 (2010) 2335-2349), it is reported a large variation on the concentration of different nanoparticles additives used in reviewed studies, but in many of them nanoparticles concentration are in the same range used in this study.

About the possible influence of clay dosage or membrane thickness on its performance, it is worth to comment the results obtained by Ghaemi et al. (Journal of Membrane Science 382 (2011) 135-147), related to the membrane separation capacity. Even though no specific test to determine membrane MWCO was performed, some tests about the removal of two selected nitrophenol compounds, with a molecular weight of 184 and 228 $g.mol^{-1}$, were carried out. According to this study removal of such compounds were close to 60% for the membrane with no clay addition, reaching values above 90% for clay concentration of 4%, for an average membrane pore size, as reported, close to 10 nm, what would result in a membrane with a MWCO of 60 $kg.mol^{-1}$ (Mark C. Porter, Ultrafiltration, Chapter 3—Handbook of industrial membrane technology. Edited by Mark C. Porter, Noyes Publications, 1990). So observed nitrophenol compounds concentrations reduction might be related to some adsorption mechanism into the membrane structure, probably associated with membrane thickness and clay dosage.

Another example of the possible influence of membrane thickness on membrane performance is related to pure water flux. Comparing only the results for control membranes obtained by OriettaMonticelli et al. (Applied Clay Science 48 (2010) 127-132), and by Ghaemi et al. (Journal of Membrane Science 382 (2011) 135-147), it is possible to verify that they are of the same order of magnitude, but they differ significantly from the results obtained in this study, of course polymer type and concentration can also affect membrane permeability. In a work developed by C. Barth et al. (Asymmetric polysulfone and polyethersulfone membranes: effects of thermodynamic conditions during formation on their performance, Journal of Membrane Science 169 (2000) 287-299), the influence of polymer type (PSf and PES) and concentration, and membrane thickness on permeate flow has been evaluated. Considering the same type of polymer, water permeate flux was reduced as polymer concentration or membrane thickness were increased, and that permeate flow for membranes casted with PSf was always lower than the one obtained for PES membranes, for the same polymer concentration and membrane thickness.

TABLE 5

Membrane casting conditions used in the available studies about the use of clay or clay nanoparticles as additive, and main characteristics of obtained membranes.

| Casting conditions and membranes characteristics | OriettaMonticelli et al. [22] | PriscilaAnadão et al. [23] | Ghaemi et al. [24] | This study |
|---|---|---|---|---|
| Polymer | PSf | PSf | PES | PES |
| Polymer Concentration (% weight) | 25 | 25 | 20 | 18 |
| Solvent | NMP | NMP | DMF[1] | NMP |
| Clay type | Neat and organically modified MMT[2] | Neat MMT (Wyoming) | MMT organically modified | Neat MMT (Nanoclay) |
| Clay dosage (% weight) | 2, 3, and 5 (based on olymer/solvent solution weight) | 0.5 and 3 (based on final solution weight) | 0.5 to 10 at 1% steps above 2% (based on final solution weight) | 1, 2, 2.5, 3, and 5 (based on PES mass) |
| Pore former | none | none | PVP[3] 25 $kg \cdot mol^{-1}$ | none |
| Pore former dosage (% weight) | — | — | 2 (based on final solution weight) | — |
| Casting knife (μm) | 350 | Not specified | 250 | 100 |
| Coagulation bath | Water | Water | Water (90%) and 2-propanol (10%) | Water |
| Coagulation bath temperature (° C.) | 20 | 25 | Room temperature | Room temperature |
| Post treatment | Running water overnight | Dried at 80° C. in a vacuum oven | Water for 24 h | Water bath for 24 h at 30° C. |
| Membrane pore structure | Finger-like | Sponge-like | Finger-like | Finger-like |

TABLE 5-continued

Membrane casting conditions used in the available studies about the use of clay or clay nanoparticles as additive, and main characteristics of obtained membranes.

| Casting conditions and membranes characteristics | OriettaMonticelli et al. [22] | PriscilaAnadão et al. [23] | Ghaemi et al. [24] | This study |
|---|---|---|---|---|
| Contact angle (Degrees) | Control = 80<br>1% Clay = 79<br>2% Clay = 80<br>3% Clay = 78<br>5% Clay = 80<br>2% Clay-93A = 79<br>2% Clay-30B = 70<br>3% Clay-30B = 61<br>5% Clay-30B = 64 | Control = 74.5<br>0.5% Clay = 72.2<br>3% Clay = 71.5 | Control = 57<br>2% Clay = 51<br>4% Clay = 40<br>10% Clay = 34 | Control = 59.5<br>1% Clay SHMP = 64.3<br>2.5% Clay SHMP = 67.2<br>5% Clay SHMP = 68.7<br>1% Clay = 66.7<br>2% Clay = 67.2<br>3% Clay = 68.4<br>5% Clay = 69.8 |
| Mean surface pore size (nm) | Not reported | Not reported | Control = 11.7<br>4% Clay = 9.59<br>10% Clay = 9.19[4] | Control = 6.6<br>1% Clay + SHMP = 5.2<br>2% Clay = 7.4<br>5% Clay + SHMP = 5.3<br>5% Clay = 5.7[5] |
| Mean surface pore size (nm) | Not reported | Not reported | Control = 11.7<br>4% Clay = 9.59<br>10% Clay = 9.19[4] | Control = 6.6<br>1% Clay + SHMP = 5.2<br>2% Clay = 7.4<br>5% Clay + SHMP = 5.3<br>5% Clay = 5.7[5] |
| Membrane MWCO (kg · mol$^{-1}$) | 2% of neat clay = 40 (Dextran) [6] | Not reported | Not reported | Control = 55<br>1% Clay + SHMP = 55<br>2% Clay = 95 (PEG) |
| Pure water flux (L · h$^{-1}$ · m$^{-2}$ · bar) | Control = 0.29<br>2% of neat clay = 0.54<br>5% of neat clay = 0.25<br>2% of MMT-93A = 7.42<br>2% of MMT-30B = 96.01<br>5% of MMT-30B = 113.36 [7] | Not evaluated | Control = 1.13<br>4% Clay = 4.67<br>10% Clay = 2.22 [7] | Control = 176.4<br>1% Clay + SHMP = 312.5<br>2.5% Clay + SHMP = 222.7<br>5% Clay + SHMP = 63.3<br>1% Clay = 185.0<br>2% Clay = 389.3<br>3% Clay = 227.1<br>5% Clay = 102.1 |

[1] DMF—N,N-Dimethylformamide;
[2] MMT—Montmorillonite Clay;
[3] PVP—Polyvinylpirrolidone;
[4] Obtained through Atomic Force Microscopy;
[5] Obtained through SEM image analysis using ImageJ software;
[6] For all other casted membrane retentivity of Dextran (40 kg · mol$^{-1}$) was below 90%;
[7] These values were obtained based on the results for permeate flow and operation pressure used in the experiments.

It is also possible to verify, based on the data presented in table 2 that changes in contact angle are quite diverse. In the work developed by OriettaMonticelli et al. (Journal of Applied Polymer Science 103 (2007) 3637-3644), there was no significative changes in the contact angle for membranes casted with unmodified and 93-A clays, compared to the control membranes, but contact angle had been reduced for membranes casted with 30-B clay. Observed results for unmodified clay are close to ones obtained by PriscilaAnadão et al. (Applied Clay Science 48 (2010) 127-132), because changes in contact angle were not so significative. Since in both work PSf has been used and clay concentration are in the same range, it can be concluded that neat clay has little effect on membrane contact angle. Considering the work developed by Ghaemi et al. (Journal of Membrane Science 382 (2011) 135-147), it can be seem a significative change in the contact angle when modified clay has been used, but it should be noticed that a hydrophilic agent has been used as pore former, and that base polymer was also different. These results are somewhat in agreement with the ones in the work of OriettaMonticelli et al. (Journal of Applied Polymer Science 103 (2007) 3637-3644), for modified clay-30B. However it should be pointed out that there is a significative difference in the contact angle changing trend of both works, while in the work of Ghaemi et al. (Journal of Membrane Science 382 (2011) 135-147) there is a continuous reduction in the contact angle whit the increasing of clay concentration, in the OriettaMonticelli et al. (Journal of Applied Polymer Science 103 (2007) 3637-3644) membranes contact angles decreased to a minimum and then increased. It is not possible, based on available data, to infer if contact angle would increase or stabilize for higher concentrations of modified clay. Comparing all these results for contact angle measurement the ones obtained in this work it can be seem a quite different behavior, because membranes contact angle had been increased as clay nanoparticles concentration was increased, reaching a plateau close to 70 degrees. The trend in contact angle variation with clay nanoparticles obtained in this study is contrary the one observed in the work of Ghaemi et al. (Journal of Membrane Science 382 (2011) 135-147). As shown in Table 5, differences in contact angles values and trends presented are significative.

In this study the influence of clay nanoparticles, with and without the use of SHMP, on the morphology and performance of PES membranes has been evaluated. Phase inversion process was used for membrane casting and no different additive was used in dope casting solution or in coagulation bath. Dope casting solutions of 18% weight PES and 82% weight of NMP were prepared as base solution for clay nanoparticles dispersion. Through dead-end and cross-flow filtration tests, SEM images, contact angle and thickness measurements, and porosity determinations, it was possible to conclude:

(i) Clay nanoparticles in concentration ranging from 1% to 5% weight (based on the PES mass), with or without 1% weight of SHMP as a dispersant agent, can significantly change membranes structure and performance;
(ii) Based on the results of dead-end filtration tests, membrane with 1% clay nanoparticles and 1% SHMP and membrane with 2% clay nanoparticles presented the highest flux for ultrapure water, 312.5 $L.h^{-1}.m^{-2}.bar^{-1}$ and 389.3 $L.h^{-1}.m^{-2}.bar^{-1}$, respectively, compared to a membrane with no clay nanoparticles addition, 176.4 $L.h^{-1}.m^{-2}.bar^{-1}$;
(iii) Increasing in clay nanoparticles concentrations resulted in an increase in the contact angle, making the membranes more hydrophobic;
(iv) No significative changes in membranes porosity and thickness were observed;
(v) Cross-sectional SEM images revealed significative changes in membranes internal pore structure, which are directly associated with membrane permeability;
(vi) As the concentration of clay nanoparticles increases up to the best dosages, membrane internal finger-like pore structure was straightened and the frequency of enclosed pores was reduced, at higher clay nanoparticle concentrations this structure was changed, increasing pore tortuosity an frequency of enclosed pores;
(vii) Membranes with clay nanoparticles additions presented a slight broader pore size distribution curve, and all membranes with clay nanoparticles, but the one with 2% addition, had presented a reduction on the median pore size;
(viii) Membranes MWCO were determined using PEG solutions with different molecular weight in the cross-flow filtration setup. MWCO of control membrane and membrane with 1% clay nanoparticles and 1% of SHMP were 55 $kg.mol^{-1}$, and MWCO of membrane with 2% of clay nanoparticles was 95 55 $kg.mol^{-1}$;
(ix) Results of tests with SAS showed that membranes with clay nanoparticles additions, with or without SHMP, were more prone to fouling than control membrane, what was expected, based on the results of contact angle;
(x) Sodium alginate rejection for all membranes was close to 97%; and
(xi) Changes observed in membrane permeate flux according to clay dosage in this study were also reported by other researchers in previous studies, however, it was not possible to draw any conclusion about the mechanisms associated to the observed changes, and none of the previous studies had attempted to correlate changes in membranes morphology with its performance.

Example 3: Specific Phosphate Salt Effects on Structure & Performance of Polyethersulfone Ultrafiltration Membranes Membrane filtration is a widely used separation technology for aqueous mixtures. The application of membrane in water treatment has dramatically increased in the past decade due to the improved membrane quality and reduced cost. Ultra-filtration (UF) membranes have pores of 1 to 100 nm, and they are efficient in removing large organic molecules and bacteria. Therefore, UF serves as an important technique for drinking water purification as well as pretreatment of reverse osmosis.

Inorganic salts are widely used as additives to alter the polymeric membrane morphology and filtration performance when asymmetric UF membranes are prepared by phase inversion process. Lithium halides are the most commonly used salts. There are generally two pathways to consider the effects of the added salts: (i) the salts will interact with the solvent or the polymer molecules and change the casting solution properties; (ii) the salts will serve as hydration media during phase inversion and affect the resulting morphology.

HMP (sodium hexametaphosphate, $(NaPO_3)_6$) is a well-known additive for polymers. Previous paper published by our group suggested that HMP can increase the flux of PES (polyethersulfone) membranes by 2 folds when it is added as a dopant to the casting solution in NMP (1-Methyl-2-pyrrolidinone). However the underlying mechanism is still unknown. According to literature report, sodium ions hardly involve in the interactions with NMP. Therefore, studying the effect of the phosphate salts may help reveal the interaction mechanism.

In this study, we use different sodium phosphate salts and study in series about the addition of salts, the solution properties, the resulting PES membrane morphology and permeation properties.

Material and Methods

Materials:

PES with an average molecular weight of 63,000 g $mol^{-1}$ and a number molecular weight of 19,000 g $mol^{-1}$ was from Solvay Advanced Polymer. NMP (>99%) was acquired from Alfa Aesar. HMP, TMP (sodium trimetaphosphate, $(NaPO_3)_3$), TP (sodium triphosphate, $Na_5P_3O_{10}$), Na3P (sodium phosphate, $Na_3PO_4$) and Na2HP (sodium phosphate dibasic, $Na_2HPO_4$) were purchased from Sigma-Aldrich. All chemicals were used as received. All the experiments were conducted with ultrapure water with the resistivity of 18 MΩ.

Membrane Preparation:

Control membrane casting solution was prepared using 18% weight concentration of PES dissolved in NMP. After mixing for 24 hours using an overhead mixer, the solution was placed in an ultrasonic bath for 30 min to remove dissolved gas and bubbles. Finally, the solution was left overnight in the dark until the membrane production.

To remain consistent with our previous study, the doped membranes with HMP were prepared by adding 1% w:w HMP:PES into the casting solution before mixing. The weight ratio of other phosphate salts was calculated to keep at the same molar concentration with HMP.

The phase inversion was conducted in ultrapure water coagulation bath at room temperature. Bar coater of thickness 100 nm was used to spread the solution into thin films on a glass plate with an automatic film applicator (Elcometer 4340 Automatic Film Applicator). The glass with film was immersed into ultrapure water bath as soon as possible and kept there for 20 min. In the end, membranes were collected and stored in ultrapure water at room temperature to remove residual solvent.

Flux Tests:

The prepared membranes were tested using ultrapure water for cross-flow flux. The cross-flow flux was evaluated using the cross-flow filtration setup described in a previous paper. Operation pressure was controlled from 0.15 to 1.2 bar, so that the permeate flow rate fell into the range of 50 to 200 mL $h^{-1}$, suitable for flow meter reading and calibration. Temperature, permeate flow and differential pressure were recorded each 5 min in the 30 min test. 7 samples from different membrane sheets were tested for each casting solution doped with a specific sodium phosphate salt.

Casting Solution Characterization:

The casting solution used for membrane spreading was characterized for viscosity and turbidity. Cannon-Ubbelohde viscometer was used to test the viscosity of different solutions at 30° C. The turbidity test of PES solution of different weight percentages was carried out with the Hach 2100Q Portable Turbidimeter.

Membrane Characterization:

Dry membranes samples were prepared before any flux experiments, and then used for thickness, contact angle measurement and SEM (scanning electron microscope) characterization. To avoid pore structure change during the drying of the samples, the wet membranes were immersed in isopropyl alcohol for 24 h to remove water and then air dried. The thickness of membranes was measured using a digital micrometer. For each type of doped membranes, 9 measurements were carried out on 3 random pieces. Membrane water contact angle measurements were conducted using a goniometer (Ramé-Hart Instrument Co.) with the sessile drop technique, and 30 measurements were conducted on 3 membrane sheets for different membrane types. Both the surface and the cross-sections were imaged at Harvard University's Center for Nanoscale Systems using University's Center for Nanoscale Systems using the Field Emission Scanning Electron Microscope Ultra 55.

Hygroscopic Property of the Salts:

The hygroscopic property of sodium phosphate salts were analyzed by weighing the salts weight change after 24 h drying in 60° C. oven and after short moisture absorption.

Results and Discussion

Cross-Flow Flux Test:

A general decline trend in the flux was observed on all the membranes in the first 30 min tests, and the average decrease was 16%. The flux values after 30 min stabilization were used as an evaluation of the membrane filtration performance. The flux decline and stable flux of the control membranes and doped membranes with HMP, TMP, TP, Na3P and Na2HP were plotted as follows.

Figure 19A:
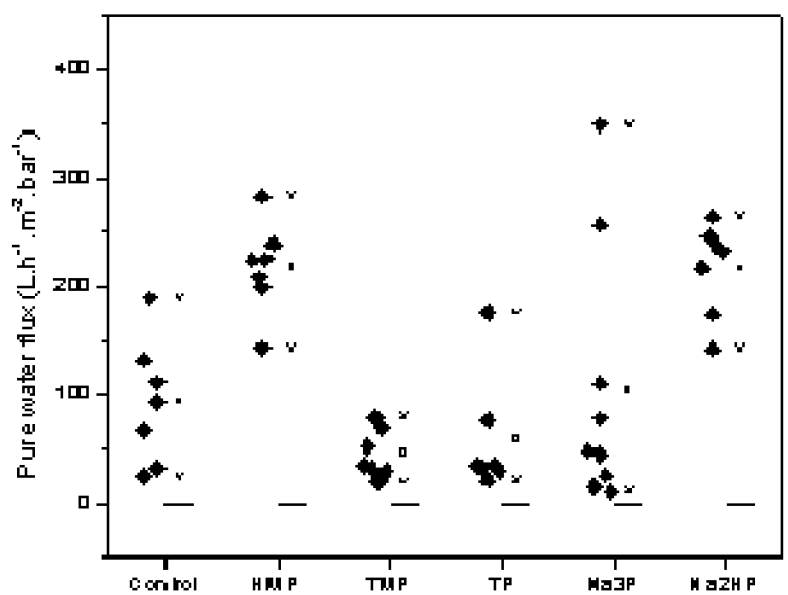
FIGS. 19A and 19B show pure water cross-flow flux (FIG. 19A) and the flux decrease in the first 30 min test compared with average flux for different membranes (FIG. 19B).
Figure 19B:
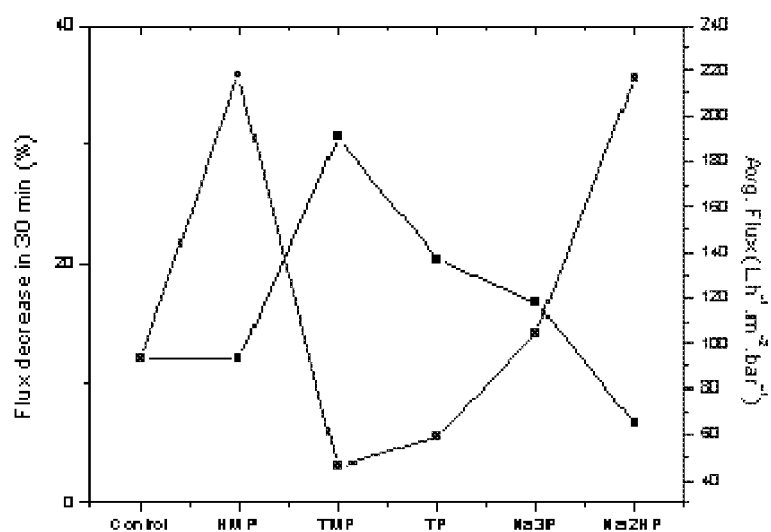

From FIG. 19A, we can tell the effects of different sodium phosphate salts, even though there are large variations for the cross-flow flux of all the six types of membranes. HMP roughly doubled the pure water flux, consistent with the published results. TMP, TP and Na3P resulted in a slower permeation process, while Na2HP had similar effect to HMP. In FIG. 19B, the average fluxes of different membranes are compared with the flux change during the first 30 min membrane operation. Except for the control membranes, there is a negative correlation between the flux decrease and the stable flux for doped membranes. This is due to that higher operation pressure was required for the less permeable membranes in order to get satisfactory permeate flow rate, and thus these membranes tended to compress more in the first 30 min test.

Membrane Morphology:

The flux of membranes is closely related to the porous structure formed during the phase inversion process. Representative cross-section SEM images of different membranes synthesized are shown below.

Figure 20:
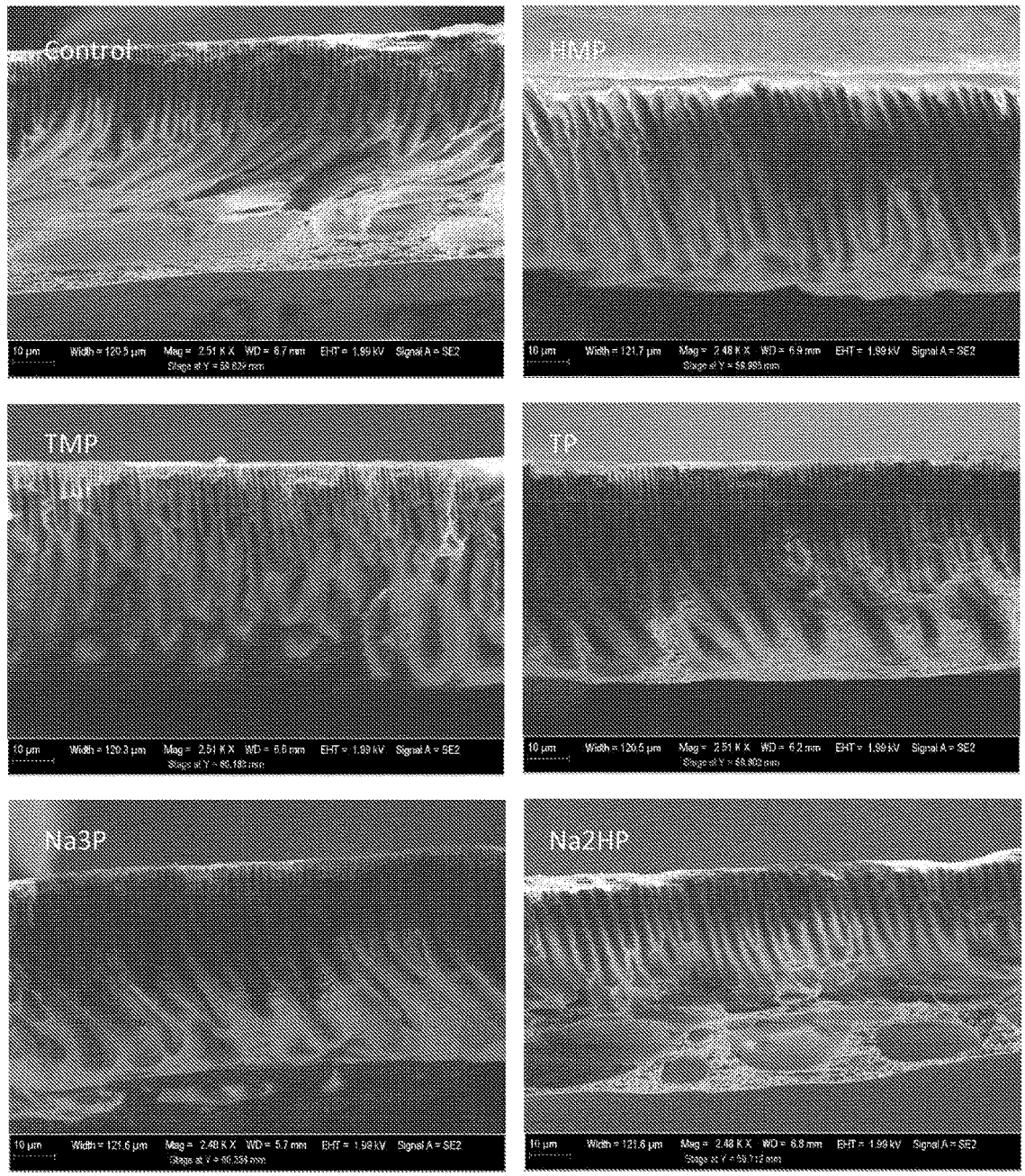
FIG. 20 shows SEM images of the cross-sections of different membranes. Shown are, from top left to right, control, HMP, sodium trimetaphosphate ($(NaPO_3)_3$, TMP), sodium triphosphate ($Na_5P_3O_{10}$, TP), sodium phosphate, ($Na_3PO_4$, Na3P) and sodium phosphate dibasic ($Na_2HPO_4$, Na2HP).
Figure 21:
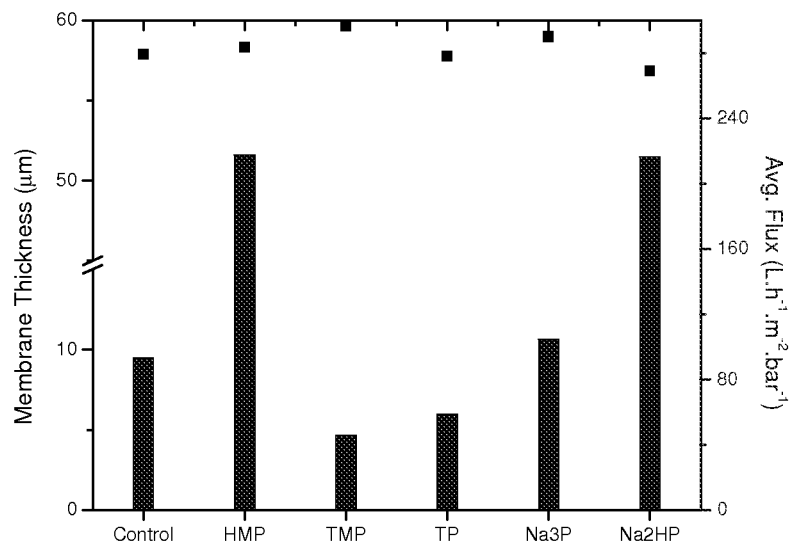
FIG. 21 is a bar graph showing the thickness of membranes compared with average flux of different membranes.

The effect of variant phosphate salts on the membrane cross-section morphology can be summarized from FIG. 20. Visual examination of the thickness indicates no significant change after doping with phosphates. This is verified through thickness measurement, shown in FIG. 21. The addition of HMP, TMP, TP and Na3P helps form straighter channels and compress the macrovoids on the bottom of control membranes. Combining with the cross-flow test results, it indicates that the membranes with HMP and Na2HP have fewer barriers along the long channels, which reduce resistance against water flow in the pores, and thus the resulting membranes have higher flux.

In addition to the cross-section structure, top porosity of membranes is another important characterization parameter. By analysis of representative membrane surface SEM images, we found that all the membranes have surface pores ranging from 1 to 20 nm. The porous area is around 5% of the total surface area. More than 50% of the porous area is attributed to pores within the diameter of 5 to 12 nm. The addition of dopants didn't change the surface porosity or the pore size distribution significantly.

Figure 22:
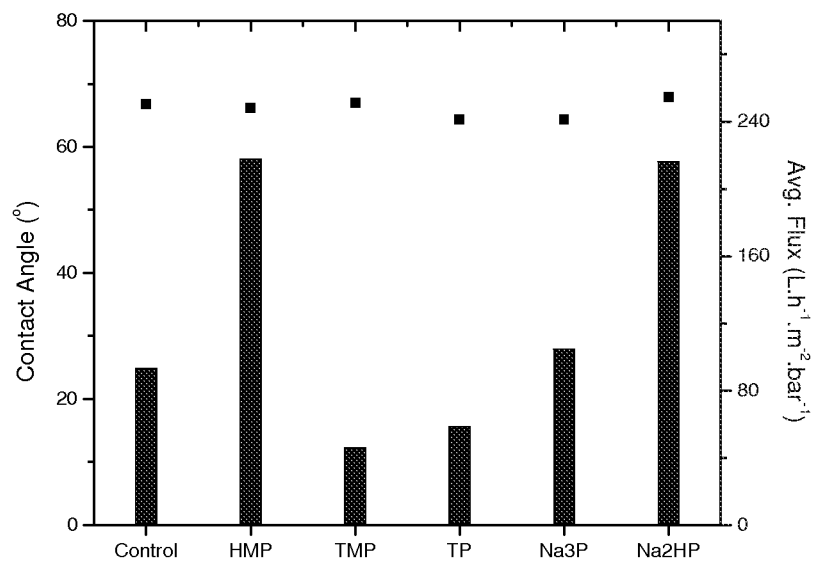
FIG. 22 is bar graph showing the contact angle of different membranes compared with average fluxes.

The contact angle of the membrane surface is also an important factor affecting the filtration performance, including the flux values and antifouling properties. In this study, the contact angle measurements show that the hydrophilic property of the membrane is not changed by phosphate doping. Most of the contact angles of the tested membranes are within 60 to 70°, and the slight variation in the mean contact angles provides no reference for the flux change (FIG. 22).

Properties of the Casting Solutions:

So far, the filtration performance and the morphology of different phosphates doped membranes have been analyzed. However, the reason for these changes is still not clear and requires careful examination of the casting solution properties, which are the main variable of the phase inversion processes. Viscosity and turbidity of the casting solutions are measured as follows.

Figure 23:
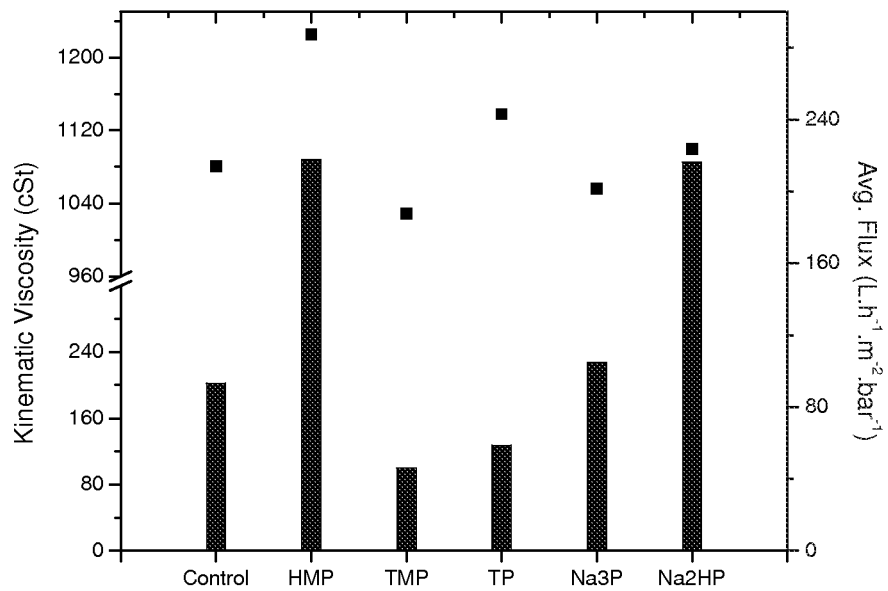
FIG. 23 is a bar graph showing the kinematic viscosity of the casting solutions with different sodium phosphate dopants.

Viscosity is a widely studied property of the casting solution in membrane synthesis via phase inversion technique. Higher viscosity generally results in more porous structure. However, in this study, all the viscosities are between 1000 to 1250 cSt (FIG. 23). We can hardly tell any trend in viscosity change with the salts added or any correlation between the viscosity and average membrane flux.

Figure 24:
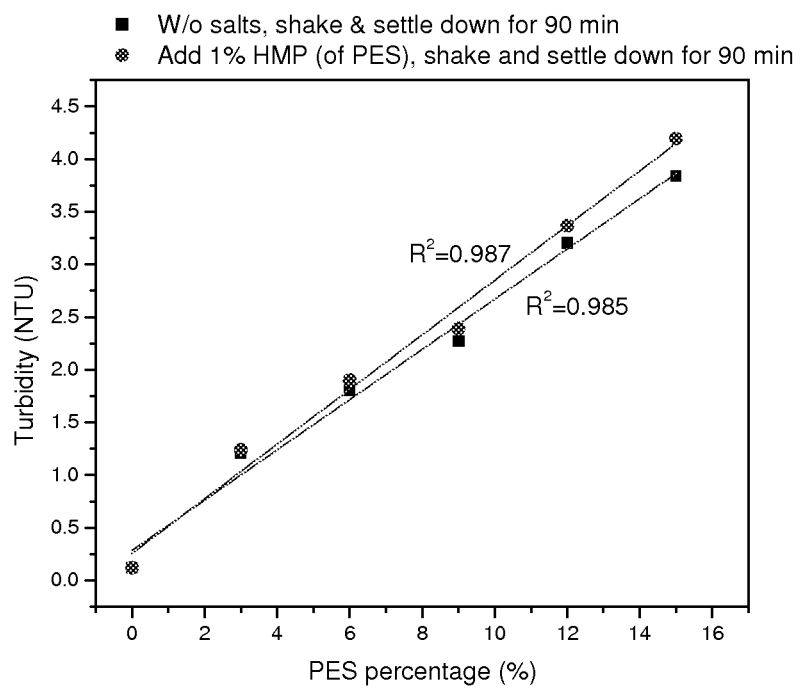
FIG. 24 is a line graph showing turbidity measurements of the casting solution with/without salts at different PES concentrations.

From FIG. 24, rough linear correlation can be found on the turbidity and the PES concentration no matter HMP is added to the solution or not, indicating no qualitative change in the casting solution with the increasing polymer concentration. The HMP dopant increased the turbidity slightly. This phenomenon can be explained by the fact that HMP is quite insoluble in NMP solution and large amounts of particles exist in the solutions. During stir mixing, some particles might break down to small pieces, which fall into the range of few hundred nm, increasing the turbidity of the resulting solution. In fact, all the phosphate salts used in this project didn't dissolve well in the NMP solvent. No measurable evidence could be found showing the really small amount of dissolved salts. This also partly explained why the phosphate dopants hardly changed the casting solution viscosity, membrane contact angles or thickness.

It becomes quite intriguing now how the small amount of dissolved phosphate salts or the not dissolved particles changed the membrane morphology and flux without affecting other properties of the casting solutions or the membranes. One hypothesis is that both the dissolved salts and the small particles dispersed in casting solution are affecting the phase inversion by attracting water molecules locally. As shown in Table 6, all the phosphate salts here have obvious hygroscopic properties. HMP, Na3P and Na2HP have high water absorption capacity while TP and Na3P are quite fast in water absorption. The salts in the casting solution have different dispersion conditions, and this is even further complicated by the varied water absorption speeds and capacities. As a result, some of the phosphate salts finally facilitate the long connected channel formation and increase the membrane flux. It takes future efforts to verify this hypothesis and finally make the mechanism of different sodium phosphates doping clear.

TABLE 6

Hygroscopic properties of sodium phosphate salts

| Salts | Weight decrease percentage after 24 h in the oven (%) | Weight increase percentage after 1 min from the oven (%) |
|---|---|---|
| HMP | 3.50 | 0.06 |
| TMP | 0.10 | 0.05 |
| TP | 0.77 | 0.09 |
| Na3P | 18.20 | 0.09 |
| Na2HP | 5.21 | 0.07 |

CONCLUSIONS

Different sodium phosphate salts were added to PES-NMP casting solutions and the doped membranes were synthesized through phase inversion process respectively. Because most of the salts didn't dissolve in the organic solution, there was no special solution property change after the doping, including solution turbidity and viscosity. The doped membranes had quite different permeate fluxes compared to the control membrane; HMP and Na2HP roughly doubled the fluxes while TMP, TP and Na3P doping decreased the fluxes. Membrane characterization proved that the flux change was mainly due to the inner structure instead of surface or thickness change. The different hygroscopic properties of the salts and the existence of undissolved particles make the mechanism study quite complicated. Efforts were made to relate dopant effects on casting solution properties to effects on membrane structure; however, to date no correlations have been observed All patents and other publications identified in the specification and examples are expressly incorporated herein by reference for all purposes. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A filtration membrane prepared according to a method comprising: (i) providing a solution comprising: (a) a polymer selected from the group consisting of polyethersulfone (PES), polysulfone, and any combinations thereof; and (b) a dopant, wherein the dopant is sodium hexametaphosphate (SHMP); and (ii) casting the solution to form a film or membrane.

2. The method of claim 1, wherein said casting the solution comprises subjecting the solution to a diffusion induced phase separation.

3. The method of claim 2, wherein the diffusion-induced phase separation is performed by a solvent phase inversion process.

4. The method of claim 1, wherein amount of the dopant in the solution is about 0.1% to about 25% wt/wt of the polymer in the solution.

5. The method of claim 4, wherein amount of the dopant in the solution is about 0.5% to about 5% wt/wt of the polymer in the solution.

6. The method of claim 1, wherein amount of polymer is about 1% to about 50% wt/wt of the solution.

7. The method of claim 1, wherein the solution further comprises nanoclay.

8. The method of claim 7, wherein the sodium hexametaphosphate and the nanoclay are present in a 10:1 to 1:10 ratio by weight or moles.

9. The method claim 8, wherein the sodium hexametaphosphate and the nanoclay are present in a 1:1 ratio by weight or moles.

10. The filtration membrane of claim 1, wherein the membrane further comprises nanoclay.

11. The filtration membrane claim 10, wherein the sodium hexametaphosphate and the nanoclay are present in a 1:1 ratio by weight or moles.

12. The filtration membrane of claim 10, wherein the sodium hexametaphosphate and the nanoclay are present in a 10:1 to 1:10 ratio by weight or moles.

13. A filtration membrane comprising: (a) a polymer selected from the group consisting of polyethersulfone, polysulfone, and any combinations thereof; and (b) a dopant, wherein the dopant is sodium hexametaphosphate (SHMP).

14. The filtration membrane of claim 13, wherein amount of the dopant in the membrane is about 0.1% to about 25% wt/wt of the polymer in the membrane.

15. The filtration membrane of claim 14, wherein amount of the dopant in the membrane is about 0.5% to about 5% wt/wt of the polymer in the membrane.

16. A process for filtering an aqueous fluid comprising causing the fluid to flow through a filtration membrane of claim 13.

* * * * *